(12) United States Patent
Jacobs, II

(10) Patent No.: US 11,276,095 B1
(45) Date of Patent: Mar. 15, 2022

(54) METHODS AND SOFTWARE FOR A PRICING-METHOD-AGNOSTIC ECOMMERCE MARKETPLACE FOR MANUFACTURING SERVICES

(71) Applicant: Desprez, LLC, New London, NH (US)

(72) Inventor: James L. Jacobs, II, Amherst, NH (US)

(73) Assignee: Desprez, LLC, New London, NH (US)

( * ) Notice: Subject to any disclaimer, the term of this patent is extended or adjusted under 35 U.S.C. 154(b) by 1426 days.

(21) Appl. No.: 14/928,001

(22) Filed: Oct. 30, 2015

Related U.S. Application Data

(60) Provisional application No. 62/072,653, filed on Oct. 30, 2014.

(51) Int. Cl.
*G06Q 30/06* (2012.01)

(52) U.S. Cl.
CPC ..... *G06Q 30/0621* (2013.01); *G06Q 30/0641* (2013.01)

(58) Field of Classification Search
CPC ............ G06Q 30/0621; G06Q 30/0641; G06F 17/30525; G06F 17/30864
USPC ............................................... 705/26.5, 27.1
See application file for complete search history.

(56) References Cited

U.S. PATENT DOCUMENTS

| | | | |
|---|---|---|---|
| 4,495,559 A | 1/1985 | Gelatt, Jr. et al. | |
| 5,117,354 A | 5/1992 | Long | |
| 5,465,221 A | 11/1995 | Merat et al. | |
| 5,495,430 A | 2/1996 | Matsunari et al. | |
| 5,552,995 A | 9/1996 | Sebastian | |
| 5,570,291 A | 10/1996 | Dudle et al. | |
| 5,655,087 A | 8/1997 | Hino et al. | |

(Continued)

FOREIGN PATENT DOCUMENTS

| | | | | |
|---|---|---|---|---|
| JP | 2007521576 A | * | 8/2007 | ............ G06Q 10/00 |
| WO | 154476 A2 | | 8/2001 | |

(Continued)

OTHER PUBLICATIONS

Defining Lead Time for APS Planning; http://t3.apptrix.com/syteline/Language/en-US/Other/Process/Defining_Lead_Time.htm.

(Continued)

*Primary Examiner* — Yogesh C Garg
(74) *Attorney, Agent, or Firm* — Caldwell Intellectual Property Law, LLC

(57) ABSTRACT

Systems and methods are disclosed for automatically generating, transmitting, and receiving one or more price requests and corresponding pricing from one or more price-providers. In some embodiments, such systems and methods are embodied in a pricing-method-agnostic ecommerce marketplace that allows each price-provider to select the pricing method it desires to use to generate its price for a corresponding price request. Examples of differing pricing methods include methods utilizing "stock" pricing engines of differing sophistication, customized pricing engines, pricing engines split between the marketplace and a price-provider, and/or pricing engines located offboard the marketplace, as well as pricing methods that are performed entirely outside the control of the marketplace, among others. Various corresponding and related systems, methods, and software are described.

20 Claims, 21 Drawing Sheets

(56) References Cited

U.S. PATENT DOCUMENTS

| | | |
|---|---|---|
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |
| 6,112,133 A | 8/2000 | Fishman |
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Calton-Foss |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,922,701 B1 | 6/2005 | Ananian et al. |
| 6,917,847 B2 | 7/2005 | Littlejohn et al. |
| 7,006,084 B1 | 2/2006 | Buss et al. |
| 7,058,465 B2 | 6/2006 | Emori et al. |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 9,171,315 B1 * | 10/2015 | Jayaram ............ G06Q 30/0222 |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras |
| 2004/0008876 A1 | 1/2004 | Lure |
| 2004/0113945 A1 | 6/2004 | Park et al. |
| 2004/0195224 A1 | 10/2004 | Kanodia et al. |
| 2005/0045690 A1 * | 3/2005 | Blankenship ...... B23K 37/0452 228/49.1 |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 5/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |
| 2011/0040542 A1 | 2/2011 | Sendhoff et al. |
| 2011/0040592 A1 * | 2/2011 | Kurtzig ............... G06Q 10/10 705/7.35 |
| 2011/0047140 A1 | 2/2011 | Free |
| 2011/0125579 A1 * | 5/2011 | Coan .................. G06Q 30/02 705/14.54 |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson |
| 2013/0097259 A1 | 4/2013 | Li |

(56) References Cited

U.S. PATENT DOCUMENTS

| | | | |
|---|---|---|---|
| 2013/0100128 A1 | 4/2013 | Steedly et al. | |
| 2013/0138529 A1 | 5/2013 | Hou | |
| 2013/0144566 A1 | 6/2013 | De Biswas | |
| 2013/0166470 A1 | 6/2013 | Grala et al. | |
| 2013/0218961 A1 | 8/2013 | Ho | |
| 2013/0293580 A1 | 11/2013 | Spivack | |
| 2013/0297320 A1 | 11/2013 | Buser | |
| 2013/0297460 A1 | 11/2013 | Spivack | |
| 2013/0311914 A1 | 11/2013 | Daily | |
| 2013/0325410 A1 | 12/2013 | Jung et al. | |
| 2014/0042136 A1 | 2/2014 | Daniel et al. | |
| 2014/0067333 A1 | 3/2014 | Rodney et al. | |
| 2014/0075342 A1 | 3/2014 | Corlett | |
| 2014/0098094 A1 | 4/2014 | Neumann et al. | |
| 2014/0157579 A1 | 6/2014 | Chhabra et al. | |
| 2014/0199650 A1* | 7/2014 | Moffson | B65D 83/00 433/27 |
| 2014/0207605 A1 | 7/2014 | Allin et al. | |
| 2014/0229316 A1 | 8/2014 | Brandon | |
| 2014/0279177 A1 | 9/2014 | Stump | |
| 2014/0379119 A1 | 12/2014 | Sciacchitano et al. | |
| 2015/0055085 A1 | 2/2015 | Fonte et al. | |
| 2015/0066189 A1 | 3/2015 | Mulligan et al. | |
| 2015/0127480 A1 | 5/2015 | Herrman et al. | |
| 2015/0234377 A1 | 8/2015 | Mizikovsky | |
| 2016/0019619 A1* | 1/2016 | Somaiya | G06Q 30/0625 705/26.62 |

FOREIGN PATENT DOCUMENTS

| | | |
|---|---|---|
| WO | 171626 A2 | 9/2001 |
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2013058764 A1 | 4/2013 |
| WO | 2014152396 A2 | 9/2014 |

OTHER PUBLICATIONS

"Quartiles." Mathisfun.com. Web. <https://www.mathsisfun.com/data/quartiles.html>. Archive. <https://web.archive.org/web/20100909011751/http://www.mathsisfun.com/data/quartiles.html>.
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk, http://apps.123dapp.com/catch/.
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory.
EMachineShop. "Emachineshop Features." http://www.emachineshop.com/machine-shop/Features/page518.html.
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 208.

http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/2268/01/22680038.pdf Bui, Tung, and Alexandre Gachet. "Web services for negotiation and bargaining in electronic markets: Design requirements and implementation framework." System Sciences, 2005. HICSS'05.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type3.us/content/download/2202/405535/file/New%20Feature_Type3ToCatia_2010_US%20old.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Jun. 15, 2016.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

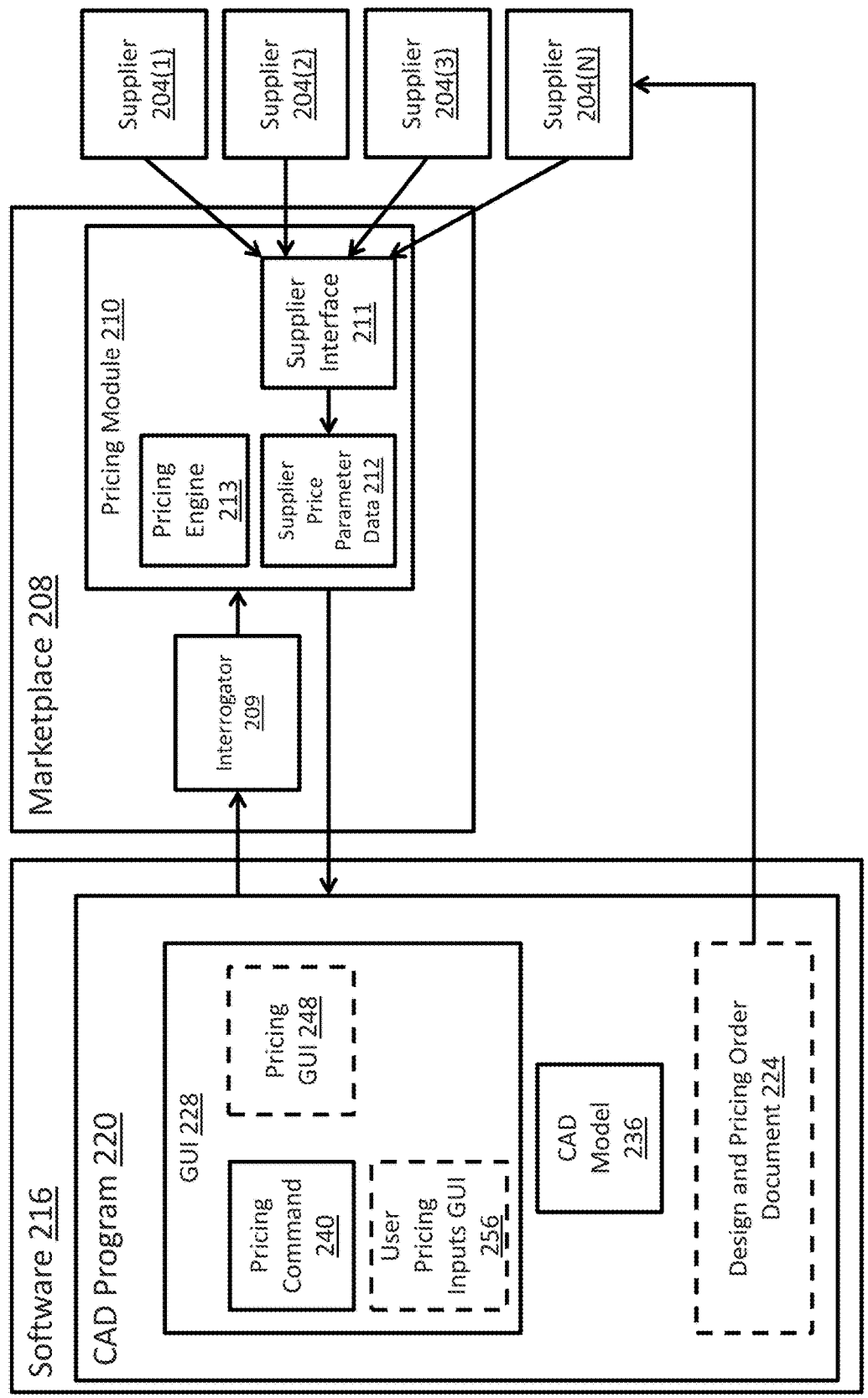

FIG. 4

| Variable Name | Variable Value |
|---|---|
| Length (inches) | 30 |
| Width (inches) | 10 |
| Thickness (inches) | .063 |
| Material | Aluminum |
| Cut length (inches) | 327 |
| Number of Holes | 18 |

Variable name column 504

Variable value column 508

METHODS AND SOFTWARE FOR A PRICING-METHOD-AGNOSTIC ECOMMERCE MARKETPLACE FOR MANUFACTURING SERVICES

RELATED APPLICATION DATA

The present application claims the benefit of priority of U.S. Provisional Patent Application Ser. No. 62/072,653, filed on Oct. 30, 2014, and titled "METHODS AND SOFTWARE FOR FACILITATING PRICING AND ORDERING OF A STRUCTURE REPRESENTED IN A COMPUTER MODEL," which is incorporated by reference herein in its entirety.

FIELD OF THE INVENTION

The present invention generally relates to the field of ecommerce. In particular, the present invention is directed to methods and software for a pricing-method-agnostic ecommerce marketplace for manufacturing services.

BACKGROUND

Computer-aided design (CAD) programs allow designers to create computer models of products to be manufactured. After a design is complete, a user typically then seeks out one or more suppliers (or fabricators) to which they may send a price request in order to obtain a price associated with fabricating the designed structure.

After appropriate suppliers are identified, the process of sending a price request to one or more of the identified suppliers tends to create additional work and expense for a user and/or their employer and can cause delays, as this process typically requires the user or an associated agent to send the price request manually to the one or more suppliers, for example, via e-mail or postal mail. After the user has sent one or more price requests to one or more suppliers, the user may have to wait days or longer before receiving a corresponding price from any one supplier, which can result in unacceptable delays in the fabrication process. Further, each supplier may use different methods, algorithms, and/or inputs to produce a price for a given price request, which can inhibit users' ability to determine how particular elements or conditions of a design influence prices. This lack of awareness of the relationship between design decisions and prices may result in users creating projects that are more expensive than necessary and may prevent users from identifying potential cost-saving modifications they could make to their designs. Therefore, a user attempting to reduce or otherwise minimize costs typically must create and/or change their design without the advantage of knowing how particular elements or conditions of the design, including design choices made during the initial design process, may influence prices and submit or resubmit the price request to each supplier in order to obtain pricings for the design. In the end, this process often results in higher prices for users and wasted time and money for any parties involved.

In some situations, while design of custom manufactured parts may be done in a CAD program by a designer, the actual pricing and buying of custom manufactured parts may be done by someone other than the designer, particularly in large organizations. The pricing and buying personnel, whether agents of the designer or independent of the designer, often do not have access to the CAD system used by the designer. In a common work flow, pricing and/or buying personnel send out pricing requests by manually and individually contacting suppliers, such as by logging onto individual supplier websites or e-mailing files and pricing requests. This can be a time-consuming and inefficient process.

SUMMARY OF THE DISCLOSURE

In an implementation, the present disclosure is directed to a computer-implemented method of enabling an ecommerce marketplace to provide a price for supplying one or more instantiations of a structure represented in computer-model data. The method includes displaying to a user a plurality of user-selectable pricing-method options for a price-provider; prompting the user to select at least one of the user-selectable pricing-method options from among the plurality displayed; receiving from the user a selection of one of the user-selectable pricing-method options from among the plurality displayed; based on the selected pricing method option, associating a computer-implemented pricing method corresponding to the selected pricing method option with the price-provider to create a first association; storing the first association of the computer-implemented pricing method in a first datastore; receiving a price request from a price-requestor, the price request soliciting the price from the price-provider for supplying the one or more instantiations; based on the receiving the price request, querying the first datastore for the first association based on the price-provider; based on the querying, causing execution of the computer-implemented pricing method; determining the price as a function of the execution of the computer-implemented pricing method; and presenting the price to the price-requestor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2A is a block diagram of a multi-supplier pricing system as in FIG. 2, implemented within a CAD system according to an alternative embodiment of the invention;

FIG. 4 is a representative screenshot depicting various aspects of an exemplary user pricing inputs interface implemented in accordance with aspects of the invention;

FIG. 5 is a table illustrating a particular data set that may be extracted via interrogation of a computer model;

DETAILED DESCRIPTION

Figure 1:
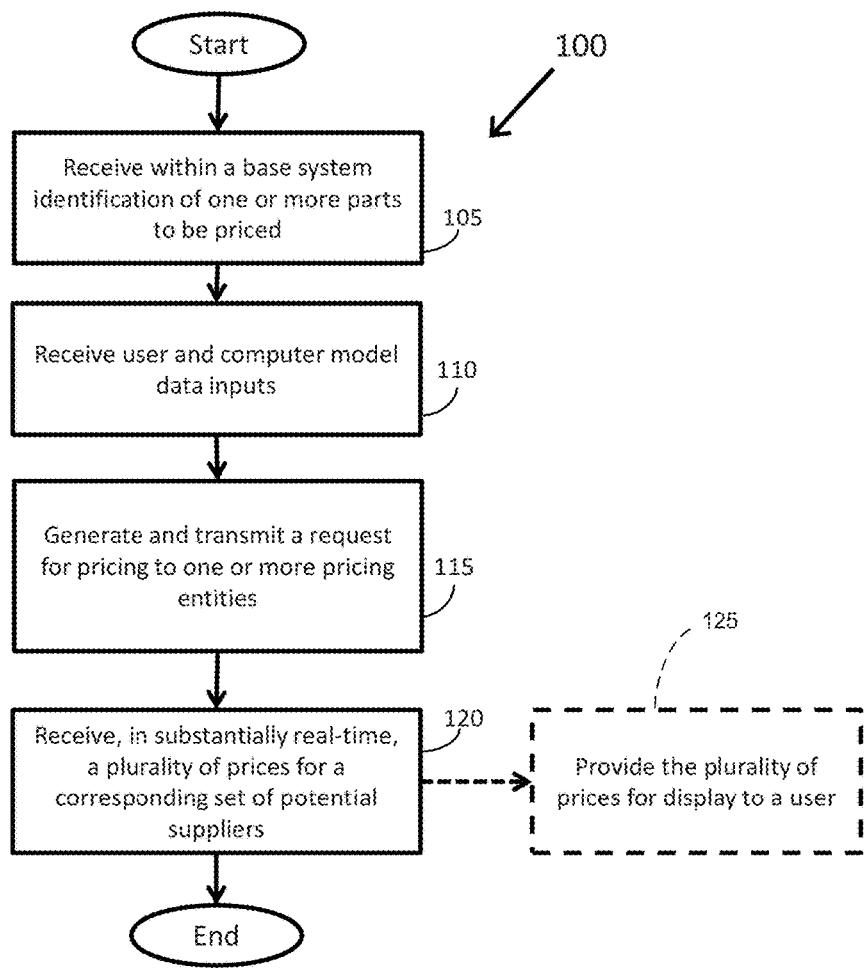
FIG. 1 is a flow diagram illustrating a method of facilitating pricing of a structure represented in a computer model according to an embodiment of the present invention.

Aspects of the present invention include methods and software for facilitating pricing and ordering of one or more instantiations of a structure, or portion thereof, represented in computer-model data, which may be present, for example, in one or more computer-aided design (CAD) models or other computer model(s), among other places. Other aspects of the present invention include systems and methods for automating pricing and ordering functions, and executing the pricing function, from within CAD software and/or product management systems such as, but not limited to, product life cycle management (PLM) systems, enterprise resource planning (ERP) systems, and manufacturing resource planning (MRP) systems. Further aspects of the present invention are directed to an ecommerce marketplace that allows price-requestors (e.g., designers) to solicit prices from one or more price-providers (e.g., suppliers) for manufacturing or otherwise providing one or more physical instantiations of one or more structures modeled in computer-model data.

As used herein, a "structure" may be an object or part having a particular geometry; a "computer model" may be a virtual representation of a structure and may be created using an appropriate CAD program; "computer-model data" may be data representing a structure, or portion thereof, and may be present in or obtained from a computer model or other data file; a price may be a bid, or a firm fixed quote, and may contain non-price information such as a specific or range of lead-time(s) or delivery date(s), among others. A "designer" may be the designer of a computer model, a purchaser, an agent of the purchaser, a consumer, a home user or other user working with one or more computer models obtained from another user or entity, and/or a customer, among others. Examples of a structure include a sheet-metal object, a solid shape, a cylindrical pipe, an injection molded plastic toy, an article of clothing such as a shirt made of cotton, and an assembly of various parts, such as a vehicle or subassembly thereof, among many others. A "project" (or "design") may refer to a CAD model of a part or an assembly of CAD models of parts that may be a virtual representation of a particular structure and may be created using one or more appropriate CAD programs. The term "spectrum" is used herein to denote that a corresponding viewer or other interface has a set of functionalities that a user can modify as desired; for example, the functionalities may correspond to various manipulations of a CAD model of a structure that is the subject of a request for pricing for fabrication, and a user may add to and/or delete from this set the functionalities contained therein as desired.

In some embodiments, software made in accordance with the present invention may accurately and in substantially real-time provide one or more users with a plurality of prices for fabricating a computer-modeled structure for a corresponding plurality of suppliers. Such software may, for example, receive computer-model data of a computer model, which may be a 3D computer model from a CAD system, receive a price initiation request for the computer model, receive a plurality of prices for a corresponding set of potential suppliers, and provide the plurality of prices for display to the user. In addition, the software may permit the user to place an order with a particular supplier based on its substantially real-time price offer. "Substantially real-time," as used herein in reference to automated responses to user-initiated actions, refers to an amount of time sufficient such that the automated response occurs within at most a single user initiated system session. Generally, it is the sum of the times it takes to process the data at issue and complete all necessary data communications, including any delays inherent in the communications system(s) utilized, such as routing delays in a packet-switched network, and in the processing system(s), such as queuing delays in server systems. In terms of price generation, as will be understood by persons skilled in the art, actual time of a substantially real-time action, such as a response to a price request, may depend on the number of individual parts making up, and the complexity of, the structure for which a price has been requested. For example, for a structure with only about ten separate parts, the price may be generated within about 5-15 seconds. But for a more complex structure, with fifty or more separate parts, the time for generation of a requested price may take longer, possibly in the 5-10 minute range depending on typical parameters that affect system or network speed. It is noted that these times are merely illustrative and that actual times may vary, especially as computing power and speed increases and communication speeds increase over successive generations of computing and data-communications systems.

One or more aspects of the present invention can be implemented in any of a wide variety of manners, such as within a single computing device or by two or more networked computing devices, among others. In some embodiments, functionalities of systems described herein may be integrated into computer modeling (e.g., CAD) programs directly or via add-on software. In some embodiments, functionalities of systems described herein may be provided in standalone software.

Aspects and embodiments of the invention may be applied to any number of manufacturing types, including but not limited to the manufacture of apparel and sheet metal products, 3D-printed products, molded products, machined products, among others, and any logical combination thereof. Designers may use CAD systems to design their products. Design data, such as material choice, precise dimensions, and locations of additional features may be embedded within a digital design. Designers may choose different materials, such as metals, plastics, fabrics (including non-woven materials such as leather), etc. depending on the strength and other inherent properties of the material, which affects what manufacturing methods may be necessary to work the material. Purchased components (in some cases, identical purchased components) may be added to the design. CAD programs may be used to visualize the shape of the finished product. In sheet metal and apparel manufacturing the sheet (metal or fabric) may be cut or stamped by a variety of methods using computerized machines. Units are moved from station to station during manufacture. Where sheet metal is connected by rivets or welding, sheet fabric is connected by stitching or gluing. Surface finishes may be applied to both; both may be painted, silk-screened, or otherwise covered with a protective substance. While sheet metal and fabric apparel products have commonalities as discussed above, it will be appreciated by those skilled in the art that other design and manufacturing types which may or may not share many of the same attributes are also amenable to application of embodiments of the present invention.

In some embodiments, one or more modules in accordance with the present invention may utilize a marketplace interface in the form of a spectrum interface as disclosed in U.S. patent application Ser. No. 14/229,008, filed Mar. 28, 2014, entitled "METHODS AND SOFTWARE FOR REQUESTING A PRICING IN AN ELECTRONIC MARKETPLACE USING A USER-MODIFIABLE SPECTRUM INTERFACE" (hereinafter, "the '008 application") which is incorporated by reference herein for its teachings of marketplace spectrum interfaces. Such a marketplace interface may display at least a portion of a CAD model and a set of marketplace tool selectors to a user such that the user can manipulate the tool selectors to interact with an electronic marketplace. In an exemplary embodiment, the marketplace interface includes a spectrum interface designed and configured to allow the user to selectively augment a marketplace interface with additional CAD-model functionality. One or more aspects of the present invention can be implemented in any of a wide variety of manners, such as within a single computing device or by two or more networked computing devices, among others. In some embodiments, functionalities of the system may be integrated into computer modeling programs directly via add-on software.

Turning now to the drawings, FIG. 1 illustrates, at a high level, one exemplary method 100 of the present invention comprising four general steps and one optional step for generating a price from within a base system. The base system may be a CAD system, product management system, or other related system that is typically accessed by a user who may desire to determine pricing or ordering parameters, and which system communicates with, or has the capability of communicating with, other systems as described herein. A first step 105 is to identify or otherwise receive within the base system a selection of one or more parts to be priced. In other words, the system operator may select the part to be priced from a menu provided or by entering a part identifier. For example, such selection may be done with a spectrum interface as mentioned above or through a suitable program or module that may be familiar to persons skilled in the art with respect to the base system. In some embodiments, CAD systems may contain stored and/or indexed data associated with one or more computer models such that a multi-supplier pricing system may receive such models from such CAD systems without requiring any user interaction. System operators may include, for example, designers or other users of CAD systems, planners or other users of product management systems, or other users, including, but not limited to, suppliers and/or purchasing agents. A user may provide such a price initiation request through the base system by using a user-actuated pricing request initiation feature within a graphical user interface (GUI), which may in some embodiments automatedly select a part or assembly of parts represented in an active (i.e., selected) screen or window for pricing. However, in some embodiments, such as embodiments that utilize a multi-supplier pricing system, product management system, and/or associated CAD system, a pricing request initiation module may automatically produce price initiation requests in substantially real-time upon occurrence of preset conditions stored or accessed by the initiation module. For example, when a user calls up a structure for planning related purposes, or when a user loads or modifies a CAD model, the pricing request initiation module may be activated/triggered such that a multi-supplier pricing system may receive a price initiation request without requiring further user interaction. In another example, a price initiation request may be triggered when an inventory level falls below a predetermined threshold.

At step 110, any necessary inputs are provided or received into the system. Inputs at step 110 may include information related to the selected structure or portion thereof represented by the computer-model data, for example, as received from the CAD program (typically automatically, such as by interrogating a CAD model as discussed herein below), and user inputs, which may include information associated with the selected structure that is in addition to information typically contained within computer-model data, such as specific structural characteristics or bill of material information. Examples of such user inputs may include quantity, lead time, shipping location, and/or expedited shipping requirements. User inputs in step 110 may be manually entered by the user, or may be provided in automated fashion or in response to user prompts via the base system from associated systems or databases communicating with the base system that contain necessary additional information regarding the structure. Persons skilled in the art will appreciate that user inputs in step 110 may be made by any combination of these functionalities.

Figure 6:
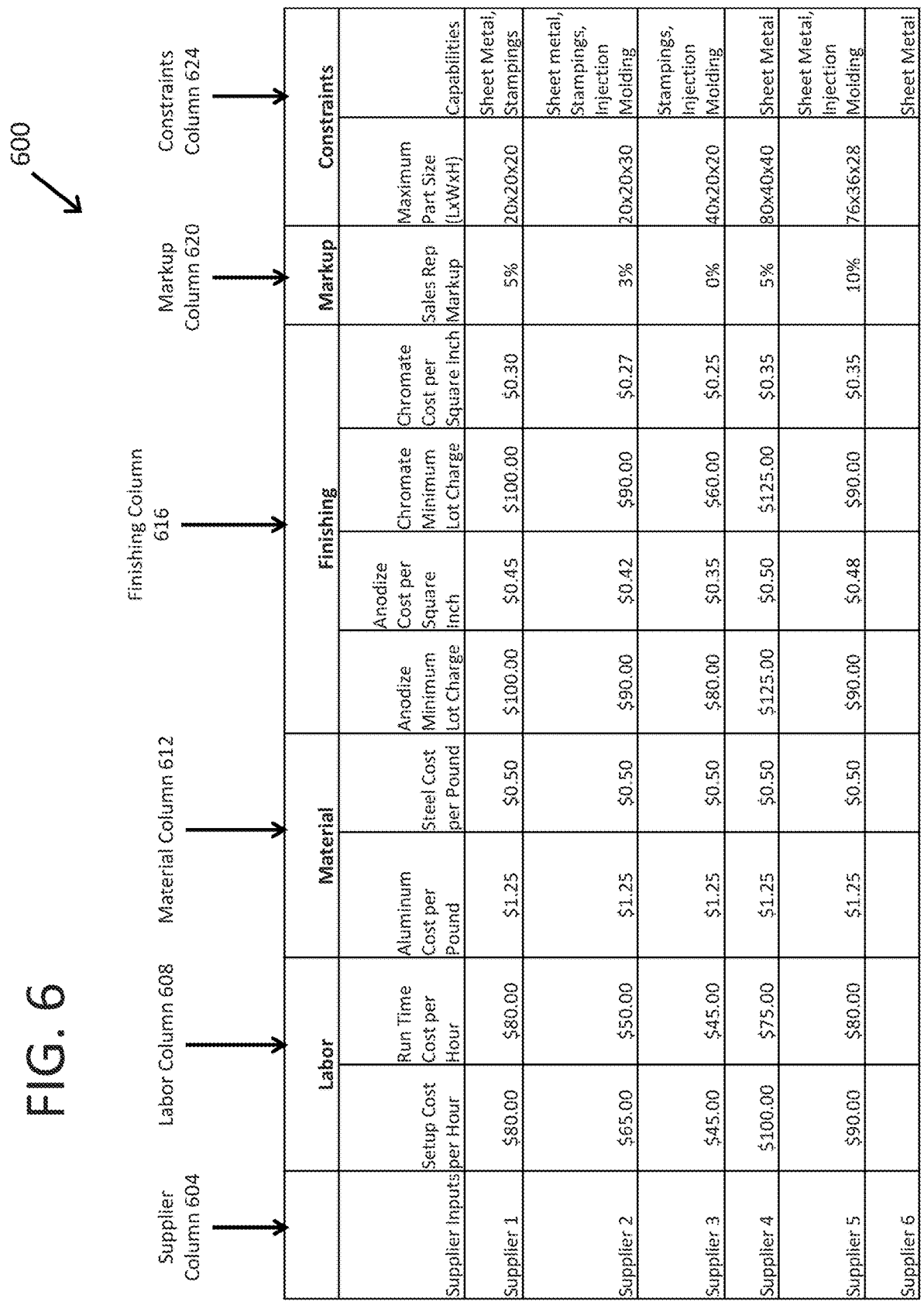
FIG. 6 is a table illustrating aspects of a supplier pricing and capabilities database implemented in accordance with aspects of the invention.

In step 115 a request for pricing (or, "price request") is generated based on the inputs of step 110 and transmitted to one or more pricing entities. In many situations, this may be a plurality of pricing entities. Alternatively, a multi-supplier pricing system may receive such prices from a price-generating algorithm, which may be stored as part of and/or executed by the multi-supplier pricing system, though in some embodiments such a price generating algorithm may be partially or fully stored in and/or executed from a location external to the multi-supplier pricing system, such as one or more external servers or supplier systems, among others. As used herein, a pricing entity generally may comprise one or more (or a combination of) supplier pricing engines, individual suppliers or local pricing engines within a CAD system or Product Management System. Non-limiting examples of pricing engines may be found in pending U.S. patent application Ser. No. 14/060,033, filed Oct. 22, 2013, entitled "AUTOMATED FABRICATION PRICE QUOTING AND FABRICATION ORDERING FOR COMPUTER-MODELED STRUCTURES" (hereinafter, "the '033 application"), which is incorporated by reference in its entirety herein. One such example is illustrated in FIG. 6 of this incorporated application.

Transmission of the generated price request may be executed via existing communication paths, including sending into the marketplace by one or more supplier pricing engines or directly to one or more specifically identified suppliers based on the product or characteristics of the product to be priced. Alternatively, transmission may be through a pricing engine that is local to the CAD module in use. Based on the teachings herein, persons skilled in the art will recognize that one of more communication paths may be used individually or in combination. Subsequently, at step 120, a price or plurality of prices is received by the system, preferably in substantially real-time. Received prices may correspond to a set of potential suppliers responding to the price request.

Step 125 is an optional step in which the prices are displayed to a user. In one example, a multi-supplier pricing system and/or associated CAD system may immediately display the prices to the user via an appropriate user-interface or other such display mechanism. Additionally or alternatively, in some embodiments, such a multi-supplier pricing system may display prices or cause prices to be displayed to a user in a delayed (i.e., non-immediate) fashion; for example, the system may send prices or otherwise cause prices to be sent to a user via an e-mail message and/or the system may store prices on a server and/or database that the user may access at a later time.

Figure 1A:
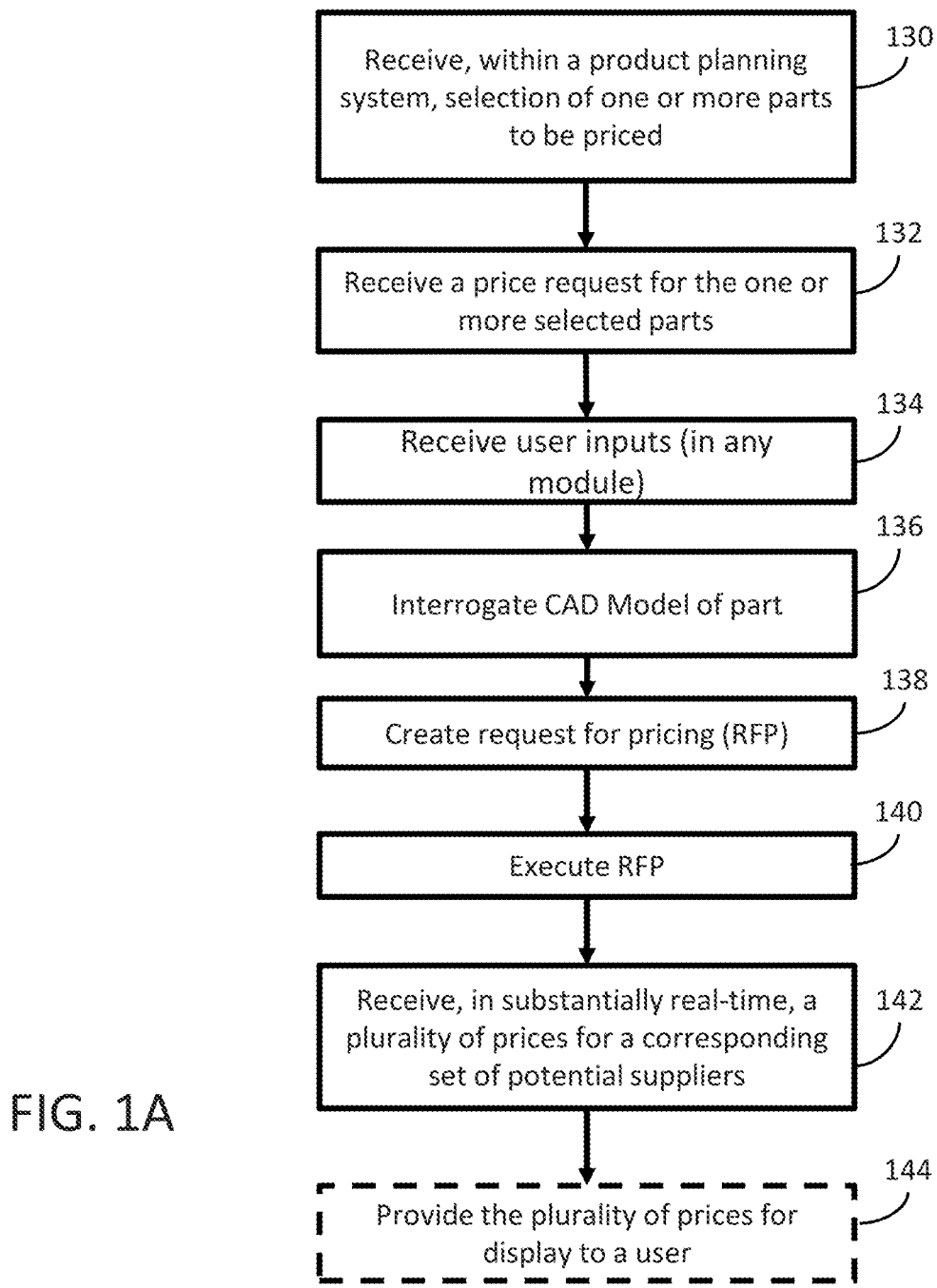
FIG. 1A is a flow diagram illustrating a more detailed pricing method according to another exemplary embodiment of the present invention.

A further and more detailed exemplary method according to an embodiment of the invention utilizing a product planning system as the base system is illustrated in FIG. 1A. In step 130, the product planning system receives identification of the structure to be priced. At this point, the CAD model representing the structure is located and its location (e.g., relative file path, absolute file path, and/or uniform resource locator, etc.) and/or its contents is stored or cached by the pricing system so it can be accessed later. Additionally or alternatively, the computer-model data may be accessed by an interrogator or by using pointers to the model. In step 132, a price request is received for the one or more selected structures or portion(s) thereof after having identified the structure via the user-initiated price request. At step 134, the system receives user input comprising any needed information that may not be resident in an associated database. Step 134 may be initiated by and occur in any module of the system. For example, the user may be in a contact relationship module, as subsequently described, and may select two or more suppliers to price and associate them with the pricing request also initiated from the contact relationship module, or from another module. Preferably, all modules of the system are sufficiently interconnected to facilitate exchange of needed information therebetween.

In step 136, a CAD model or other source of computer-model data may be interrogated and analyzed to retrieve all necessary structural and other product design related information needed to construct the price request. In certain preferred embodiments, the interrogation function flows automatically from the price request initiation by the user. Step 138 creates a request for pricing or a price request based on the inputs of steps 132, 134 and 136. In step 140, the price request is executed, which may comprise sending it out to third-party pricing entities, sending it to one or more marketplaces, and/or running it on one or more internal pricing engines.

Subsequently, at step 142, the system receives one or more prices in substantially real-time. Received prices may be correlated to previously set up corresponding potential suppliers, which may be stored in a supplier database within, for example, a CAD model pricing module, a supplier module, and/or an ordering module, as described below. Step 144 is an optional step of providing one or more of the plurality of prices for display to a user through one of the I/O GUIs, which data will be directed to a module dependent on where the user is operating.

Figure 2:
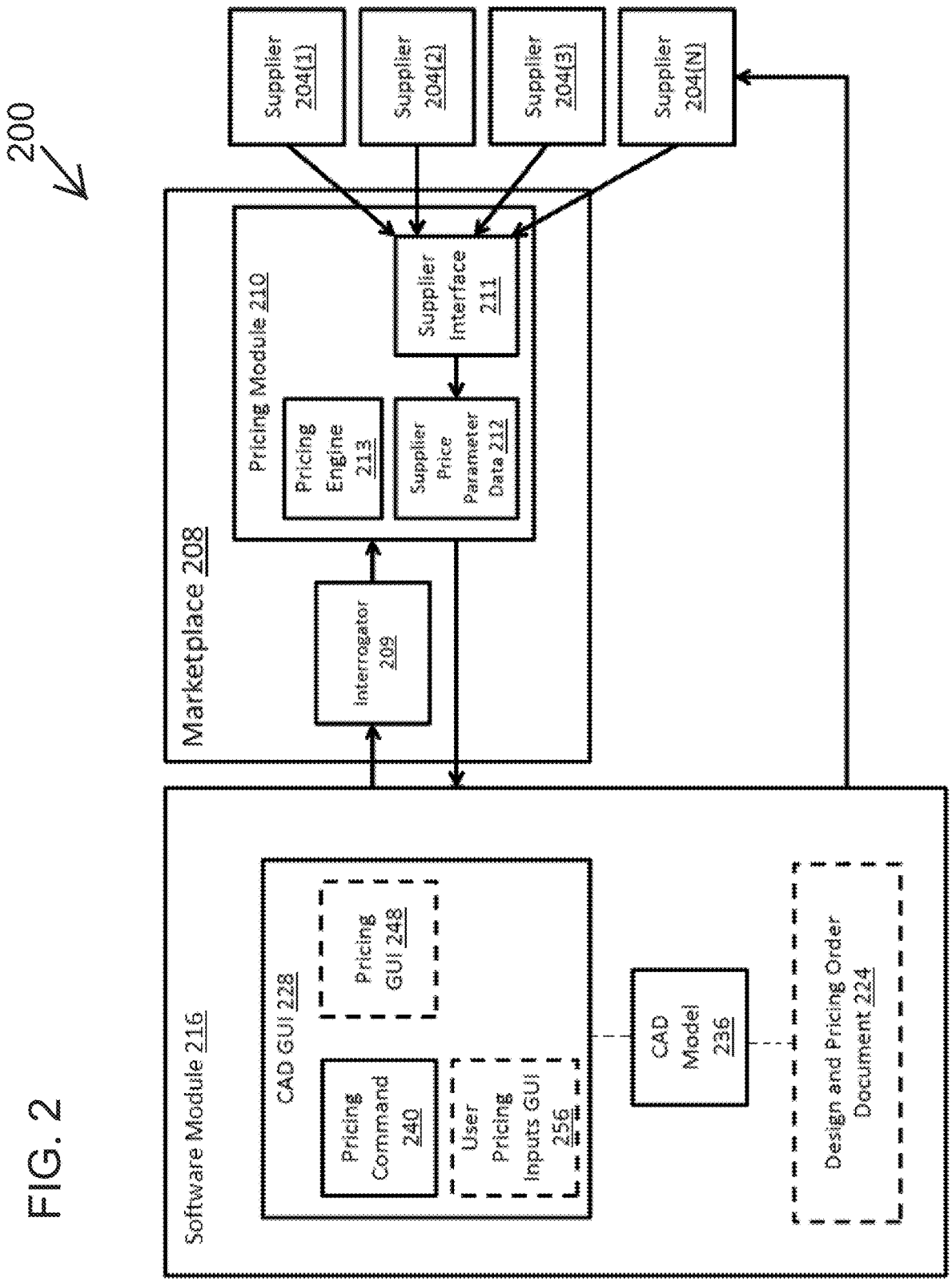
FIG. 2 is a block diagram of a multi-supplier pricing system for accurately and quickly providing a plurality of prices for a plurality of suppliers according to an embodiment of the invention.

FIG. 2 illustrates an example of a basic, multi-supplier pricing system 200 made in accordance with one embodiment of the present invention. In this example, multi-supplier pricing system 200 enables one or more users to view and/or select a plurality of prices for a corresponding plurality of suppliers 204(1) to 204(N), such as "Supplier 1" 204(1), "Supplier 2" 204(2), and up to any number of suppliers (e.g., optional "Supplier 3" 204(3) and "Supplier N" 204(N)), for fabricating a computer-modeled structure. Suppliers 204(1) to 204(N) may comprise one or more entities that offer prices on, bid on, and/or fabricate one or more parts or projects posted by one or more users and may be, for example, a manufacturer of sheet metal parts. Suppliers may actively or passively participate in system 200 such that the system may produce and/or receive instant prices, which may include a total monetary cost to complete a project and/or other information, such as an estimated lead time, to present to a user. Suppliers that actively participate may willingly provide information to system 200, such as pricing information, fabrication capabilities, and/or contact information, and may elect to honor prices produced by the system. System 200 may provide such actively participating suppliers with one or more benefits as a consequence of their active participation, such as, for example, reduced-fee or free use of system 200 or reduced-fee and/or free ads on or in association with one or more components of system 200 and/or one or more associated websites, among others.

Further, system 200 may provide suppliers that elect to honor prices produced by the system with one or more additional or alternative benefits, such as, for example, preferred placement in any supplier listings displayed to users (e.g., the supplier may be listed before other suppliers) and/or an emphasized listing (e.g., highlighted, bold-text, or a "preferred member" icon), among others. Suppliers that passively participate, for example, by consenting to system 200 associating information with them that has been crowd-sourced or otherwise submitted by another, may receive one or more similar benefits to those described above, among others. Various appropriate implementations of benefits like those described above will become readily apparent to one of ordinary skill after reading this disclosure in its entirety.

Suppliers 204(1) to 204(N) may further comprise one or more components and/or programs for allowing a supplier to communicate with one or more components of system 200. For example, suppliers 204(1) to 204(N) may receive various data, such as computer-model data from one or more CAD models and/or pricing information, directly or indirectly from one or more users and/or components of system 200. Suppliers 204(1) to 204(N) may comprise, for example, a plurality of programs/websites and/or a single program or website, which may be accessible by one or more supplier, among other implementations that will become readily apparent to one of ordinary skill after reading this disclosure in its entirety. In some embodiments, one or more of suppliers 204(1) to 204(N) may act as one or more independent marketplaces and perform all or some of the functions of marketplace 208, as described below. It is noted that while the present embodiment is described in the context of computer-model data obtained from a CAD model, those skilled in the art will readily understand that the computer-model data utilized may be obtained from another source of such data.

System 200 may also include a marketplace 208, which may comprise a standalone hardware platform or a combination of hardware platforms. In some embodiments marketplace 208 may be fully or partially stored in, included in, and/or executed from a particular user's hardware platform (e.g., a designer and/or supplier) and/or software such as a CAD program. Marketplace 208 may receive, store, and/or transmit data to and/or from one or more components of system 200 and/or one or more recipients. Marketplace 208 may comprise, for example, one or more add-on programs, one or more websites, a distributed or decentralized network, and/or a peer-to-peer network, among other known types of networks, servers, clients, and programs/add-ons. In use, a user or entity of the marketplace, such as suppliers 204(1) to 204(N), may upload or otherwise communicate supplier-specific information, such as pricing and/or fabrication capability information, to marketplace 208 for storage therein and/or indexing thereby. In some embodiments, marketplace 208 may include and/or maintain an interrogator 209 for interrogating and analyzing information from a CAD model or other source of computer-model data. Additionally or alternatively, software module 216 may contain such an interrogator, for example, as a portion of or add-on to a CAD program. Interrogator 209 may analyze a CAD model and output data that may be received and used by pricing module 210. Illustrative algorithms for such an interrogator may be found in the '033 application, which is incorporated by reference herein for its teachings of extracting pricing data from computer models, and U.S. patent application Ser. No. 14/282,773, filed on May 20, 2014, and titled "METHODS AND SOFTWARE FOR ENABLING CUSTOM PRICING IN AN ELECTRONIC COMMERCE SYSTEM" (hereinafter, "the '773 application"), which is incorporated by reference herein for its teachings of particular interrogator engines.

In some embodiments, marketplace 208 may include and/or maintain a pricing module 210 for receiving, storing, and calculating pricing-related information. Pricing module 210 may further include a supplier interface 211 for allowing suppliers 204(1) to 204(N) to input supplier pricing and non-pricing information such as labor costs and fabrication capabilities, supplier price parameter data 212 for storing pricing and non-pricing information associated with one or more suppliers, and a pricing engine 213 for calculating prices for fabricating a design represented by a CAD model. Pricing module 210 may be stored in and/or executed by marketplace 208, software module 216, one or more of suppliers 204(1) to 204(N), and/or other appropriate components in system 200. Supplier interface 211 may comprise, for example, a plurality of programs/websites and/or a single program or website, which may be accessible by one or more suppliers, among other implementations that will become readily apparent to one of ordinary skill after reading this disclosure in its entirety. Supplier price parameter data 212 may be stored in, for example a server, a hard drive, a CD, a flash drive, and/or cloud storage, among other known data storage devices/services. Data stored within supplier price parameter data 212 may include, for example, lists of various supplier-specific information such as contact information, one or more performance ratings, fabrication capabilities, and/or average lead time, and may also include information related to a supplier's pricing, such as average, recent, and/or guaranteed set-up times, run times, labor costs, and/or material costs, among others. Marketplace 208 may also or alternatively draw such data from one or more suppliers 204(1) to 204(N) via supplier interface 211 as needed. Pricing engine 213 may, for example, accept inputs drawn from supplier price parameter data 212 and/or pricing-related and capability-related CAD model data such as material data, geometrical data, and/or feature data, and may output a price for fabricating a design represented by a CAD model.

CAD models and other computer-model-data-containing sources typically contain a plethora of data but do not store the data in such a way that pricing information can be derived directly therefrom. To cure this deficiency, interrogator 209 can pull data (e.g., material type) from the data source and may provide it to a pricing engine such as pricing engine 213, reformat the data for the pricing engine and then provide the reformatted data to a pricing engine, and/or interpret the data into new data specific for the pricing engine and then provide the new data to a pricing engine. Accordingly, the pricing engine may use specific data in specific formats in formulas to calculate pricing.

Interpreting data into new data may involve one or more of any number of functions and/or operations. For example, for a sheet metal part, a computer-model data may include a variety of information regarding a bend. However, it is useful for a pricing engine to have access to information specifying how many unique bends there are with different bend lengths and the quantity of bends for each unique bend length. To determine such information, interrogator 209 may query each bend in the computer-model data, establish a table of bend lengths, and determine a sum of bend lengths, e.g., for each bend of a common bend length. This can be important for the pricing engine because each unique bend length involves a certain amount of set-up time and therefore a different price. In the case of ten bends all of the same bend length, there may only be one set-up charge applied. In the case of ten bends each with a unique bend length, there might be ten set-up charges applied, depending upon the algorithms of the pricing engine.

Another sheet metal example is "Hole Too Close To An Edge" (HOLE). CAD programs and CAD models typically do not store this information in the CAD model. However, a HOLE can cause manufacturing issues (e.g., it can deform surrounding material and, in the case of a diameter, the diameter may become oblong) if it is, for example, less than four times the material thickness away from the bend. Therefore interrogator 209 can be programmed to check the distance from any hole to the closest bend, divide it by the material and create a true/false flag as a function of the result. The true/false flag can then trigger pricing engine 213 to calculate the price differently than it might otherwise.

Yet another sheet metal example is that a punched hole diameter typically needs to be the same or greater than the material thickness. If it is not, a second operation may be required to manufacture the hole, resulting in more time spent to create the hole than if it could simply be punched. Interrogator 209 may be programmed to check for this situation and create a true/false flag depending upon the result. Pricing engine 213 may then utilize this true/false flag in determining a price, whereas without such a true/false flag the pricing engine may underprice holes with a diameter less than the material thickness of the associated material.

A generic example that would be relevant to such processes as sheet metal, machining, and injection molding is whether a hole extends through a part or only extends partially into the part. The result may affect manufacturing costs, as, for example, a non-through hole in sheet metal requires another operation (e.g., machining) to create the hole. CAD programs and CAD models may not specify whether or not a hole extends through associated material. In some CAD programs, given a sheet with a thickness, to put a hole in the sheet, a user may create a cylinder and define one or more Boolean operations to subtract the cylinder from the sheet; under these conditions, there may not be any explicit information in the CAD model regarding whether the hole extends through the sheet. In this case, interrogator 209 can be programmed to analyze the maximum material thickness for the hole and compare it to the geometry modeled to cut the hole, creating a resultant true/false flag that may be utilized by pricing engine 213 in determining a price.

In order to enable users, such as one or more designers, planner, etc., to interact with system 200, the base system may provide and/or utilize software module 216 in the form of, for example, a virtual platform for running various programs/functions, such as one or more GUIs. Software module 216 may comprise, for example, an operating system, a web browser, and/or a virtual machine, among other implementations that will become readily apparent to one of ordinary skill after reading this disclosure in its entirety. Software module 216 may comprise, for example, a plurality of programs/websites and/or a single program/website, which may be accessible by multiple users, among other implementations that will become readily apparent to one of ordinary skill after reading this disclosure in its entirety, and may further include a design and pricing order document 224 for sending a design order and an associated price to a plurality of suppliers 204(1) to 204(N), a GUI 228 for initiating pricing, allowing for user pricing inputs, and displaying prices, and a CAD model 236 or other computer-model data source.

Herein, a design document such as design and pricing order document 224 may be or may include a CAD model, computer-model data, pricing data, non-pricing data, and/or a fabrication request, among other things. Pricing order document 224 also may contain a design document, a record of various geometrical data, feature data, pricing data, user information, and/or supplier information associated with one or more CAD models or other computer-model data source, as well as one or more associated prices. Designers may communicate such a document 224 to one or more suppliers, for example, via marketplace 208 or software module 216, if the user desires to place an order with the one or more suppliers. Design and pricing order document 224 may additionally or alternatively comprise, for example, a CAD file and/or an e-mail including information regarding one or more CAD designs, as well as embedded, attached, or otherwise associated price information, among others.

In some embodiments, as shown for example in the alternative embodiment of FIG. 2A, software module 216 may be integrated with or include a CAD program 220 that one or more users may utilize to design CAD models, as well as solicit/accept/review prices, and/or generate design and pricing documents, among other things. In such an embodiment, a user may manipulate CAD program 220 in order to produce a design and pricing order document 224 as described above.

As alluded to above, software module 216, and/or CAD program 220 if included therewith, may contain a GUI 228 to provide a GUI to designers, allowing for interaction between a designer and CAD program 220. GUI 228 may be operable to display, for example, one or more CAD models, options, prices, etc. In order to display prices, GUI 228 may interface with or otherwise utilize a pricing module 210. In some embodiments, GUI 228 may display a CAD model 236, which may comprise a computer model of a structure designed within CAD program 220 and/or another CAD program or application.

GUI 228 may further display a pricing command 240, which may comprise a button or other interface element that a user may select to cause the CAD GUI to initiate a pricing GUI 248, which may allow for viewing, filtering, and/or selection of one or more suppliers and/or prices, though the CAD GUI may in some embodiments simply provide a panel or other interface component that provides (e.g., displays) a price and updates it automatically when any changes are made to associated CAD models. GUI 228 may additionally or alternatively display user pricing inputs GUI 256 for allowing a user to input various pricing and non-pricing information, such as quantity and/or desired lead time, among others. Pricing GUI 248 and user pricing inputs GUI 256 may be stored in and/or executed by GUI 228, CAD program 220, software module 216, and/or one or more other appropriate components of system 200. Details of exemplary GUI 228 and user pricing inputs GUI 256 are described below in the context of FIG. 4, while details of an exemplary pricing GUI 248 are described below in the context of FIG. 8. Notably, in some embodiments, a user providing a price request to multi-supplier pricing system 200 may cause the system to initiate some or all of the functionality of marketplace 208 and/or user pricing inputs GUI 256 and to calculate a plurality of prices from one or more suppliers.

Figure 2B:
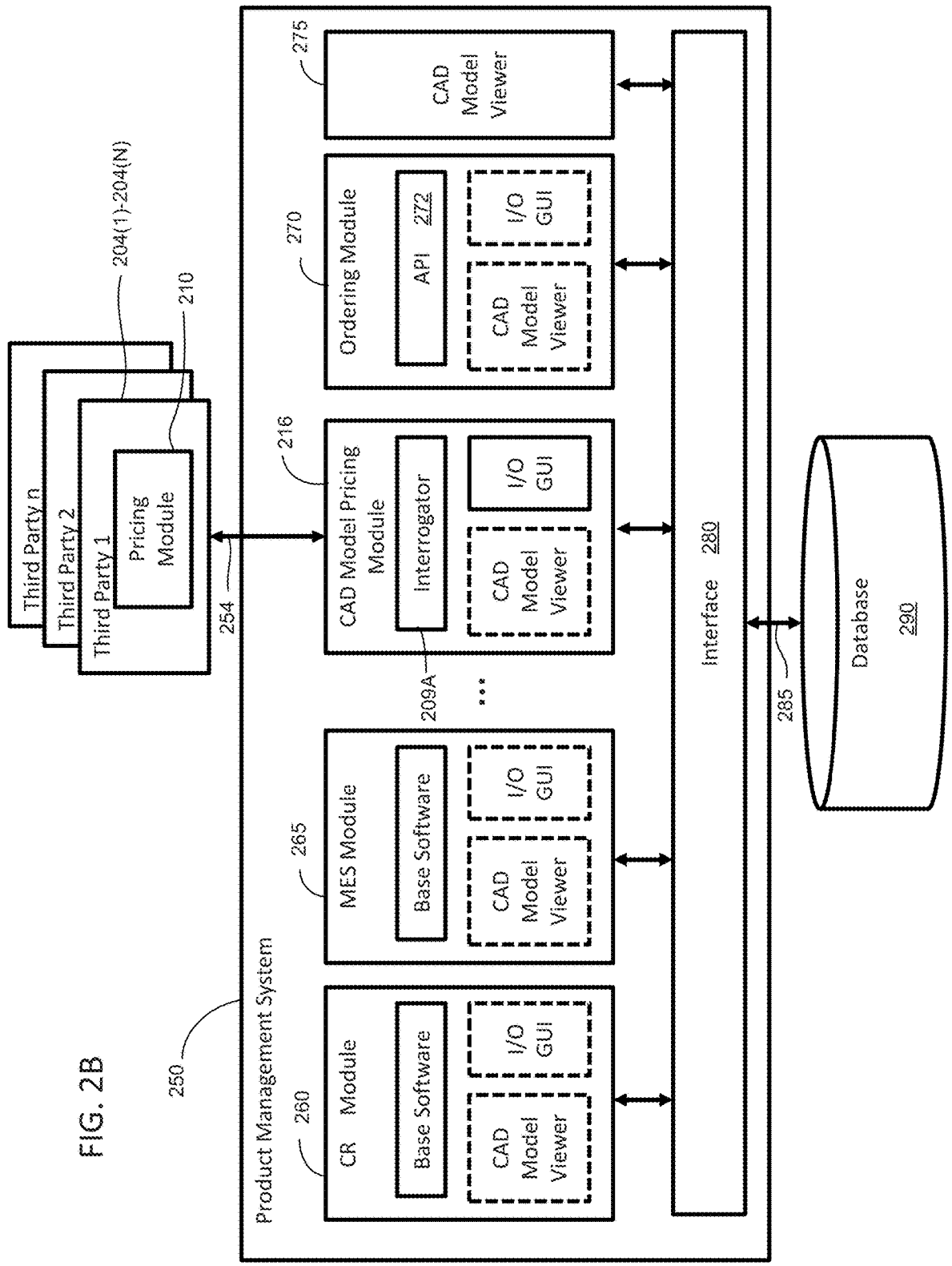
FIG. 2B is a block diagram of another exemplary embodiment of the present invention, in this case implemented within a product management system.

Turning to FIG. 2B, this figure illustrates an automated pricing and ordering system incorporated into a product management system according to an alternative embodiment of the present invention. In such an embodiment, the base system comprises a product management system 250, which includes a set of operational modules appropriate to the particular system or structures, an ordering module and one or more CAD model viewers, each of which may or may not be present in other embodiments. In this embodiment, software module 216 comprises a CAD model pricing module. Specific modules in this example are discussed in more detail below, but persons skilled in the art will readily appreciate that other operational modules and other numbers of operation modules may be included within or excluded from the set for particular applications or products.

Inside each operational module there resides a base software application that controls the key functions inherent in the particular operational module, for example, to cause a contact relationship module to perform its contact relationship functions, etc. Also included in the operational modules, as well as the CAD model pricing module and ordering module, are an optional CAD model viewer and an optional input-output graphical user interface (I/O GUI). Either or both of the CAD model viewer and the I/O GUI may be replicated in individual modules or utilized from other modules. System 250 also may include a separate CAD model viewer 275 that is independent of any of the operational or other modules. As also discussed in more detail below, system 250 communicates with third-party suppliers 204(1) to 204(N), which may collectively or individually contain or access a pricing module 210 as previously described, through a communication path 254. In a further alternative, a pricing entity may be included in a marketplace that communicates with third-party suppliers as described above.

CAD model viewers as utilized in operational modules of system 250 preferably permit viewing, but not editing, of CAD model geometry and non-geometric attributes. Associated supplier or other third-party information may also be loaded as part of the model and accessed through operational module specific viewers and/or overall system viewer 275. Underlying each operational module of system 250 is interface 280, which allows the data within the CAD model to be translated into the form necessary for interpretation by each individual module. Interface 280 also optionally may be configured to facilitate communication between operational modules. In general, interface 280 may be implemented by persons skilled in the programming arts in an application program interface as required to provide the module functionality described herein.

Figure 17:
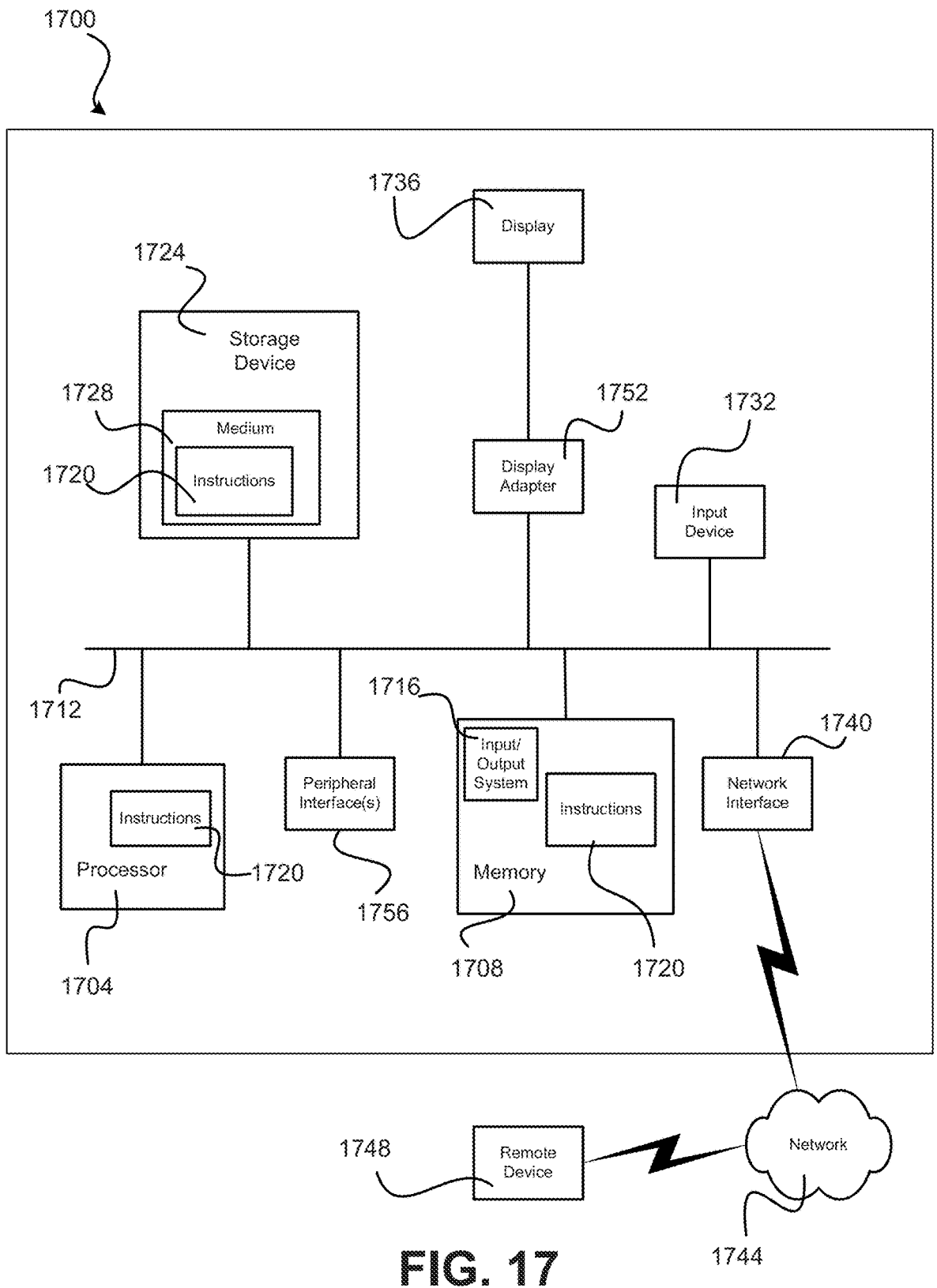
FIG. 17 is a block diagram of a computing system that can be used to implement any one or more of the methodologies disclosed herein and any one or more portions thereof.

Product management system 250 communicates with database 290, via interface 280 and communication path 285. Database 290, which may be referred to as a CAD model database, i.e., a database of CAD models (although other information may also be included), may reside outside system 250 as shown or may reside within system 250. Communication path 285 will be selected based on the configuration as needed based on the particular system. Exemplary communication paths include, without limitation, buses, controllers, network interfaces, and wired and wireless networks as illustrated in FIG. 17.

Although there may be virtually any number of operational modules as appropriate for a particular system and structure, system 250 typically utilizes at least software module 216 in the form of a CAD Model Pricing Module along with a base system product management module. Alternatively, system 250 will also include ordering module 270. Specific operational modules in this illustrative embodiment also comprise contact relationship module 260 and manufacturing execution system module 265. Contact relationship module 260 may comprise a conventional contact relationship system operating on a conventional base software with modifications as explained herein. Similarly, manufacturing execution system module 265 may comprise a conventional base software to accomplish conventional tasks, plus modifications as explained herein. Such modifications may include added resident functionality in each operational module to permit the user to initiate a pricing experience or action without leaving the operational module, which initiation would activate the CAD model pricing module as discussed below.

In general, CAD model pricing module 216 is programmed and configured to generate and transmit the price request through communication path 254 to third parties 204(1) to 204(N). CAD model pricing module 216 is also the module that the user interacts with to form and transmit the price request after initiation of the pricing action from one of the operational modules. Alternatively, the user may initiate the pricing experience or action directly in the CAD model pricing module using its optional, resident I/O GUI.

CAD model pricing module 216 may include interrogator 209A and, again, an optional CAD model viewer and input-output GUI. CAD model pricing module 216 may be configured to handle both the pricing and the viewing of the CAD model. In a typical pricing operation using system 250, a user would initiate a pricing experience or action in one of the operational modules, such as contact relationship module 260 or manufacturing execution system module 265, by selection of a provided button, widget or similar user-selectable feature in the I/O GUI for the operational module. Selection of the initiation feature activates the CAD model pricing module I/O GUI, which is subsequently used by the user to control the pricing function within the CAD model pricing module through its I/O GUI. Interrogator 209A accesses and retrieves information from a CAD model or models located within database 290, which is formatted and transmitted as a price request or a portion of a price request via communication path 254 to third parties 204(1) to 204(N). In one exemplary embodiment, CAD model pricing module 216 and interrogator 209A may be executed through use of a fabrication-price-quoting-and-ordering system as described in the above-incorporated '033 application.

In a typical pricing interaction, third parties 204(1) to 204(N) utilize one or more pricing modules 210 to return a price via communication path 254. (In this exemplary embodiment, the pricing modules need not include an interrogator because the interrogator is included in the CAD Model Pricing Module. However, because the third-party pricing modules may communicate with other systems through a marketplace, they may still include an interrogator for maximum flexibility.) Additionally or alternatively, one or more of third parties 204(1) to 204(N) may contain an interrogator that can be utilized when, for example, an interrogator is not contained within CAD model pricing module 216 and/or when an interrogator is contained within the CAD model pricing module but the interrogator fails, is unavailable, or has undesirable settings, performance, or other negative aspects.

If a returned price is acceptable to the user, then ordering module 270 may be activated, which would then use the ordering module API 272 to formulate an order at the returned price and transmit the order to the correlated supplier for fulfilment. At any step in the pricing process as described, if the user wanted to view the CAD model, CAD model viewer 275 or one of the optional CAD model viewers inside a module that the user was currently interacting with could be activated via a GUI element to initiate the viewing function.

As indicated above, ordering module 270 is programmed and configured to formulate and send orders in response to a returned and accepted price. The ordering module includes API 272 for translating the order request in the appropriate form to send out to a supplier or to the marketplace. Optional CAD model viewer and I/O GUI also may be resident within the ordering module. The CAD model viewer within ordering module 270 may comprise a spectrum interface as previously described or may be implemented as another known viewing system.

Figure 2C:
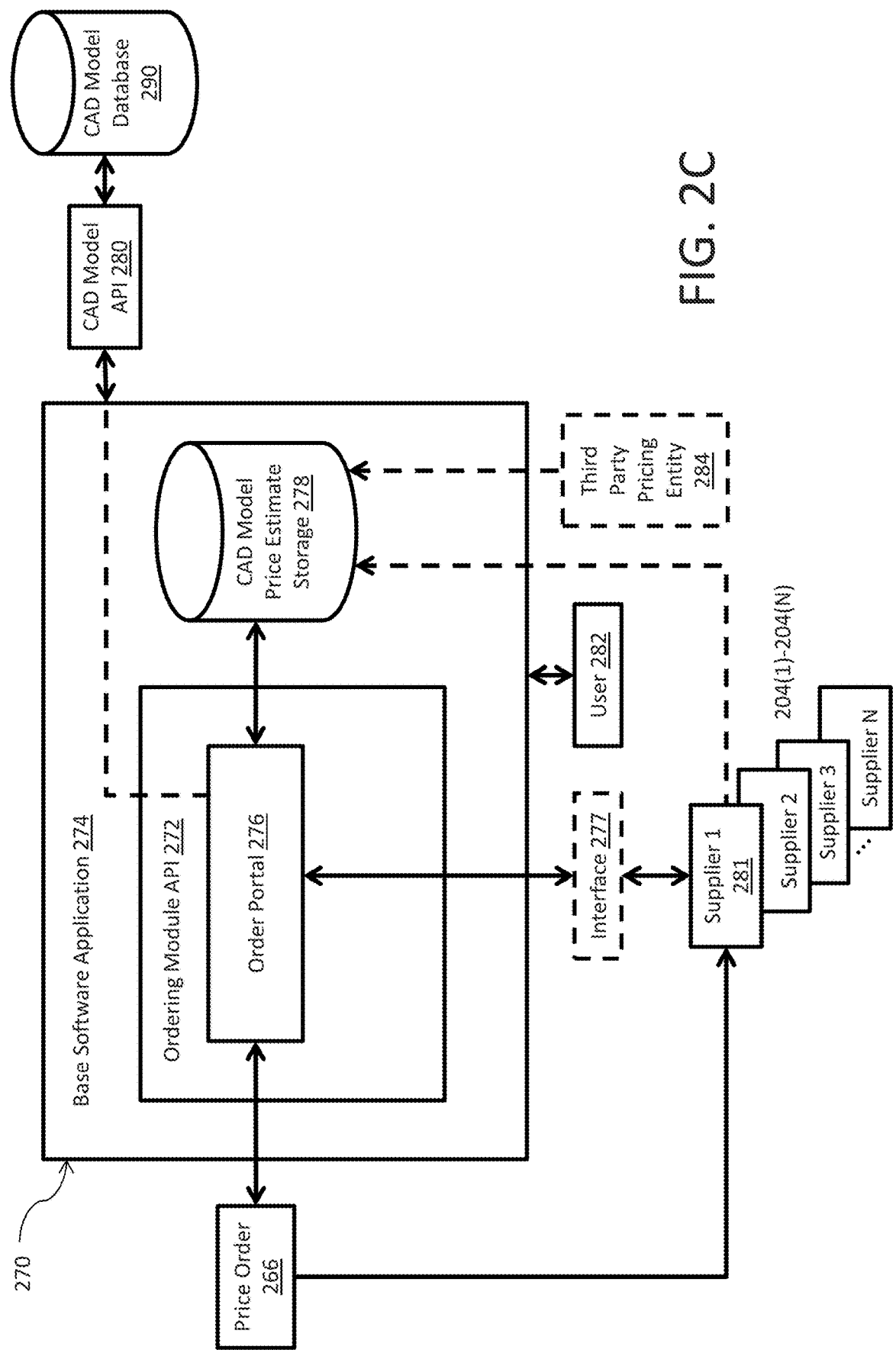
FIG. 2C is a block diagram illustrating an ordering module according to one exemplary embodiment of the present invention.
Figure 2D:
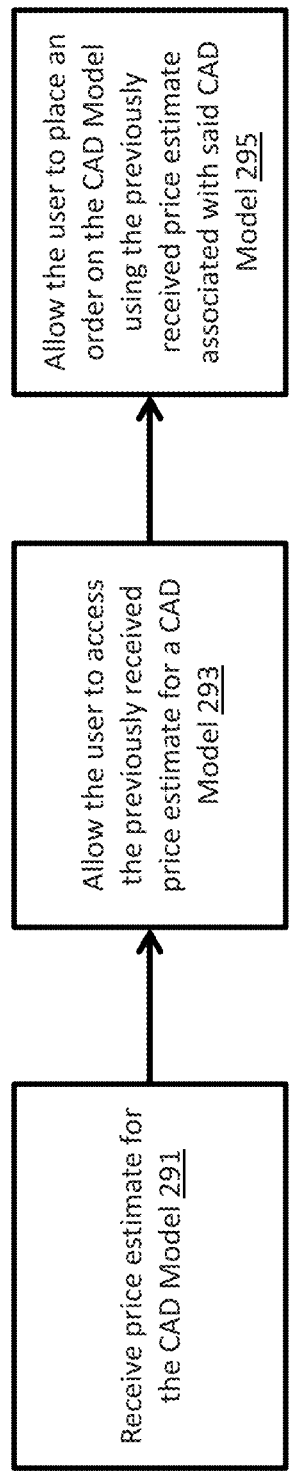
FIG. 2D is a flow diagram illustrating an exemplary method for ordering based on an ordering module as shown in FIG. 2C.

One exemplary embodiment of ordering module 270 and an implementation are described in greater detail with reference to FIGS. 2C and 2D. In this embodiment, ordering module 270 may comprise a base software application 274 that may include or employ ordering module API 272, ordering portal 276, interface 277, and CAD model price estimate storage 278. Persons skilled in the art will appreciate that base software application 274 may be a virtual platform configured to run various programs and applications and may be, for example, an operating system, a web browser, a simulated computer, etc. In this regard, it is not required that each of the components of ordering module API 272 be physically resident within base software application 274, but may also be accessed through local or wide networks.

CAD model price estimate storage 278 may comprise a database for storing and providing information associated with a project design from ordering module 270, in particular through order portal 276. While functionally cooperating with the ordering module, storage 278 will most typically be remotely provided for communication with the ordering module. Thus, storage 278 may be, for example, a server, a hard drive, a CD, a flash drive, cloud storage, etc.

Order portal 276 is a program sub-module within ordering module 270 that provides functionality to allow a user 282 to, among other things, view CAD models retrieved from database 290 and any associated, previously received price estimates from price estimate storage 278, as well as to create price order 266. Order portal 276 may be, for example, a program, application, etc., which will include appropriate communication protocols to directly (or through interface 277 receive authentication and order information from another operational module. In the case of direct designer/agent access, log-in functionality is provided to permit user identification information to be automatically associated with an order. Interface 277 is a further optional sub-module allowing for interaction between order portal 276 and suppliers 204(1) to 204(N), and may be, for example, an add-in program, an e-commerce marketplace, a website, an internet application, etc.

User 282 is an entity that may create price order 266 on a project or structure to be created by a supplier. In preferred embodiments of the present invention, user 282 typically may be, for example, another operational module of product management system 250 (e.g., contact relationship module 260), or may be an individual designer, ordering agent or purchasing agent who accesses the ordering module directly. Suppliers 204(1) to 204(N) are typically third-party entities that may make offers to create parts or projects stored in response to orders initiated by the system. These suppliers may be the same or different from third parties 204(1) to 204(N) in FIG. 2. Third-party pricing entity 284 (FIG. 2C) is an optional entity that may or may not be one of suppliers 204(1) to 204(N) that may make price estimates. Third-party pricing entities may comprise, for example, automatic or semiautomatic pricing engines, price calculators, market analysts, etc.

Price order 266 reflects an order "document," digital or otherwise, specifying that a design is to be created by the supplier receiving the order and may include, for example, all or part of the associated CAD model for the part being priced from database 290. Such an order document may comprise document 224 as described above and may be generated as part of high level method step 115, also described above.

Operation of ordering module 272 is discussed in more detail with reference to FIG. 2D. At step 291, a price estimate is received as previously discussed. In this exemplary embodiment of ordering module 272, the price estimate is made for a particular part indirectly by a supplier via interface 277 and order portal 276. However, the price estimate may be optionally and directly made by a supplier or a third-party pricing entity 284 and associated with a CAD model from database 290 and stored within CAD model price estimate storage 278. Next, at step 293, user 282, whether another operational module or a direct individual user, accesses the previously received price estimate. In this step, user 282 may access a list of all stored CAD models and their associated prices within CAD model price estimate storage 278 via order portal 276. Subsequently, at step 295, user 282 places an order using the previously received price estimate associated with said CAD model. In this step, user 282 may elect to place an order on a particular CAD model from database 290 and its associated price by creating price order 266 that is sent to a supplier 204(1) to 204(N). However, it is noted that the entire ordering process may be automated such that it does not require any input from a human user.

In alternative embodiments of the present invention, third-party suppliers may be configured, for example, as a supplier or electronic marketplace in order to create a central marketplace in communication with suppliers. Such a marketplace may be established as described, for example, in the above-incorporated '008 application.

Figure 3:
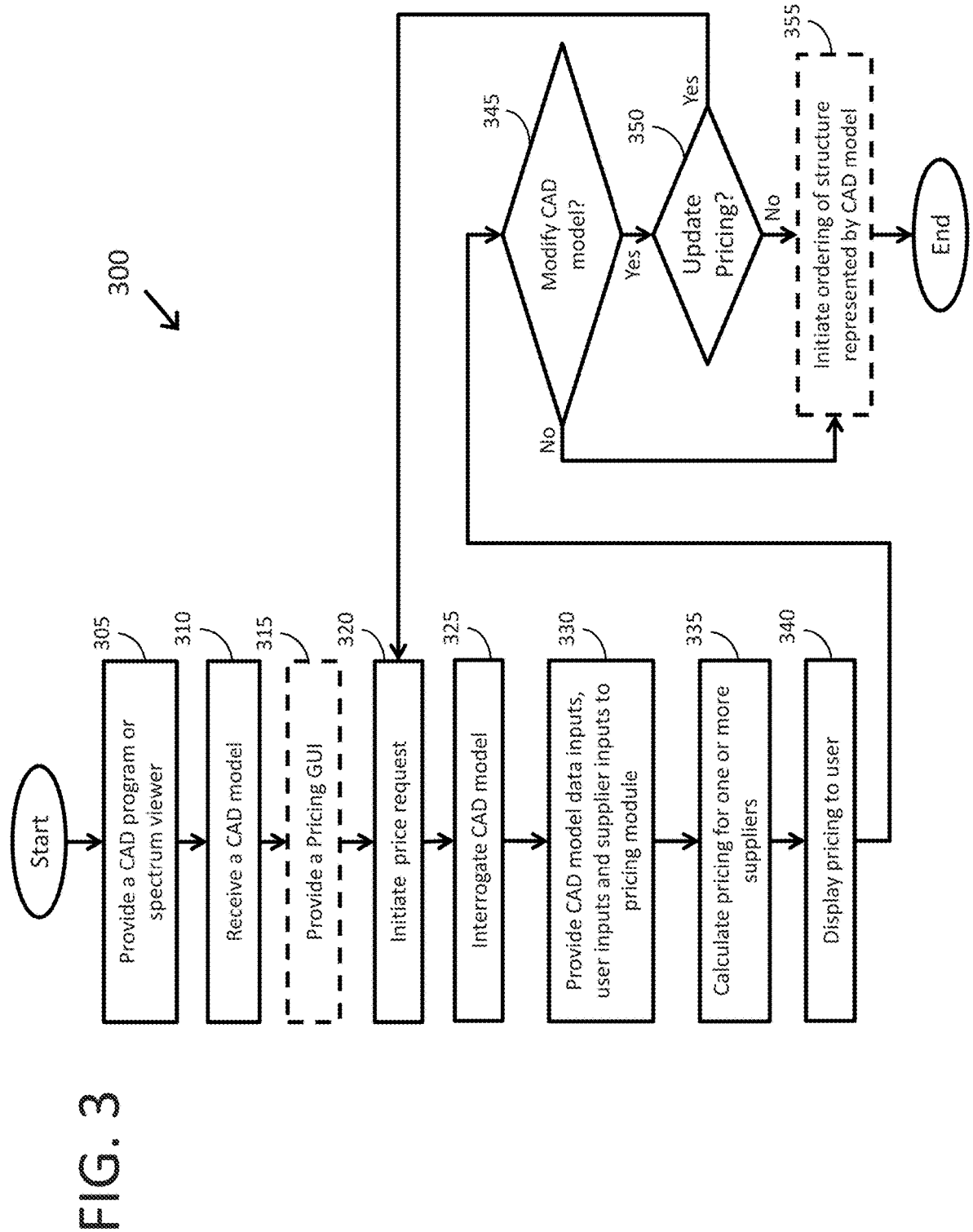
FIG. 3 is a flow diagram illustrating an exemplary method of providing prices and allowing a user to modify a design and view updated prices according to one embodiment of the invention.

FIG. 3 illustrates an exemplary method 300 of receiving prices, which can be implemented by one or more components of any system described herein, such as system 200 of FIG. 2. At optional step 305, software module 216 may provide a designer with a CAD program and/or spectrum viewer, such as CAD program 220, though in some embodiments users may use a CAD program and/or spectrum viewer obtained from a source other than software 216, such as a third-party software provider. Additionally, software module 216 may display a CAD GUI, such as GUI 228, in association with CAD program 220. At optional step 310, a user or other entity may provide one or more CAD models and/or representations thereof, such as CAD model 236, to system 200, for example, via CAD program 220.

At optional step 315, software module 216 may provide a pricing GUI, such as pricing GUI 248, either independently or as part of GUI 228 and/or CAD program 220. In some embodiments, software module 216 may perform step 315 simultaneously with step 305, while in other embodiments the software may require a user to select/initiate pricing command 240 of GUI 228 to initiate step 315. At step 320, software module 216 may initiate a price request as a function of a user's selection within GUI 228. Additionally or alternatively, software module 216 may initiate a price request automatically at step 320 without requiring any user input or selection beyond the information provided at step 310. In some embodiments, at step 320, a user may select suppliers from whom they wish to receive prices. At optional step 325, interrogator 209 may interrogate CAD model 236 in order to extract CAD model data such as geometry data, feature data and/or material data, among others, for use within pricing engine 213. In some instances, step 325 may not be required, as in the case of a material type change or other change that does not require the CAD model to be re-interrogated.

At step 330, marketplace 208, interrogator 209, and/or one or more components of software module 216 may provide inputs to pricing module 210, and particularly to a pricing engine such as pricing engine 213, such that prices can be calculated. Such inputs may include CAD model data inputs generated by interrogator 209 through interrogation of CAD model 236, such as geometry data, feature data, and/or material data, as well as user inputs such as quantity, desired lead time, material, inspection criteria, and/or finishing options. In some embodiments, software module 216 may request and/or retrieve user inputs via user pricing inputs GUI 256. In addition, pricing module 210 may provide supplier inputs, such as price parameter data 212, to a pricing engine such as pricing engine 213. Supplier price parameter data 212 may comprise various supplier information received from one or more suppliers, such as suppliers 204(1) to 204(N), via a supplier interface such as supplier interface 211. Suppliers may provide such supplier information to pricing module 210 by any of a variety of methods including, but not limited to, providing it prior or subsequent to a supplier receiving or otherwise observing a price request, at a regularly scheduled time (e.g., automatedly), and/or when any changes are made to supplier information by one or more of suppliers 204(1) to 204(N). Additionally or alternatively, preferably prior to a price request, supplier price data 212 may be populated with appropriate information, either manually or automatedly by, for example, pricing module 210 interfacing with one or more systems or databases associated with one or more suppliers 204(1) to 204(N), as appropriate. Such supplier information may include, for example, one or more performance ratings, lead times, fabrication capabilities, and/or contact information, among others. Supplier information may also include one or more of a supplier's various pricing inputs, such as labor costs, set-up costs, run costs, material costs, shipping costs, text data or comments, and/or finish costs, among others.

At step 335, pricing engine 213 may calculate prices for one or more suppliers. In some embodiments, such prices may include a total cost per total quantity, a cost per individual unit of quantity, or both. Pricing engine 213 may calculate such prices as a function of various CAD design data, such as material, geometric data and dimensions, finish options, user pricing input information, such as quantity or desired lead time, and/or supplier information, such as one or more labor costs, set-up costs, shipping costs, and/or other supplier pricing data. At step 340, software module 216 may display pricing to a user. At step 345, a user may choose to modify CAD model 236. If the user decides to make no modifications to CAD model 236, the price displayed to the user does not change and method 300 may proceed to step 355. Should the user decide to modify CAD model 236, method 300 may proceed to step 350. At step 350, system 200 may prompt the user to determine if the user desires updated pricing. If the user chooses to update pricing, the method may return to step 320, enabling the user to initiate another pricing request. Additionally or alternatively, the method may automatically initiate a pricing request upon a CAD model modification and return to step 320. If the user chooses not to update pricing, the method may proceed to step 355. At optional step 355, system 200 may allow a user to initiate the ordering of a structure represented by CAD model 236; in one embodiments, this may be such an order may be initiated via the selection and confirmation of one or more suppliers, such as suppliers 204(1) to 204(N). An exemplary embodiment of viewing and/or selecting prices and suppliers is described below in the context of FIG. 8.

Figure 4:
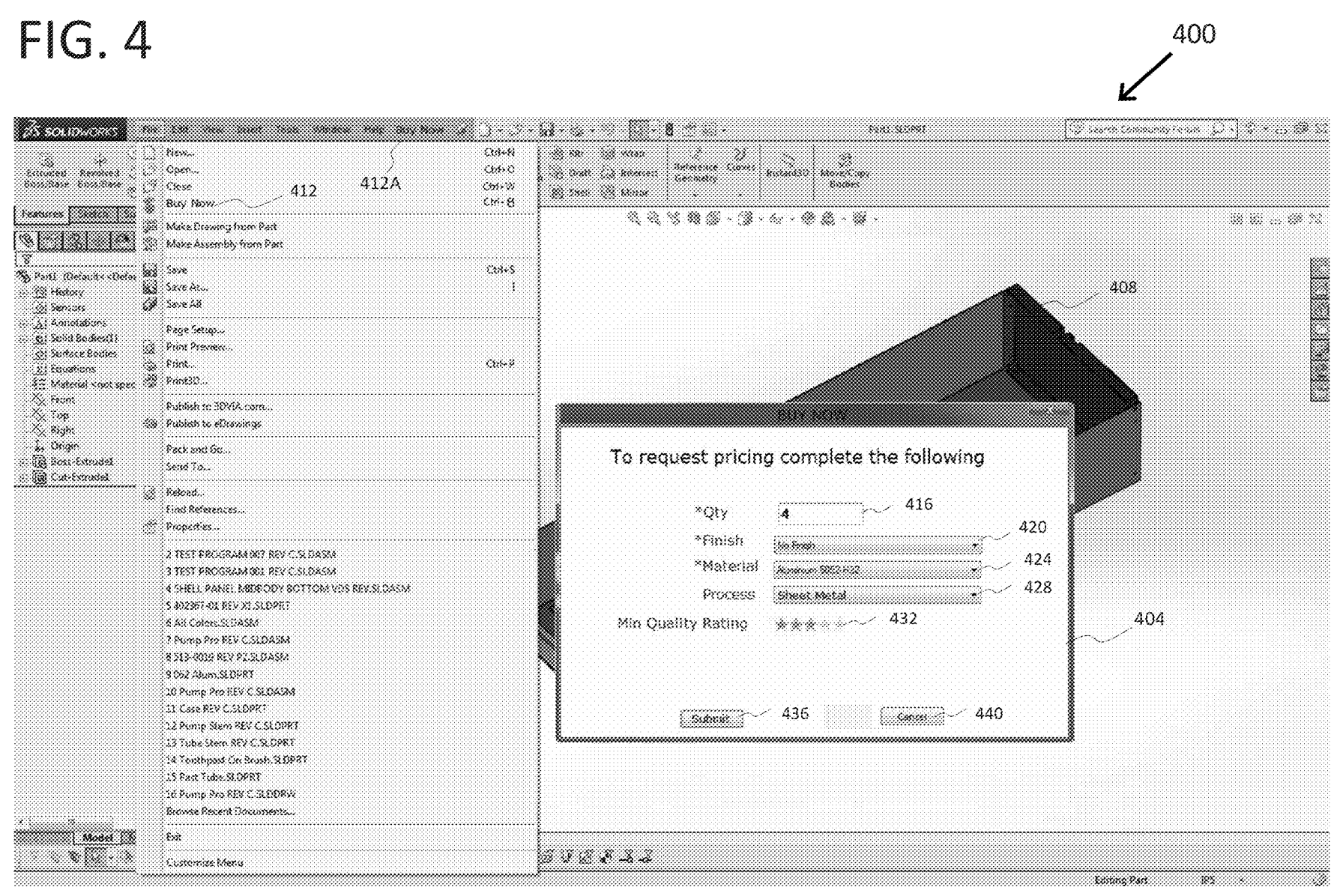

FIG. 4 illustrates a screenshot depicting exemplary aspects of a CAD program 400 that may, in some embodiments, correspond to CAD program 220 and/or GUI 228 of FIG. 2. Within CAD program 400, exemplary aspects of user pricing inputs GUI 404 are shown that may, in some embodiments, correspond to user pricing inputs GUI 256 of FIG. 2. As with user pricing inputs GUI 256, user pricing inputs GUI 404 may allow a user to view and/or select various pricing and non-pricing information for one or more of a plurality of inputs that may be useful or necessary in creating a price and/or fabrication order for a part such as CAD model 408, which may, in some embodiments, correspond to CAD model 236. Screenshot 400 may further include one or more "Buy Now" buttons 412, 412A and/or one or more other interface elements for causing user pricing inputs GUI 404 to be displayed.

User pricing inputs GUI 404 may include a quantity region 416 for allowing a user to input the desired quantity of the part represented by CAD model 408 to be fabricated, a finish region 420 for allowing a user to select a desired finish to be applied to the part, such as "No finish," "Anodize," or "Chromate," among others, and a material region 424 for allowing a user to select a material to be used in the fabrication of the part, such as "Aluminum 5052-H32" or "Stainless Steel," among others. User pricing inputs GUI 404 may additionally include a process region 428 for allowing a user to select a fabrication process to be used to fabricate the part, such as "Sheet Metal" or "Injection Molding," among others, a quality region 432 for allowing a user to select a minimum quality rating relating to potential suppliers, such as a three stars out of five rating or a five points out of ten rating, among others. User pricing inputs GUI 404 may further include a submit button 436 for submitting the data within user pricing inputs GUI 404 in order to generate pricing and a cancel button 440 for allowing a user to cancel their current selections within user pricing inputs GUI 404 and/or close user pricing inputs GUI 404, among others. Some regions may optionally be denoted with an asterisk symbol, here quantity region 416, finish region 420, and material region 424; these regions may be required to be completed by a user before submit button 436 may be selected, while regions without an asterisk, here process region 428 and quality region 432, may be considered optional. Notably, FIG. 4 depicts aspects of an exemplary implementation of steps 305, 310, 315, and 320 of method 300. For example, the provision of CAD program 400 is an embodiment of step 305, the provision of CAD model 408 is an embodiment of step 310, user selection of buy now button 412 initiates a price request by opening user pricing inputs GUI 404 as paralleled in step 315, and a user providing user inputs within user pricing inputs GUI 404 is an embodiment of step 320.

In FIG. 5, table 500 illustrates CAD model data inputs that may be provided as part of step 330 of FIG. 3 that serve as an example of data that may be extracted from a CAD model 236 by interrogator 209 for use in pricing engine 213. Table 500 includes variable name column 504 and variable value column 508. Variable name column 504 contains the names of various variables that may be extracted from CAD model 236 by interrogator 209 and may be used by pricing engine 213, such as length, width, thickness, and material, as well as features such as cut length, number of holes, number of bends, and others, as well as units associated with each variable when appropriate and/or necessary. Variable value column 508 includes the magnitude or value of each associated variable name and unit, as may be extracted by interrogator 209. These values may be presented in numerical form and/or in alphabetical form, as illustrated in FIG. 5, among others.

FIG. 6 is a table 600 illustrating contents of an example supplier pricing and capabilities database, which may form part or all of supplier price parameter data 212 within marketplace 208. Notably, in some embodiments, a user may maintain a list of supplier capabilities outside of marketplace 208, such as locally on the user's hardware or on a server owned, controlled, and/or accessible by the user, which may or may not be a part of software 216. Supplier column 604 may contain names of one or more suppliers that have provided information to supplier price parameter data 212, while labor column 608 may contain corresponding initial set-up costs and run time costs per hour for each supplier listed in the supplier column. For example, set-up costs per hour may consist of the hourly labor cost for one-time costs incurred at the beginning of a process, while run time costs per hour consist of the hourly labor cost for processes during the actual operation of the process; notably, these costs do not necessarily comprise an exhaustive list of labor costs. Material column 612 may contain material costs per pound charged by each supplier for various materials, such as aluminum and steel, among others. Finishing column 616 may contain minimum lot charges and costs per square inch charged by each supplier for a variety of finishing options such as anodize and chromate, among others. Markup column 620 may include a flat or percentage-based value relating the markup charged by the sales entity associated with each supplier, such as 0%, $100, 10%, or others. Constraints column 624 may contain various constraints that each supplier may have in its ability to fabricated a given part, such as maximum part size limitations, fabrication capabilities, and others.

Figure 7:
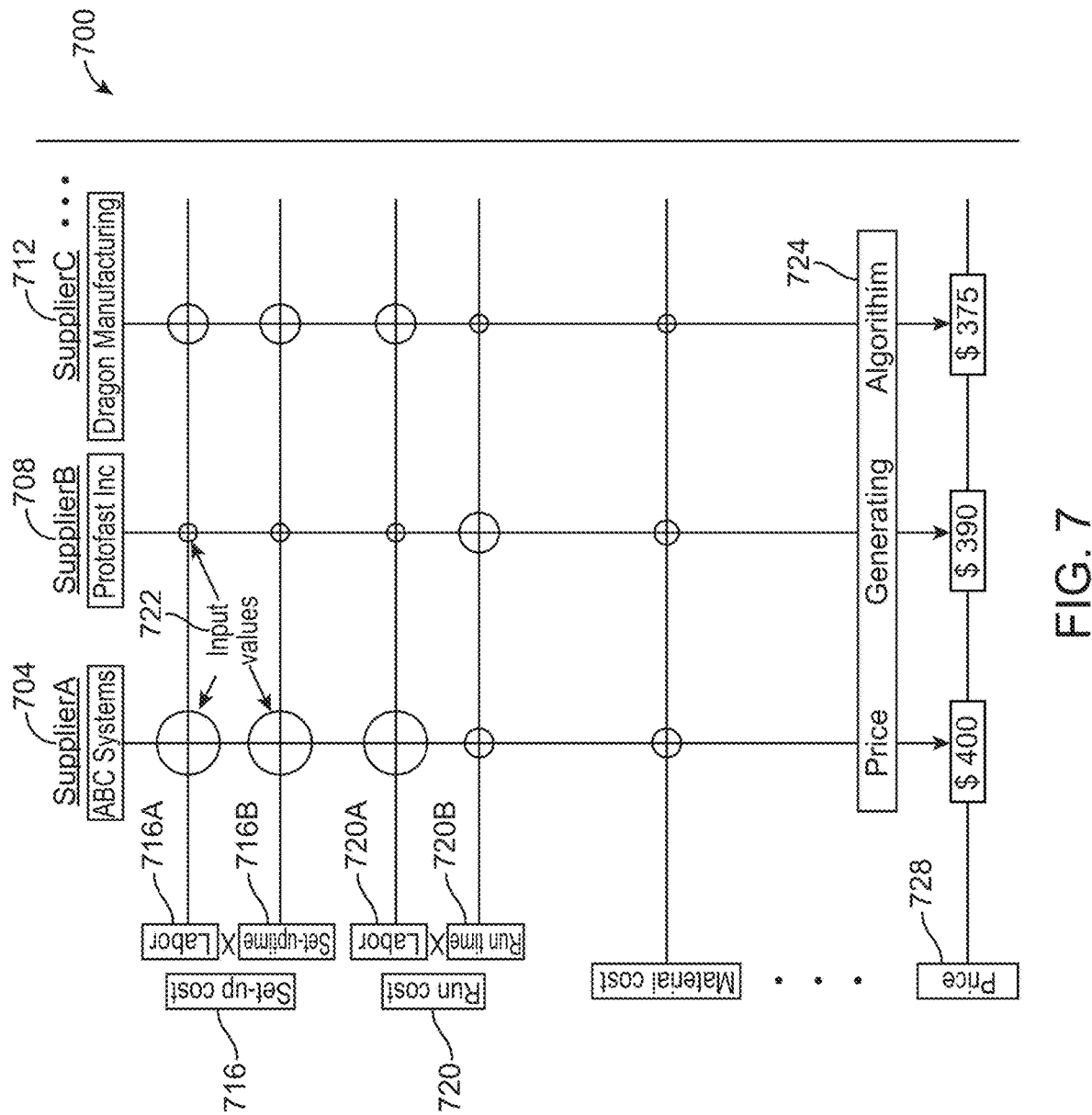
FIG. 7 is a diagrammatic representation of aspects of an exemplary automated multi-supplier price-generating process that can be used to generate prices for a plurality of suppliers.

Referring now to FIG. 7, and also to FIG. 2 as noted, FIG. 7 illustrates aspects of an exemplary automated multi-supplier price-generating process 700 that may be used in conjunction with pricing engine 213 of FIG. 2. In one embodiment, process 700 may generate prices for a plurality of suppliers that may each assign differing values to one or more variables to be provided as input to pricing engine 213. "Supplier A" column 704, "Supplier B" column 708, and "Supplier C" column 712 represent a plurality of suppliers that have submitted one or more pieces of supplier, capability, and/or pricing information into supplier price parameter data 212. Set-up cost row 716 represents factors that may influence a supplier's total cost of set-up in preparation for a manufacturing run and may include two set-up cost sub-rows 716A, 716B illustrating magnitudes of supplier-provided values for labor cost (the cost of labor per unit of time that a manufacturer charges) and set-up time (the amount of time that a manufacturer expects set-up to take for a manufacturing run), respectively. Though not illustrated in FIG. 7, set-up cost row 716 may additionally or alternatively include a row illustrating a magnitude for total cost of set-up, which software module 216 may calculate, for example, by multiplying supplier-provided set-up times by supplier-provided labor costs.

Run cost row 720 represents factors that may influence a supplier's total cost of performing a manufacturing run after set-up has been completed and may include two run cost sub-rows 720A and 720B illustrating magnitudes of supplier-provided values for labor cost and run time per unit (the amount of time that a manufacturer expects will be spent in the process of running a single part), respectively. Again, though not illustrated in FIG. 7, run cost row 720 may additionally or alternatively include a row illustrating a magnitude for total cost of a run per unit, which software module 216 may calculate, for example, by multiplying supplier-provided run times per unit by supplier-provided labor costs. Other rows, such as material costs, may also illustrate material cost per unit, as desired.

As shown in FIG. 7, input values 722 are circles of varying sizes located at the intersections of supplier columns, such as "Supplier A" column 704, and cost rows, such as set-up cost sub-rows 716A, 716B for labor costs and set-up time. Input values 722 may represent magnitudes of supplier-provided inputs; for example, the larger circle at the intersection of labor 716A and "Supplier A" column 704 represents a larger value/cost than the small circle at the intersection of labor 716A and "Supplier B" column 708. Input values 722 may also comprise specific numerical values and/or a range of values. Price generating algorithm 724 may comprise and/or represent a price generating algorithm, such as pricing engine 213, that may accept one or more supplier-provided inputs stored in, for example, supplier price parameter data 212 (i.e., input values 722) and, as a function of those one or more inputs, may generate a separate price for each supplier. After algorithm 724 executes, software module 216 may cause an interface like that of FIG. 7 to calculate a "Prices" row 728 containing one or more prices output from price generating algorithm 724. Prices may be associated with a requested quantity and may be calculated as a total price as shown, a piece price (not shown), or both (not shown). Such prices may reflect the variations in input values 722 between suppliers.

Figure 8:
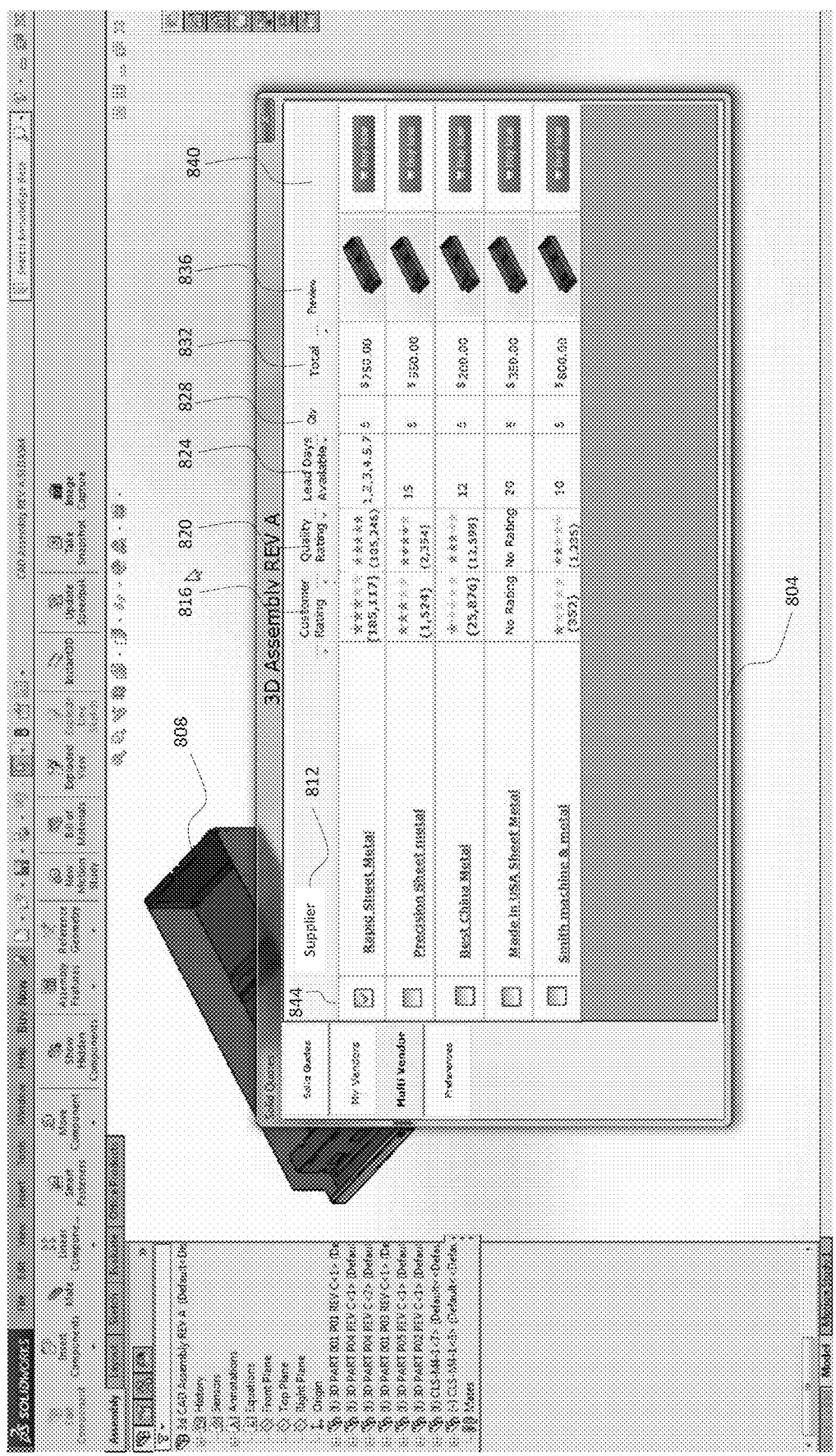
FIG. 8 is a representative screenshot depicting various aspects of an exemplary pricing display interface implemented in accordance with aspects of the invention.

FIG. 8 illustrates a screenshot depicting a CAD program 800 that may, in some embodiments, correspond to CAD program 220 and/or GUI 228 of FIG. 2. Within CAD program 800, exemplary aspects of a pricing GUI 804 are shown that may, in some embodiments, correspond to pricing GUI 248 of system 200 as it might be presented as part of step 125 of FIG. 1 and/or step 144 of FIG. 1A. As with pricing GUI 248, pricing GUI 804 may allow a user to view various pricing and non-pricing information for one or more of a plurality of suppliers offering pricing for a part such as CAD model 808 that may, in some embodiments, correspond to CAD model 236.

Pricing GUI 804 may include one or more of a supplier column 812 for displaying suppliers that have provided pricing for the fabrication of a part represented by CAD model 808, a customer rating column 816 for displaying the user's rating of each supplier, and a quality rating column 820 for displaying community quality ratings of each supplier. Pricing GUI 804 may additionally include one or more of a lead-time column 824 for displaying various lead time options for each supplier, a quantity column 828 for displaying the quantity of parts to be fabricated as specified by the user within user pricing inputs GUI 404, and a total price column 832 for displaying the total price offered by each supplier for fabrication. Pricing GUI 804 may further include one or more of a preview column 836 for displaying a preview image of the part based on CAD model 808, a "Buy Now" column 840 users can interact with to cause a system, such as system 200, to transmit a fabrication order to a supplier, and a selection column 844 for selecting one or more suppliers as the chosen fabricator(s) of the part. In some embodiments, pricing GUI 804 may allow a user to select one or more of a plurality of suppliers to which the user wishes to send a fabrication order by utilizing buttons within "Buy Now" column 840, as illustrated in FIG. 8. Notably, FIG. 8 depicts an exemplary embodiment of steps 340 and 355 of FIG. 3. The displaying of pricing within total price column 832 is an exemplary embodiment of step 340, and initiating the ordering of the part via the selection of a buy now button within "Buy Now" column 840 is an exemplary embodiment of step 355.

Figure 9:
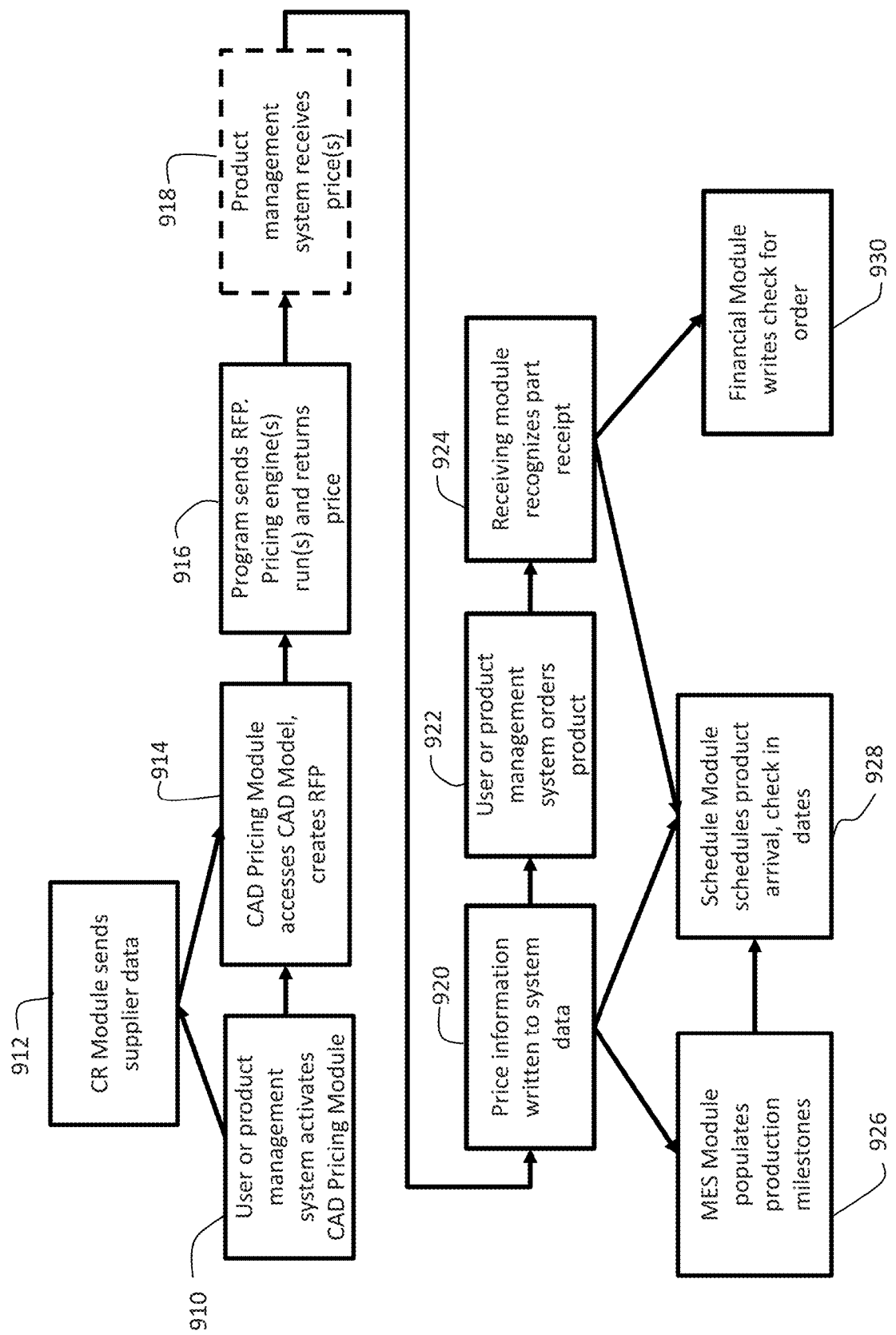
FIG. 9 is a flow diagram illustrating an exemplary work flow in one embodiment of the present invention.

As will be appreciated based on the disclosure of the various alternatives described above, embodiments of the invention incorporate a high level of interconnectedness among the functionality and modules at virtually every step of the pricing and ordering functions. FIG. 9 exemplifies an alternative, conceptual workflow, illustrating among other features, this high level of interconnectedness. The exemplary workflow may begin at 910 with a user or product program system operational module activating the CAD model pricing module as described. A primary workflow line extends over work flow stages 914, 916, as well as optional stage 918 to stage 920, where multiple optional branches may be followed. At this point in the exemplary workflow, processing may jump out to different model/modules and return as events unfold.

At first workflow stage 910, activation of the CAD pricing module may be done automatically by the product management system operational modules, or alternatively initiated manually by the user. Next on the straight line workflow is CAD pricing module accessing of the CAD model and creation of the price request 914. However, the workflow may jump out at location 912 to a customer relationship (CR) module to retrieve needed information on the supplier, such as preferred supplier identification or identified supplier communication information such as e-mail addresses or login information that feeds into the CAD model pricing module. Once the CAD model pricing module has accessed the CAD model, interrogated the model, derived data therefrom, and retrieved the data to generate the price request at 914, as described above, the workflow may proceed to 916 where the system sends the price request to pricing engines (or engine, whether internal or external) to return the requested price or prices as previously described. Optional workflow stage 918 adds capability for the product management system to receive prices as may be needed depending on whether the pricing engine is external or internal. For example, where there is one integrated, internal product management system comprising an internal CAD system, it may not be necessary to go to a marketplace or supplier or third party to run a pricing engine, in which case the prices would not be received from an external source.

Next workflow stage 920 comprises writing of the price information to the program management system data. In other words, a received price goes into operational modules of the system for utilization in accordance with the programed functionality of the operational modules. As just one example, the returned pricing data may be utilized at stage 926 in the manufacturing execution system module (MES) to populate production milestones based on returned pricing data. Scheduling also may be determined within a scheduling module at 928 based on the price information written in scheduled product arrival and check-in dates so these other modules are working with consistent information. Once operational modules have received required supplier information directly/indirectly from the pricing engine, other fields in related operational modules may be similarly populated.

Next on the primary workflow line at stage 922, the user or product management system orders the product. At this stage in the work flow, alternative embodiments may incorporate different levels of processing capability programmed for specific product situations. For example, if a price is returned below a threshold, there may be an automatic set point that simply initiates the order without further intervention. Conversely, if the price is returned above a set point, the system may prompt for user evaluation and approval before initiating an order. After an order is placed and one or more parts are received by a manufacturer, a receiving module recognizes receipt of the part, at workflow stage 924, and may record the part as actually received and prompt other modules to perform preprogramed functionality in response to the product receipt. For example, when the part is recorded as physically received at stage 924, workflow may switch to the schedule module again at 928 to modify scheduling information and process based on timing and number of parts received. Alternatively, receipt of products recorded at stage 924 may automatically prompt a financial module at workflow stage 930 to initiate payment for the received order.

Thus, as illustrated in the exemplary workflow of FIG. 9, there is a primary workflow through the pricing and ordering process, but there are also multiple branches at different work flow stages to other modules as dictated by required process and process timing in response to real world events. Processes are thus automated and information flows from those modules as needed to inform the pricing and ordering functions facilitated by the high degree of interconnectedness achieved through the modularized product management system.

As mentioned above, in some aspects the present invention is directed to an ecommerce marketplace that allows price requestors to solicit prices from one or more manufacturers for manufacturing one or more physical instantiations of one or more structures modeled in one or more computer models, such as a CAD model. As described below in detail, in some embodiments an ecommerce marketplace of the present disclosure is pricing-method-agnostic, meaning that it provides a price for any selected price-provider regardless of how that price-provider chooses that price to be determined. In some embodiments, an ecommerce marketplace of the present disclosure allows a price-provider to select a desired pricing method from among a predetermined set of pricing methods having differing numbers of pricing considerations. In some embodiments, an ecommerce marketplace of the present disclosure allows each price-provider to custom-configure how a price is determined and, in some cases, allows a price-provider to protect some or all of its pricing methodologies from access by others, including the ecommerce marketplace itself. These and other embodiments are described below in detail in conjunction with a robust example that covers all of these features, as well as other features. It is noted, however, that not all of the features described for this example need to be implemented together. Rather, these features can be implemented individually and/or in various subcombinations of one another.

Figure 10:
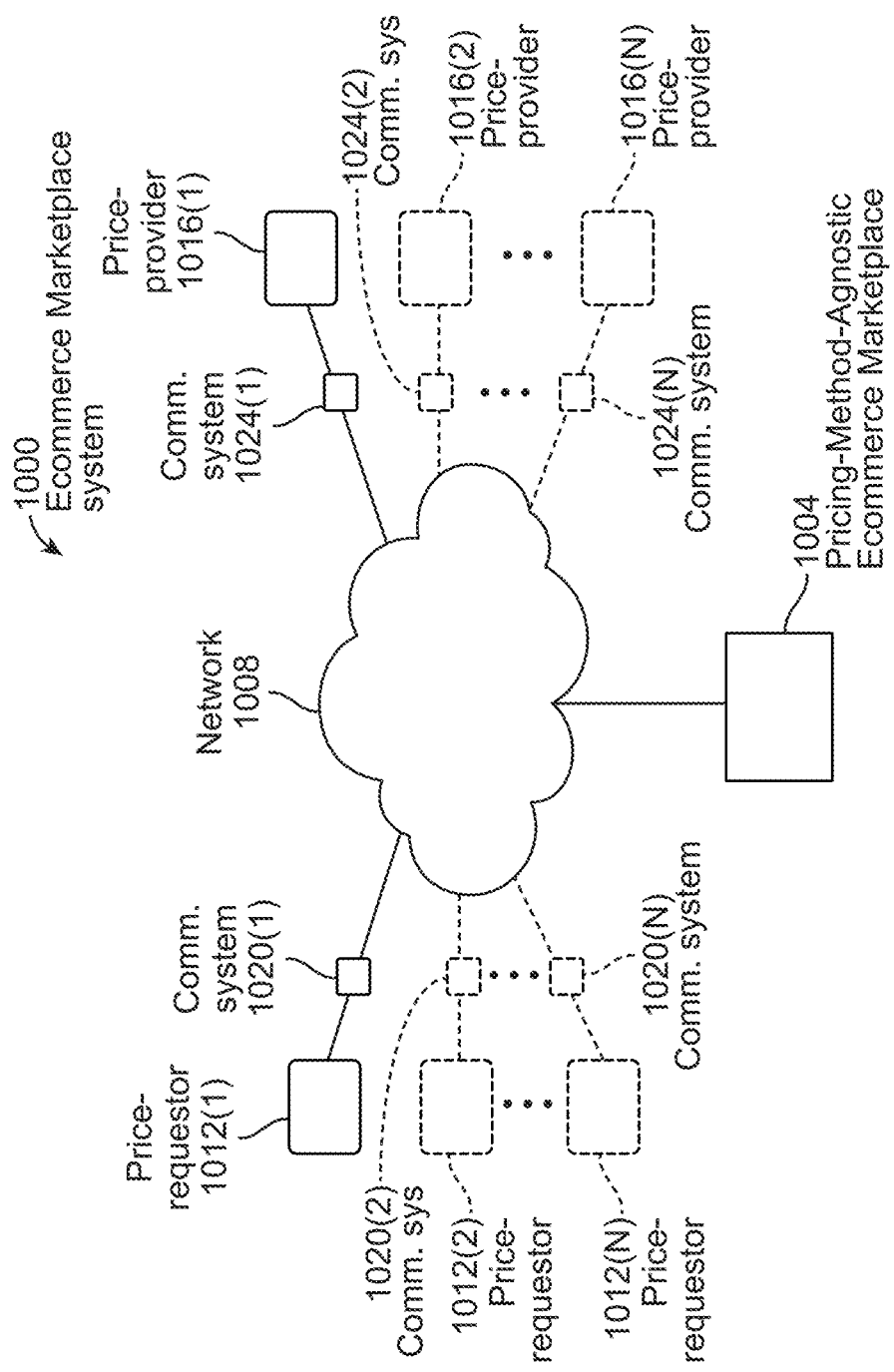
FIG. 10 is a high-level diagram illustrating a pricing-method-agnostic ecommerce marketplace system of the present invention.

For the sake of illustrating various aspects of the present invention, FIG. 10 illustrates an exemplary ecommerce marketplace system 1000 that includes a pricing-method-agnostic ecommerce marketplace 1004, a communications network 1008, a plurality of price-requestors 1012(1) to 1012(N), and a plurality of price-providers 1016(1) to 1016(N). At a high level, ecommerce marketplace 1004 provides basic functions of allowing each price-requestor 1012(1) to 1012(N) to request a price, from one or more of price-providers 1016(1) to 1016(N), for supplying one or more physical instantiations of one or more structures and, in response, provide such price(s) to that price requestor. In some embodiments, ecommerce marketplace 1004 may be implemented in one or more network computing devices, such as one or more webservers. As described, ecommerce marketplace 1004 may be configured to display or otherwise present prices to price-requestors 1012(1) to 1012(N) in a uniform format across multiple price-providers while giving each price-providers 1016(1) to 1016(N) complete control in how its price is determined.

For the sake of simplicity, the functional term "price-requestor" is used to refer to the person or intelligent software making a request for one or more prices via ecommerce marketplace 1004. As those skilled in the art will readily appreciate, a price-requestor, such as any one of price-requestors 1012(1) to 1012(N) can be any of a variety of people, such as a product designer and/or engineer, a project manager, a purchasing agent, a salesperson, a retail customer, hobbyist, among many others. A price-requestor, such as any one of price-requestors 1012(1) to 1012(N), may alternatively be any of a variety of intelligent software, such as, but not limited to: automated design software that is able to automatically verify a product design and, in response to such verification, automatically seek one or more supply prices using ecommerce marketplace 1004; a web-site containing model data that automatically associates a price using ecommerce marketplace 1004 to that model data; or an ERP system, that in response to an inventory threshold level order point being reached, automatically seeks one or more supply prices using ecommerce marketplace 1004 and subsequently orders according to set criteria.

Each price-requestor 1012(1) to 1012(N) may utilize a corresponding networked communications system 1020(1) to 1020(N) to make a request for price via communications network 1008. Each networked communications system 1020(1) to 1020(N) may be any suitable system, typically embodied in one or more computing devices, capable of effecting communications over communications network 1008, such as, but not limited to, a desktop computer, a laptop computer, a tablet computer, a smartphone, a webserver, an Internet appliance, a pair of smart glasses, a smartwatch, or any other system capable of the appropriate network communications. In this connection, communications network 1008 may include a global network, such as the Internet, one or more wide area networks, one or more local area networks, one or more cellular communications networks, one or more fiber-optic communications networks, one or more satellite communications networks, and one or more microwave communications networks, among others, and any combination thereof. Fundamentally, there is no limitation on the nature and character of communications network 1008.

Each price-provider 1016(1) to 1016(N) may be any of a variety of people or entities that can provide a price that may or may not be legally binding, depending on the circumstances, as between any price-requestor 1012(1) to 1012(N) and any person, group, or entity that would ultimately supply the instantiation(s) of the structure(s) for which a price is provided. Examples of a price-provider include an individual capable of manufacturing the requested structure(s), an individual representing one or more manufacturers, a manufacturer, a group of manufacturers, a "middleman" supplier, and a pricing entity having an agreement with a middleman supplier or one or more manufacturers, a broker, among others. Fundamentally, there is no limitation on the nature and character of a price-provider other than that the price they provide, contribute to, or authorize is a price to be honored, for example, for ordering or for further negotiation or verification, when a price-requestor accepts the price.

Each price-provider 1016(1) to 1016(N) may utilize a corresponding networked communications system 1024(1) to 1024(N) to make a request for price via communications network 1008. Each networked communications system 1024(1) to 1024(N) may be any suitable system, typically embodied in one or more computing devices, capable of effecting communications over communications network 1008, such as, but not limited to, a desktop computer, a laptop computer, a tablet computer, a smartphone, a webserver, an Internet appliance, a smartwatch, or any other device capable of the appropriate network communications.

As mentioned above, ecommerce marketplace 1004 is agnostic, i.e., it does not need price-providers 1016(1) to 1016(N) to calculate their prices in any particular way. To understand the myriad of pricing methods that an ecommerce marketplace of the present invention, such as ecommerce marketplace 1004, can be configured to handle, it is useful to understand a general model of how prices can be generated in the context of price requests based in part on providing computer-model data corresponding to one or more computer models of the structure(s) or portion thereof to be supplied based on an accepted price. Computer-model data, whether in the form of a CAD model file or in another form and format, contain information needed for determining an overall price. The type of information contained in the computer-model data can be diverse and varied and dependent upon the modeled structure(s) and the method(s) by which such structure(s) will be manufactured. Examples of manufacturing methods that can be needed for supplying one or more instantiations of one or more modeled structures include, but are not limited to, punching, cutting (e.g., saw, laser, water, shearing, etc.), bending, rolling, stamping, milling, drilling, planing, 3-dimensional printing, tapping, threading, patterning, weaving, sewing, bonding, welding, mechanical fastening, brazing, polishing, anodizing, silk-screening, painting, fusion coating, electroplating, extruding, molding, pressure forming, and hardening, among many others. The computer-model data at issue contain much, if not all, of the information needed to determine component prices for performing the manufacturing method(s) needed to manufacture a particular structure, portion of a structure, or set of structures. However, typical computer-model data do not present this information in a form that is directly correlated to the manufacturing method(s) to be used. Rather, the information needed to generate a price, referred to herein and in the appended claims as "model-based pricing information" needs to be extracted from the model information and in some cases the model information needs to be extracted and interpreted to create the model-based pricing information. Depending on the nature of the model information, its interpretation may be based on the manufacturing process(es) underlying the pricing.

For the sake of convenience in explaining an ecommerce marketplace of the present invention, such as ecommerce marketplace 1004 of FIG. 10, the functions of extracting and, as needed, interpreting model information from one or more computer models are considered to be performed by an "interrogator." It is noted that the term "interrogator" should not be construed to mean that the interrogator is necessarily a standalone piece of software, such as a software module, plugin, or application. Rather, the term "interrogator" should be construed to be software in any form or have any code arrangement that provides the requisite functionality. It is also noted that the operation and functioning of any particular interrogator may be tied to the format of the model information in the computer model(s) at issue. As a very small set of examples, an interrogator of the present disclosure may be designed and configured to work with any one or more of the following file-types, as denoted by their file extensions: .SLDPRT; .EASM; .STP; .IGS; .DWG; .DXF; .3DS; .3DM; .OBJ; .JPG; .TIF, .GIF, .PNG, .VRL, and .STL. Again, this list is not intended to be exhaustive, but merely illustrative. Fundamentally, there is no limitation on the type of computer file with which an interrogator of the present invention can be used other than it contain model information needed for generating a price to provide to a price-requestor, such as any one of price-requestors 1012(1) to 1012(N). It is noted that depending on the design of an ecommerce marketplace of the present invention, such as ecommerce marketplace 1004 of FIG. 10, the ecommerce marketplace may have more than one interrogator, for example, to accommodate differing types of computer models and/or model file types and/or to accommodate differing types of manufacturing types, such as sheet-metal manufacturing, machining, 3D printing, molding, etc.

A small set of high-level examples of model-based pricing information that an interrogator can be designed and configured to extract from one or more computer models includes: geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Those skilled in the art will readily understand that this list is not intended to be exhaustive, but merely illustrative. In some embodiments, model-based pricing information may be considered to be parsed into "raw" variables and "processed" variables. Raw variable are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counter-bore count, and processed variables may include cutout volume and machining operation setup count. In the context of an example for sheet metal fabrication based on a SolidWorks computer model, raw variables may include perimeter, total bend count, tap hole count, drilling count, and flat area, and processed variables may include parts per sheet, bend setup count, drilling types, and open-hem issues. As noted above, illustrative algorithms for an interrogator of the present disclosure may be found in the '033 application, which, as noted above, is incorporated by reference herein for its teachings of extracting pricing data from computer models, and in the '773 application, which, as mentioned above, is incorporated by reference herein for its teachings of particular interrogator engines.

An interrogator of the present disclosure may be sourced in any of a variety of ways. For example and as will be further understood from examples described below, an ecommerce marketplace of the present disclosure, such as ecommerce marketplace 1004 of FIG. 10 may build and provide its own interrogator(s) based on the type(s) of manufacturing and type(s) of computer model(s) that the ecommerce marketplace is set up to handle. As another example, an interrogator of the present disclosure may be sourced from a price-provider, such as any one of price-providers 1016(1) to 1016(N). As yet another example, an interrogator of the present disclosure may be sourced from a third party, for example, an open-source provider or a provider that specializes in providing interrogators.

It is noted that FIG. 10 does not show any interrogators to avoid giving the reader an impression that an interrogator of the present invention has to be tied to any particular entity, such as ecommerce marketplace 1004 or any of price-providers 1016(1) to 1016(N). On the contrary, each interrogator associated with a pricing-method-agnostic ecommerce marketplace system of the present invention, such as pricing-method-agnostic ecommerce marketplace system 1000 of FIG. 10, can be provided in any suitable manner, may be under the control of any person or entity, and may be located in any one or more suitable locations. For example, any particular interrogator may be under the control of and/or located with ecommerce marketplace 1000, under the control of and/or located with any of price-providers 1016(1) to 1016(N), or under the control of and/or located with a third party (not shown), or any combination thereof.

Model-based pricing information is typically not the only information on which a price from any particular price-provider, such as any one of price-providers 1016(1) to 1016(N), is based. Rather, additional pricing information obtained from outside the computer-model data will typically be needed for generating any given price. For the sake of convenience, such additional pricing information is referred to herein and in the appended claims as non-model pricing information and may be obtained from any one or more sources, such as a price-requestor (e.g., any one of price-requestors 1012(1) to 1012(N)) and/or one or more databases (not shown) previously populated with pertinent non-model pricing information. Examples of non-model pricing information include, but are not limited to, quantity, delivery address, shipping method, delivery schedule, material(s) (when not provided as model information), finish(es) (when not provided as model information), payment terms, loyalty code(s), discount code(s), and specification of particular manufacturing method(s), among others. Those skilled in the art will readily understand that this list is not intended to be exhaustive, but merely illustrative. Collectively, all information needed for any particular price-provider, such as any one of price-providers 1016(1) to 1016(N), to determine a price based on a particular request is referred to herein and in the appended claims as "request-input pricing information." In this disclosure, request-input pricing information comprises model-based pricing information and non-model pricing information.

The request-input pricing information is input into a pricing engine, which calculates the price that ecommerce marketplace 1004 provides to the corresponding one of price-requestors 1012(1) to 1012(N) that has made the request for the price. As used herein and in the appended claims, a "pricing engine" is software that comprises pricing algorithms that calculate a price based on the request input pricing information. As with the interrogator, the use of the term "pricing engine" should not be construed to mean that the pricing engine is necessarily a standalone piece of software, such as a software module, plugin, or application. Rather, the term "pricing engine" should be construed to be the conglomeration of all of the software-implemented pricing algorithms needed to calculate the price ultimately provided to the corresponding price-requestor, such as any one of price-requestors 1012(1) to 1012(N), regardless of the physical location of the software-based algorithms. Indeed, and as described below in connection with detailed examples, in some embodiments the software containing the pricing algorithms may be componentized, with differing components residing at differing physical locations, for example, for the purpose of allowing a supplier, such as any one of price-providers 1016(1) to 1016(N), to keep their algorithms proprietary.

In a manner similar to an interrogator of the present disclosure, a pricing engine of the present disclosure or any component thereof, may be sourced in any of a variety of ways. For example and as will be further understood from examples described below, an ecommerce marketplace of the present invention, such as ecommerce marketplace 1004 of FIG. 10 may build and provide its own pricing engine(s) and/or pricing-engine component(s) based on the type(s) of manufacturing and type(s) of computer model(s) that the ecommerce marketplace is set up to handle. As another example, a pricing engine of the present disclosure or component(s) thereof may be sourced from a price-provider, such as any one of price-providers 1016(1) to 1016(N). As yet another example, a pricing engine of the present invention or component(s) thereof may be sourced from a third party, for example, an open-source provider or a provider that specializes in providing pricing engine and/or pricing-engine components. Illustrative algorithms for such a pricing engine of the present disclosure may be found in the '033 application, which, as noted above, is incorporated by reference herein for its teachings of generating prices based on request-input pricing information. It is noted that a pricing engine of the present disclosure may be designed and configured to determine prices or one or more components of the prices returned to price-requestors 1012(1) to 1012(N)

based on experiential data accumulated on a wide basis (such as "big data" with or without self-learning and/or adaptive algorithms) rather than detailed algorithms that consider only individual features of each computer model at issue. Such experiential data may be obtained in any of a variety of ways, such as from online data repositories that may develop over time and/or by collecting data from any of a wide variety of sources. Correspondingly, an interrogator corresponding to a pricing engine that includes experiential data pricing may be designed and configured according to the input needs of the pricing engine. As a simple example, if experiential data pricing is for a 3D-printed object, and the experiential data collected only requires the overall volume of the design to be printed, then the corresponding interrogator need only query the computer model data and return a volume. In a slightly more complex example, if the experiential data requires total volume and number of scaffolds (i.e., temporary support structures needed only during printing), then the corresponding interrogator need only output the total volume and number of scaffolds needed for the particular design at issue.

Figure 11:
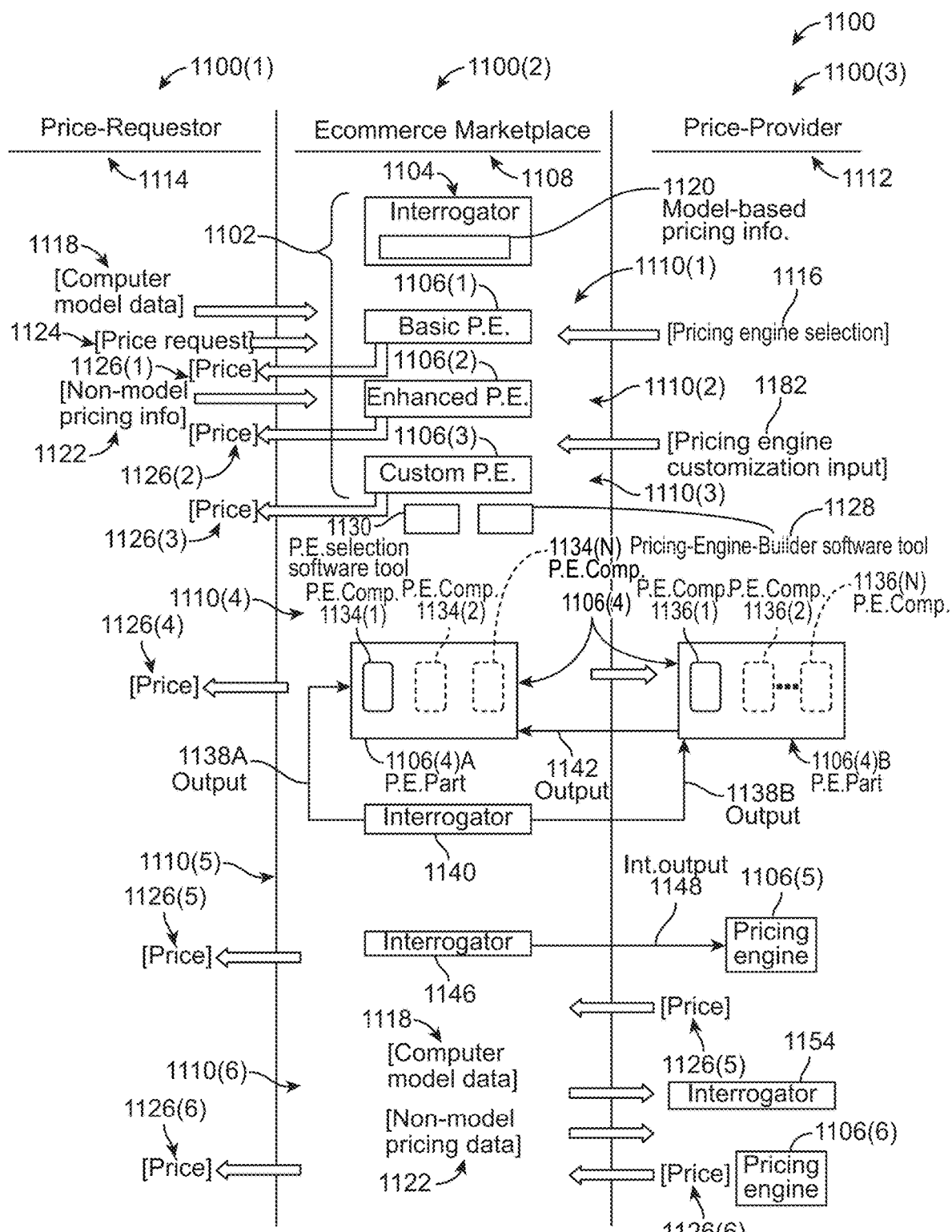
FIG. 11 is a diagram illustrating exemplary pricing methods that can be used with a pricing-method-agnostic ecommerce marketplace system of the present invention.

With the basic concepts of an interrogator for providing model-based pricing information, a pricing engine for generating a price, and an ecommerce marketplace for providing the price, following are some examples of pricing methods that an ecommerce marketplace of the present invention, such as ecommerce marketplace 1004 of FIG. 10, can be configured to handle. Referring to FIG. 11, this figure contains a diagram 1100 that graphically illustrates these examples in terms of pricing-information sourcing, data flow, interrogator location, pricing-engine and interrogator sourcing; pricing-engine location(s), and pricing-engine character, among other things. As seen in FIG. 11, diagram 1100 is partitioned into three vertical columns, a price-requestor column 1100(1), an ecommerce marketplace column 1100(2), and a price-provider column 1100(3) that represent, respectively, 1) any price-requestor, such as any one of price-requestors 1012(1) to 1012(N) of FIG. 10, 2) an ecommerce marketplace of the present invention, such as ecommerce marketplace 1004 of FIG. 10, and 3) any price-provider, such as any one of price-providers 1016(1) to 1016(N) of FIG. 10. These three columns 1100(1) to 1100(3) indicate, as appropriate, the source of the indicated information or action, the physical location and/or control and/or ownership of the relevant software component(s). For the sake of simplicity, each interrogator and each pricing engine mentioned in the context of FIG. 11 may be assumed to be the same as or similar to any of the interrogators and pricing engines described above.

Diagram 1100 illustrates six exemplary pricing methods 1110(1) to 1110(6) to illustrate the power and flexibility of a pricing-method-agnostic ecommerce marketplace of the present invention, such as pricing-method-agnostic ecommerce marketplace 1004 of FIG. 10. Referring to FIG. 11, this figure illustrates a pricing scenario 1102 in which an interrogator 1104 and a plurality of pricing engines, here three pricing engines 1106(1) to 1106(3) are under the control of ecommerce marketplace 1108. With three pricing engines 1106(1) to 1106(3), pricing method scenario 1102 represent the first three pricing methods 1110(1) to 1110(3) of the six illustrated pricing methods 1110(1) to 1110(6). In this example pricing methods 1110(1) to 1110(3) range from a basic pricing method 1110(1) utilizing pricing engine 1106(1) to an enhanced pricing method 1110(2) utilizing an enhanced pricing engine 1106(2) to a customized pricing method 1110(3) utilizing a custom pricing engine 1106(3). The three pricing methods 1110(1) to 1110(3) corresponding respectively to pricing engines 1106(1) to 1106(3) may be viewed along a sophistication continuum, with pricing method 1110(1) being the least sophisticated to pricing method 1110(3) being the most sophisticated of the three pricing methods. As an illustration of an exemplary pricing method scenario utilizing three pricing engines 1106(1) to 1106(3), ecommerce marketplace 1108 may offer each price-provider 1112 all three pricing methods 1110(1) to 1110(3) and allow the price-provider to select which one it wants the ecommerce marketplace to use to calculate prices when requested by a price-requestor 1114. Ecommerce marketplace 1108 may charge price-provider 1112 a different amount depending on which one of pricing methods 1110(1) to 1110(3) the price-provider selects.

For example, ecommerce marketplace 1108 may provide basic pricing method 1110(1) at no cost to price-requestor 1114. However, while interrogator 1104 may be configured to output 1,000 pieces of information that can serve as model-based pricing information, basic pricing engine 1106(1) may be configured to utilize only a subset, say, for example, 10 or 20 pieces, of the possible 1,000 pieces of information output by the interrogator. Consequently, pricing method 1110(1) may provide a, relatively speaking, roughly calculated price that may or may not allow a price-provider 1112, competing on a particular price request with other price-providers, to win on any particular request and/or to provide a price that is lower than it would typically provide. However, a price-provider 1112 that selects basic pricing method 1110(1), as illustrated by pricing engine selection 1116(1), may be willing to accept a lower chance of winning a particular bid and/or not making as much profit, for example, if it is using ecommerce marketplace 1108 to supplement an otherwise robust business outside this particular ecommerce marketplace.

As illustrated in FIG. 11, price-requestor 1114 provides ecommerce marketplace 1108 with computer-model data 1118 containing model-based pricing information 1120 that interrogator 1104 extracts and/or interprets and provides to basic pricing engine 1106(1). As noted above, interrogator 1104 may be configured to extract 1,000 pieces of model-based pricing information 1120, but basic pricing engine 1106(1) may be configured to use only a subset of that information. Price-requestor 1114 also provides ecommerce marketplace 1108 with non-model pricing information 1122 and a price request 1124 that requests price-provider 1112 to provide a price 1126(1), which, after the ecommerce marketplace executes pricing method 1110(1), the ecommerce marketplace provides to the price-requestor. Price request 1124 may include a designation of one or more price-providers 1112 from which price-requestor 1114 would like to receive a bid, i.e., price, or, alternatively, may not, thereby opening the price request to all price-providers capable of manufacturing the structure. Regarding price 1126(1) and other prices described herein in connection with FIG. 11, the price may include not only a monetary amount but also other information, such as necessary lead time(s), delivery information (including constraints and substitutions), and manufacturing information (including method(s) to be used, manufacturing constraints, and substitutions, e.g., material substitutions, purchased part substitutions, and finish substitutions), among others.

If a price-provider 1112 would like to utilize a more sophisticated pricing engine that considers more pieces of information output by interrogator 1104 so that the corresponding price 1126(2) is more precise, then the price-provider may select, as indicated by pricing engine selection 1116, enhanced pricing engine 1106(2) of pricing method

1110(2). In exchange for utilizing enhanced pricing engine 1106(2), ecommerce marketplace 1108 may charge the price-provider for the greater sophistication. For example, ecommerce marketplace 1108 may charge price-provider 1112 a periodic fee or if the structure is ordered, a percentage of the order price, among other payment arrangements. In the exemplary scenario wherein interrogator 1104 provides 1,000 pieces of information that can be used for determining pricing, enhanced pricing engine 1106(2) may utilize some number of those pieces greater than the number used by basic pricing engine 1106(1), such as 200 to 500 pieces of information when the basic pricing engine uses fewer than 200 pieces of that information. Enhanced pricing engine 1106(2), because of the greater amount of information used to calculate a price, can provide a more precise price than basic pricing engine 1106(1). It is noted that two "stock" pricing engines 1106(1) and 1106(2) are illustrated for simplicity. In other embodiments, an ecommerce marketplace of the present invention may have more or fewer than two (including no) stock pricing engines. In the case of more than two stock pricing engines, they may have differing levels of sophistication and precision. In the case of no stock pricing engines, such an ecommerce marketplace may have one or more of the other types of pricing engines described below.

If price-provider 1112 wants even more control and/or confidence about the precision of the price it provides to price-requestor 1114, the price-provider may select custom pricing engine 1106(3) that outputs corresponding price 1126(3). Custom pricing engine 1106(3) may be provided in any of a variety of manners. For example, in some embodiments, ecommerce marketplace 1108 may be configured to allow price-provider 1112 to provide its own pricing engine to the ecommerce marketplace, which then becomes custom pricing engine 1106(3). In some embodiments, ecommerce marketplace 1108 may be configured to allow price-provider 1112 to use a marketplace-provided pricing-engine-builder software tool 1128 to build custom pricing engine 1106(3). For example, pricing-engine-builder software tool 1128 may allow price-provider 1112 to select the desired outputs of interrogator 1104 as inputs for custom pricing engine 1106(3) and to select, modify, and/or provide suitable algorithms for the type(s) of manufacturing and manufacturing methods needed. In some embodiments, ecommerce marketplace 1108 may be configured to allow price-provider 1112 to select a pricing engine and/or component(s) thereof from a third party source, such as an open-source provider or other provider of custom pricing engines and/or pricing-engine components. In one example, ecommerce marketplace 1108 may provide a pricing-engine-selection software tool 1130 that allows price-provider 1112 to select from among a plurality of custom pricing engines from differing sources. From the perspective of price-provider 1112, the customization of pricing engine 1106(3) by the price-provider is indicated by pricing-engine customization input 1132.

In each of pricing methods 1110(1) to 1110(3) described above, interrogator 1104 and pricing engines 1106(1) to 1106(3) are all under control of ecommerce marketplace 1108. However, as noted above, in some cases a particular price-provider 1112 may not want to share one or more pricing algorithms with ecommerce marketplace 1108 in order to keep such algorithm(s) (i.e., pricing-engine components 1134(1) to 1134(N)) proprietary, but otherwise would want to use pricing-engine components 1136(1) to 1136(N) provided by the ecommerce marketplace. In such a case, ecommerce marketplace 1108 may be configured to provide a pricing method 1110(4) that effectively provides a split pricing engine 1106(4) having two parts, part 1106(4)A, which contains pricing-engine components 1134(1) to 1134(N), and part 1106(4)B, which contains pricing-engine components 1136(1) to 1136(N), with parts 1106(4)A and 1106(4)B split, respectively, between the ecommerce marketplace and price-provider 1112 at issue.

In the example shown, split pricing engine 1106(4) uses outputs 1138A and 1138B from an interrogator 1140 under control of ecommerce marketplace 1108, with outputs 1138A being provided to local pricing-engine part 1106(4)A and outputs 1138B being provided to pricing-engine part 1106(4)B, which is under control of price-provider 1112. Similarly, and depending on the nature of pricing engine components 1134(1) to 1134(N) and 1136(1) to 1136(N), some of non-model pricing information 1122 may be provided to local pricing-engine part 1106(4)A and other of the non-model pricing information may be provided to pricing-engine part 1106(4)B. Also in this example, the output 1142 of pricing-engine part 1106(4)B may be provided to pricing-engine part 1106(4)A for inclusion in an overall price 1126(4) that ecommerce marketplace 1108 provides to price-requestor 1114. Importantly, price request 1124 may be the same as in any other pricing method 1110(1) to 1110(6), with the pricing method used by any particular price-provider 1112 being inconsequential to price-requestor's interactions with ecommerce marketplace 1108.

As an illustration of the usefulness of split pricing engine 1106(4), interrogator 1140 and the split pricing engine may be designed and configured for providing a price for manufacturing and shipping a certain number of instantiations of a 3D-printable object modeled in computer-model data 1118. In this example, to print the instantiations, the object requires extensive scaffolding and extensive infill. Scaffolding is temporary printed support needed to support one or more portions of the object until those portions are self-supported. Once the object is completed, the scaffolding is removed and discarded or recycled. As can be appreciated, optimizing scaffolding and associated printing and other costs can allow price-provider 1112 to be more competitive in overall pricing. Infill is structure and material provided in one or more interior portions of a 3D-printed object to provide sufficient support to the shell of the object. Similar to scaffolding, it can be desirable to optimize infill and associated printing and other costs so that price-provider 1112 can be price competitive with other bidders. When price-provider 1112 utilizes proprietary algorithms for determining scaffolding and infill requirements and associated costs, the price-provider may want to prevent others from accessing those algorithms. Consequently, price-provider 1112 may decide that such algorithms will be implemented as at least some of pricing-engine components 1136(1) to 1136(N) on pricing-engine part 1106(4)B that is under the control of the price-provider. However, price-provider 1112 may otherwise be fine with using pricing-engine component 1134(1) to 1134(N) provided by local pricing-engine part 1106(4)A provided by ecommerce marketplace 1108, thereby utilizing split pricing engine 1106(4).

FIG. 11 illustrates a fifth pricing method 1110(5) in which interrogator 1146 is provided by ecommerce marketplace 1108, but entire pricing engine 1106(5) is provided by and under the control of price-provider 1112. One reason price-provider 1112 may elect to use pricing method 1110(5) is to keep its pricing engine 1106(5) completely hidden from others to keep it proprietary. In this scenario, interrogator 1146 interrogates computer-model data 1118 and ecommerce marketplace 1108 sends interrogator output 1148 and non-model pricing information 1122 to pricing engine 1106(5), which then calculates an overall price 1126(5) that is provided to the ecommerce marketplace for providing to price-requestor 1114. As with pricing method 1110(4) utilizing split pricing engine 1106(4), pricing method 1110(5) utilizing pricing engine 1106(5) that is completely outside the control of ecommerce marketplace 1108, the fact that pricing engine 1106(5) is not under the control of the ecommerce marketplace has no effect on the interaction of price-requestor 1114 with the ecommerce marketplace.

For a price-provider 1112 that wants to participate in ecommerce marketplace 1108 but that wants complete control over providing a price 1126(6) to price-requestor 1114 making price request 1124, the ecommerce marketplace may provide that price-provider with the option of pricing method 1110(6) in which an entire interrogator 1154 and an entire pricing engine 1106(6) are provided and controlled by the price-provider. In this scenario, ecommerce marketplace 1108 essentially passes computer-model data 1118 to interrogator 1154 and provides non-model pricing information 1122 to pricing engine 1106(6) and then receives overall price 1126(5) and presents the overall price to price-requestor 1114.

Figure 12:
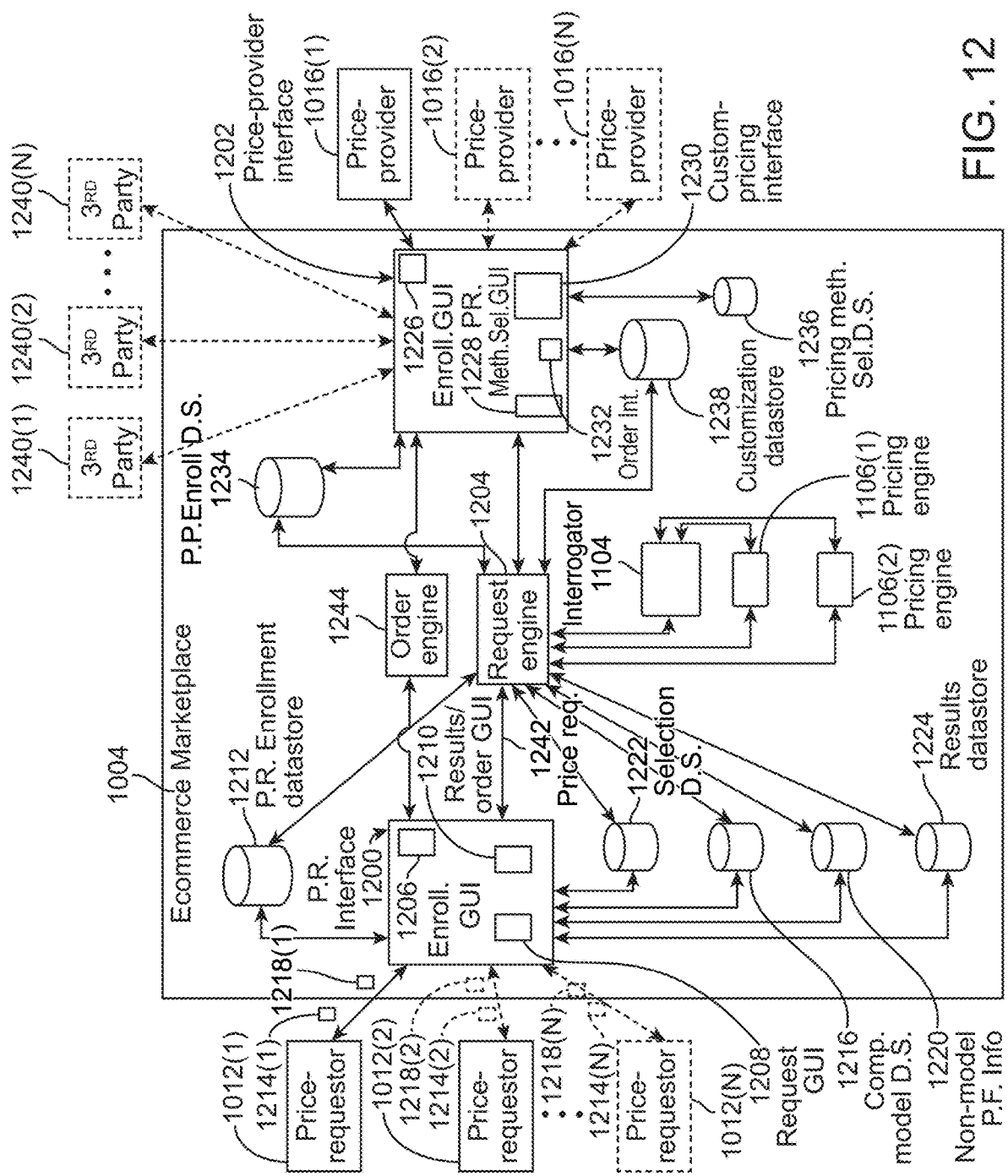
FIG. 12 is a high-level diagram illustrating the pricing-method-agnostic ecommerce marketplace of FIG. 10.

FIG. 12 illustrates an exemplary embodiment of ecommerce marketplace 1004 of FIG. 10 that is designed and configured to implement at least pricing methods 1110(1) to 1110(6) described above in connection with FIG. 11 in the context of plurality of price-requestors 1012(1) to 1012(N) and plurality of price-providers 1016(1) to 1016(N) desiring to participate in the ecommerce marketplace. As seen in FIG. 12, in this embodiment ecommerce marketplace 1004 includes a price-requestor interface 1200, a price-provider interface 1202, and a request engine 1204. Price-requestor interface 1200 is designed and configured to allow price-requestors 1012(1) to 1012(N) to interact with ecommerce marketplace 1004, for example, to enroll in the ecommerce marketplace to take advantage of its services, to seek prices for having structures manufactured for it, to review those prices, and to place manufacturing orders. In this connection, price-requestor interface 1200 includes an enrollment graphical user interface (GUI) 1206, a request GUI 1208, and a results/ordering GUI 1210. Enrollment GUI 1206 allows each price-requestor 1012(1) to 1012(N) to enroll with ecommerce marketplace 1004, for example, by providing its name and contact information, along with any other information that the ecommerce marketplace may wish to collect for each price-requestor. Correspondingly, ecommerce marketplace 1004 may include a price-requestor enrollment datastore 1212 that stores all of the enrollment data for all of the enrolled price-requestors 1012(1) to 1012(N).

Request GUI 1208 may include a user-initiated GUI screen (see, e.g., pricing inputs GUI 404 of FIG. 4 as a non-limiting example) that ecommerce marketplace 1004 presents to any one of price-requestors 1012(1) to 1012(N) desiring to submit a request for price for manufacturing and providing an order of one or more structures modeled in computer-model data 1214(1) to 1214(N). Request GUI 1208 may be designed and configured to allow each of price-requestors 1012(1) to 1012(N) making a request to upload the corresponding subject computer-model data 1214(1) to 1214(N) to ecommerce marketplace 1004 if not already uploaded and stored in a computer-model datastore 1216 and/or select computer-model data already stored in the computer-model datastore. Request GUI 1208 may also be designed and configured to allow the corresponding price-requestor 1012(1) to 1012(N) to input non-model pricing information 1218(1) to 1218(N) that is not already uploaded and stored in a non-model pricing information datastore 1220 and that may be needed for generating a price. Any newly input non-model pricing information 1218(1) to 1218(N) may be stored in non-model pricing information datastore 1220. Examples of non-model pricing information that may be included in non-model pricing information 1218(1) to 1218(N) are provided above and are not repeated here.

Because ecommerce marketplace 1004 allows price-providers 1016(1) to 1016(N) to compete for orders from price-requestors 1012(1) to 1012(N) and because any price-requestor may desire to limit the number of price-providers invited to provide a price, request GUI 1208 may also include a price-provider selection GUI (not shown) that allows a requesting price-requestor to select a subset of price-providers from which it desires to see prices. Such price-provider selection GUI may include any sort of selectors and/or filters (such as location and/or shipping-distance filters, a quality rating filter), among other things. For each request, ecommerce marketplace 1004 may store the selection(s) made by corresponding price-requestor 1012(1) to 1012(N) in a suitable price-provider-selection datastore 1222. Depending on the configuration of ecommerce marketplace 1004, price-requestor interface 1200 may additionally (or alternatively) include a non-GUI request interface (not shown) that allows requests to be made through other software, such as ERP software, PLM software, MRP software, and a standalone software application, among others. Also, depending on how ecommerce marketplace 1004 is deployed among various computing devices, request GUI 1208, and in some cases other or all parts of price-requestor interface 1200, may be implemented as a software module within base software having other functionality, such as CAD software, ERP software, PLM software, and MRP software, among others, for example, in a manner similar to any of the manners described above relative to FIGS. 2, 2A to 2C, and 3.

Results/ordering GUI 1210 may be designed and configured to provide each requesting price-requestor 1012(1) to 1012(N) with the price(s) and/or other results from the one or more price-providers 1016(1) to 1016(N). Such other results can be anything that a price-provider 1016(1) to 1016(N) or ecommerce marketplace 1004 itself wants to convey to the requesting price-requestor 1012(1) to 1012(N) in addition to or in lieu of a price. Examples of such other results include, but are not limited to, indications of exceptions and/or substitutions, requests for additional information, and indications of inability to fulfill request, among many others. A specific example might be providing a 3D model or images conveying geometric data such as violations of good manufacturing principles. In addition to providing a price and/or other information to price-requestor 1012(1) to 1012(N), ecommerce marketplace 1004 may also store that information in a results datastore 1224, for example, for archiving purposes. Results/ordering GUI 1210 may also include a mechanism for allowing corresponding price-requestor 1012(1) to 1012(N) to place an order based on a price it accepts from a bidding one of price-providers 1016(1) to 1016(N). Such mechanism may simply be a "Place Order" software button (not shown) or other control, among others. Depending on the configuration of ecommerce marketplace 1004, price-requestor interface 1200 may additionally (or alternatively) include a non-GUI results interface (not shown) that presents prices and any other relevant information to other software, such as ERP software, PLM software, MRP software, and a standalone software application, among others. Also, depending on how ecommerce marketplace 1004 is deployed among various computing devices, results/ordering GUI 1210, and in some cases and as noted above other or all parts of price-requestor interface 1200, may be implemented as a software module within base software having other functionality, such as CAD software, ERP software, PLM software, and MRP software, among others, for example, in a manner similar to any of the manners described above relative to FIGS. 2, 2A to 2C, and 3. In particular, this may be an automated or semi-automated request.

In the embodiment shown, price-provider interface 1202 is designed and configured to allow price-providers 1016(1) to 1016(N) to interact with ecommerce marketplace 1004, for example, to enroll in the ecommerce marketplace to take advantage of its services, to select from among a set of differing pricing methods, to receive orders based on prices provided in response to price requests, and to receive and provide any pricing information needed to satisfy a price request, among other things. In this connection, exemplary price-provider interface 1202 includes an enrollment GUI 1226, a pricing-method-selection GUI 1228, a custom-pricing interface 1230, and an order interface 1232. Enrollment GUI 1226 allows each price-provider 1016(1) to 1016(N) to enroll with ecommerce marketplace 1004, for example, by providing its name and contact information, along with any other information that the ecommerce marketplace may wish to collect for each price-provider. Correspondingly, ecommerce marketplace 1004 may include a price-provider enrollment datastore 1212 that stores all of the enrollment data for all of the enrolled price-requestors 1012(1) to 1012(N).

Pricing-method-selection GUI 1228 allows each price-provider 1016(1) to 1016(N) to select which one of multiple pricing methods offered by ecommerce marketplace 1004 it would like to use to generate prices for price-requests it receives. Correspondingly, ecommerce marketplace 1004 may include a pricing-method-selection datastore 1236 and a customization datastore 1238. For the sake of illustration, examples of each of pricing-method-selection GUI 1228, pricing-method-selection datastore 1236, and customization datastore 1238 are illustrated, respectively in FIGS. 13, 14, and 15.

Figure 13:
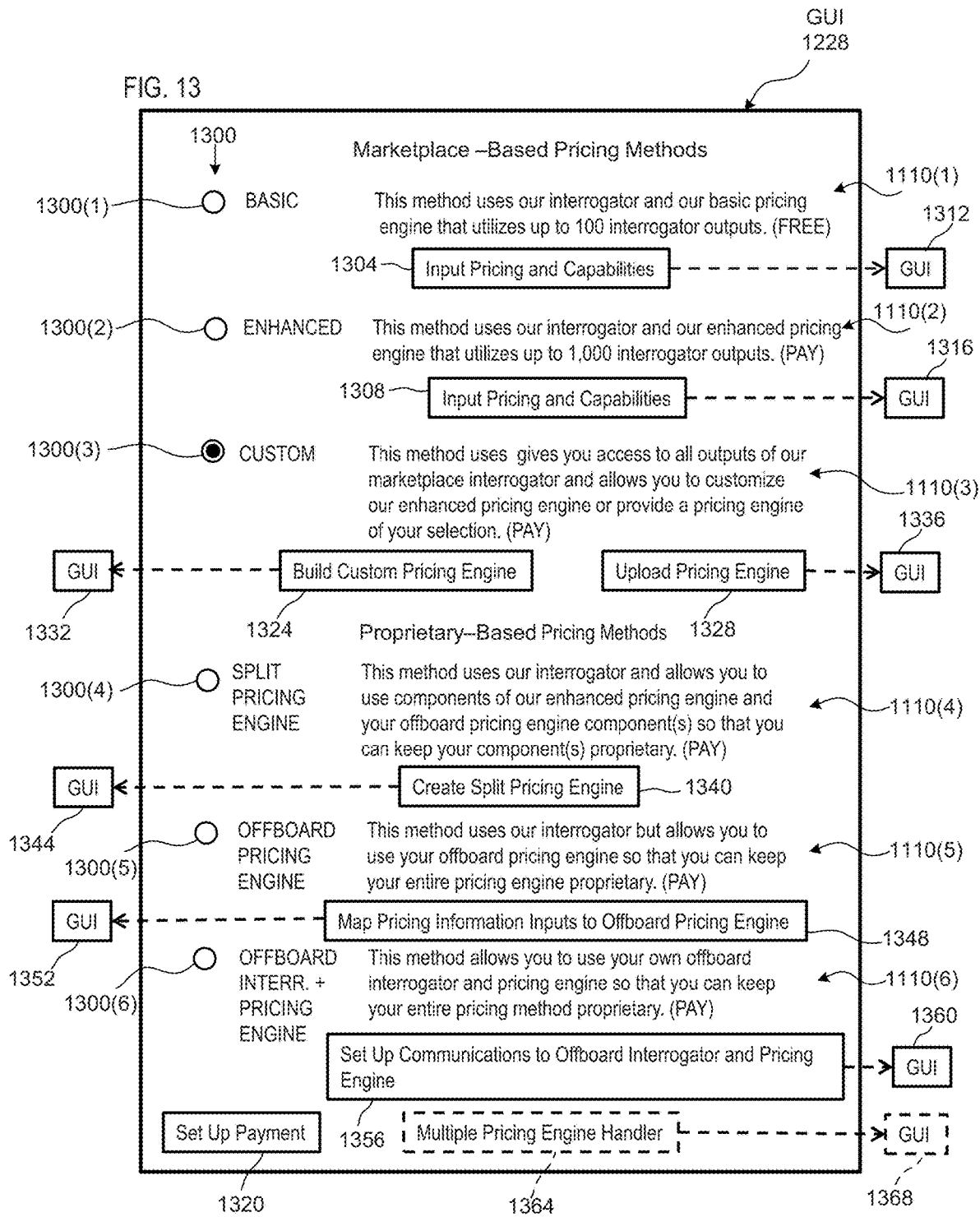
FIG. 13 is a part diagram and a part simulated exemplary screenshot of the pricing-method-selection graphical user interface of the ecommerce marketplace of FIGS. 10 and 12.

Referring first to FIG. 13, in this example pricing-method-selection GUI 1228 and ecommerce marketplace 1004 (FIG. 10) are designed and configured for providing each price-provider 1016(1) to 1016(N) (FIGS. 10 and 12) with the opportunity to select from among pricing methods 1110(1) to 1110(6) (FIG. 11). Consequently, FIG. 13 illustrates pricing-method-selection GUI 1228 as having a radio-button-type selection control 1300 having radio-type buttons 1300(1) to 1300(6) for each one of pricing methods 1110(1) to 1110(6). As noted in FIG. 13 and as a brief review of FIG. 11, pricing methods 1110(1) to 1110(6) are, respectively as follows: 1110(1)—a method utilizing a basic pricing engine 1106(1) provided by ecommerce marketplace 1004 (FIGS. 10 and 12) that utilizes a relative limited set of the output of an interrogator 1104 provided by the ecommerce marketplace; 1110(2)—a method utilizing an enhanced pricing engine 1106(2) provided by the ecommerce marketplace that utilizes an expanded set of the output of the provided interrogator; 1110(3)—a method utilizing a custom pricing engine 1106(3) residing on ecommerce marketplace and that utilizes output of the interrogator 1140; 1110(4)—a method utilizing split pricing engine 1106(4) and output of the provided interrogator to allow the price-provider to keep one or more components 1136(1) to 1136(N) proprietary; 1110(5)—a method utilizing pricing engine 1106(5) under the complete control and privacy of the price-provider but using the output of the interrogator 1146; and 1110(6)—a method utilizing both pricing engine 1106(6) and interrogator 1154 under the control and privacy of the price-provider.

Continuing with FIG. 13, if selected, pricing methods 1110(1) and 1110(2) are essentially "canned" pricing methods that may require the selecting price-provider 1016(1) to 1016(N) (FIGS. 10 and 12) to input pricing information that corresponding respective pricing engines 1106(1) and 1106(2) will need to calculate prices. To this end, in this example pricing-method-selection GUI 1228 may include for each pricing method 1110(1) and 1110(2) a corresponding "Input Pricing and Capabilities" soft control 1304 and 1308 that allows the selecting price-provider 1016(1) to 1016(N) (FIGS. 10 and 12) to input the necessary information, for example, via a corresponding input GUI 1312 and 1316. Examples of pricing and capabilities information that one, the other, or both, of input GUIs 1312 and 1316 may prompt for are illustrated in table 600 of FIG. 6. In addition to pricing information, the selecting price-provider 1016(1) to 1016(N) (FIGS. 10 and 12), if selecting pricing method 1110(2) may require the price-provider to set up a payment method, for example, via a "Setup Payment" soft control 1320, which may be grayed-out if user selects pricing method 1110(1) that is free in this example.

If a selecting price-provider 1016(1) to 1016(N) selects any one of pricing methods 1110(3) to 1110(6), that price-provider will also have an additional selection to make, but in these cases in order to input different information. For example, if selecting price-provider 1016(1) to 1016(N) selects radio button 1300(3) so as to select pricing method 1110(3) that allows the price-provider to customize pricing engine 1106(3), then pricing-method-selection GUI 1228 may provide the price-provider with two sub-selections, namely, 1) a first sub-selection, accessible via "Build Custom Pricing Engine" soft control 1324, that allows the price-provider to build custom pricing engine 1106(3) using pricing-engine components (not shown) provided by ecommerce marketplace 1004 (FIGS. 10 and 12) and/or pricing engine components (not shown) provided by the price-provider and/or one or more third-party providers, such as third-party providers 1240(1) to 1240(N) (FIG. 12) and 2) a second sub-selection, accessible via an "Upload Pricing Engine" soft control 1328, that allows the price-provider to upload their own entire pricing engine or a pricing engine from another provider, such as any one of third-party providers 1240(1) to 1240(N) (FIG. 12) to become custom pricing engine 1106(3). If any price-provider 1016(1) to 1016(N) selects radio button 1300(3), pricing-method-selection GUI 1228 may change "Build Custom Pricing Engine" and "Upload Pricing Engine" soft controls 1324 and 1328 from inactive (e.g., from grayed-out) to active. Each of "Build Custom Pricing Engine" and "Upload Pricing Engine" soft controls 1324 and 1328 may be a radio button, allowing the selecting price-provider 1016(1) to 1016(N) to select only one of the two choices. When the selecting price-provider 1016(1) to 1016(N) selects "Build Custom Pricing Engine" soft control 1324, ecommerce marketplace 1004 (FIGS. 10 and 12) may display to the price-provider a suitable GUI 1332 that allows the price-provider to build custom pricing engine 1106(3), including allowing the price-provider to input pricing and capabilities information needed for the pricing calculations. Such pricing and capabilities information may be the same as or similar to the pricing and capabilities information described above relative to pricing methods 1110(1) and 1110(2).

Alternatively, when the selecting price-provider 1016(1) to 1016(N) selects "Upload Pricing Engine" soft control 1328, ecommerce marketplace 1004 (FIGS. 10 and 12) may display to the price-provider a suitable GUI 1336 that allows the price-provider to upload a desired pricing engine that becomes custom pricing engine 1106(3) and to allow the price-provider to input pricing and capabilities information needed for the pricing calculations. Such pricing and capabilities information may be the same as or similar to the pricing and capabilities information described above relative to pricing methods 1110(1) and 1110(2). Ecommerce marketplace 1004 (FIGS. 10 and 12) may store customizing information that each price-provider 1016(1) to 1016(N) (FIGS. 10 and 12) provides via either GUI 1332 or GUI 1336 in customization datastore 1238 (FIG. 12). For the sake of completeness, it is noted that the examples illustrated herein show only pricing engines being obtained from third-party providers 1240(1) to 1240(N). However, ecommerce-marketplace 1004 may also or alternatively be configured to allow price-providers 1016(1) to 1016(N) to obtain interrogators from third-party providers and/or upload their own interrogators to the ecommerce marketplace using one or more suitable interfaces.

Referring still to FIG. 13, if selecting price-provider 1016(1) to 1016(N) selects radio button 1300(4) so as to select pricing method 1110(4) that allows the price-provider to implement split pricing engine 1106(4), then pricing-method-selection GUI 1228 may display to the price-provider a "Create Split Pricing Engine" soft control 1340 that allows the price-provider to create split pricing engine 1106(4) using pricing-engine components 1134(1) to 1134(N) provided by ecommerce marketplace 1004 (FIGS. 10 and 12) and pricing-engine components 1136(1) to 1136(N) provided by the price-provider. If any price-provider 1016(1) to 1016(N) selects radio button 1300(4), pricing-method-selection GUI 1228 may change "Create Split Pricing Engine" soft control 1340 from inactive (e.g., from grayed-out) to active. When the selecting price-provider 1016(1) to 1016(N) selects "Create Split Pricing Engine" soft control 1340, ecommerce marketplace 1004 (FIGS. 10 and 12) may display to the price-provider a suitable GUI 1344 that allows the price-provider to create split pricing engine 1106(4) and to allow the price-provider to input any necessary pricing and capabilities information needed for the pricing calculations. Such pricing and capabilities information may be the same as or similar to the pricing and capabilities information described above relative to pricing methods 1110(1) and 1110(2). As an example of GUI 1344, such GUI may allow the selecting price-provider 1016(1) to 1016(N) to select pricing-engine components 1134(1) to 1134(N) from among a large set of pricing-engine components available from ecommerce marketplace 1004 (FIGS. 10 and 12), as well as set up which outputs of interrogator 1140 (FIG. 11) need to be sent to pricing-engine components 1136(1) to 1136(N) at the price-provider, what outputs will be communicated from pricing-engine part 1106(4)B back to pricing-engine part 1106(4)A, and how such two-way communications will occur. Ecommerce marketplace 1004 (FIGS. 10 and 12) may store customizing information that each price-provider 1016(1) to 1016(N) (FIGS. 10 and 12) provides via GUI 1344 in customization datastore 1238 (FIG. 12).

If selecting price-provider 1016(1) to 1016(N) selects radio button 1300(5) so as to select pricing method 1110(5) that allows the price-provider to provide its own pricing engine 1106(5) and keep that pricing engine private and secure, then pricing-method-selection GUI 1228 may display to the price-provider a "Map Pricing Information Inputs to Offboard Pricing Engine" soft control 1348 that allows the price-provider to set up ecommerce marketplace 1004 (FIGS. 10 and 12) for using offboard pricing engine 1106(5). If any price-provider 1016(1) to 1016(N) selects radio button 1300(5), pricing-method-selection GUI 1228 may change "Map Pricing Information Inputs to Offboard Pricing Engine" soft control 1348 from inactive (e.g., from grayed-out) to active. When the selecting price-provider 1016(1) to 1016(N) selects "Map Pricing Information Inputs to Offboard Pricing Engine" soft control 1348, ecommerce marketplace 1004 (FIGS. 10 and 12) may display to the price-provider a suitable GUI 1352 (such as, for example, a GUI containing a radio button for each interrogator information output) that allows the price-provider to create a mapping of model-based pricing information 1120 from interrogator 1146 and non-model pricing information 1122 to offboard pricing engine 1106(5) and to set up two-way communications between the offboard pricing engine for the communication of such pricing information and the resulting overall price 1126(5) generated by the pricing engine between ecommerce marketplace 1004 (FIGS. 10 and 12) and the selecting price-provider 1016(1) to 1016(N). Ecommerce marketplace 1004 (FIGS. 10 and 12) may store customizing information that each price-provider 1016(1) to 1016(N) (FIGS. 10 and 12) provides via GUI 1352 in customization datastore 1238 (FIG. 12).

Referring still primarily to FIG. 13, if selecting price-provider 1016(1) to 1016(N) selects radio button 1300(6) so as to select pricing method 1110(6) that allows the price-provider to provide its own interrogator 1154 and pricing engine 1106(6) and keep them private and secure, then pricing-method-selection GUI 1228 may display to the price-provider a "Set Up Communications for Offboard Interrogator and Pricing Engine" soft control 1356 that allows the price-provider to set up ecommerce marketplace 1004 (FIGS. 10 and 12) for using offboard interrogator 1154 and pricing engine 1106(6). If any price-provider 1016(1) to 1016(N) selects radio button 1300(6), pricing-method-selection GUI 1228 may change "Set Up Communications for Offboard Interrogator and Pricing Engine" soft control 1356 from inactive (e.g., from grayed-out) to active. When the selecting price-provider 1016(1) to 1016(N) selects "Set Up Communications for Offboard Interrogator and Pricing Engine" soft control 1356, ecommerce marketplace 1004 (FIGS. 10 and 12) may display to the price-provider a suitable GUI 1360 that allows the price-provider to set up two-way communications between the offboard pricing engine for communicating computer-model data 1118 and the resulting overall price 1126(6) generated by the pricing engine between the ecommerce marketplace and the selecting price-provider. Ecommerce marketplace 1004 (FIGS. 10 and 12) may store customizing information that each price-provider 1016(1) to 1016(N) (FIGS. 10 and 12) provides via GUI 1360 in customization datastore 1238 (FIG. 12).

In the example of pricing-method-selection GUI 1228 just described, the selection control means is a radio-button-type selection control 1300 that allows a user to select only one of the six presented pricing methods 1110(1) to 1110(6). However, other embodiments, may be set up to allow each price-provider 1016(1) to 1016(N) (FIGS. 10 and 12) to select more than one pricing method. For example, instead of the soft controls being radio buttons 1300(1) to 1300(6), the soft controls can be checkboxes (not shown) that allow a price-provider 1016(1) to 1016(N) to select any and all corresponding pricing methods 1110(1) to 1110(6) desired. Correspondingly, pricing-method-selection GUI 1228 may include a "Multiple Pricing Engine Handler" soft control 1364 that may be grayed-out, i.e., unselectable, until a price-provider 1016(1) to 1016(N) has selected two of pricing methods 1110(1) to 1110(6). Once price-provider 1016(1) to 1016(N) has selected at least two pricing methods 1110(1) to 1110(6) and Multiple Pricing Engine Handler soft control 1364 becomes selectable, selection of the Multiple Pricing Engine Handler soft control may take the price-provider to a suitable GUI 1368 that allows the price-provider to set up how to use the prices (and other information) provided by the multiple pricing methods for each price request. Examples of handling options include, but are not limited to, setting up ecommerce marketplace 1004 (FIGS. 10 and 12) to use, for the purpose of presenting to the requesting price-requestor 1012(1) to 1012(N), the lowest calculated price, to use the lowest calculated price if the lowest price is not outside of a predetermined range relative to the next lowest price, average of two or more other prices, etc., to use a straight average of the multiple calculated prices, or to use a weighted average of the multiple calculated prices (including allowing the price-provider to select weights and/or a preselected weighting scheme). It is noted that GUI 1368 may be a dynamic GUI, with the contents and/or selections available changing depending on which, and/or the number, of pricing methods 1110(1) to 1110(6) that price-provider 1016(1) to 1016(N) has selected. The inputs and/or selections price-provider 1016(1) to 1016(N) makes in GUI 1368 may be stored in a suitable location, such as in customization datastore 1238 (FIG. 12), perhaps with a suitable pointer to that information located in pricing-method-selection datastore 1236, for example in a lookup table similar to table 1400 of FIG. 14. Other information storage and retrieval methods may be used.

Figure 14:
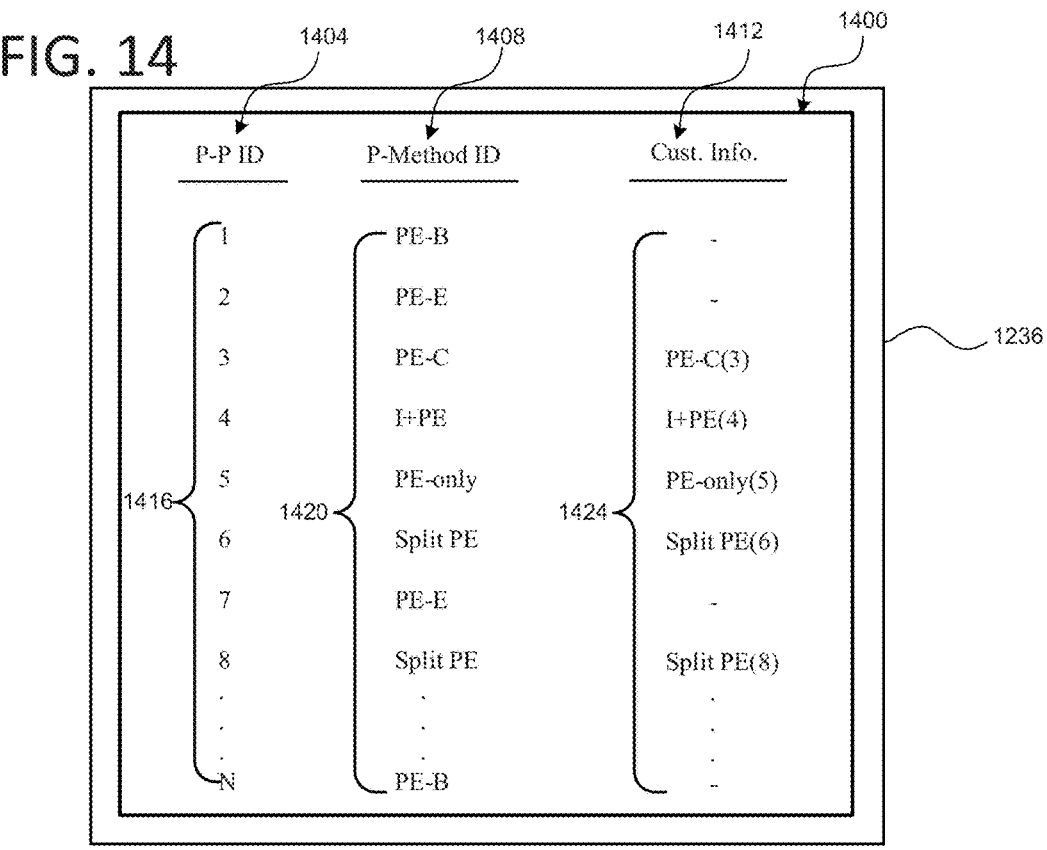
FIG. 14 is a graphical representation of the pricing-method-selection datastore of the ecommerce marketplace of FIGS. 10 and 12.

Referring again to FIG. 12, when each price-provider 1016(1) to 1016(N) makes a selection in exemplary pricing-method-selection GUI 1228 (also FIG. 13) or equivalent, ecommerce marketplace 1004 (FIG. 12) may store that selection in pricing-method-selection datastore 1236, an example of which, as mentioned above, is illustrated in FIG. 14. Referring to FIG. 14, pricing-method-selection datastore 1236 may be configured as a data table 1400 (shown for simplicity) or other suitable data structure. In this example, pricing-method-selection datastore 1236 includes a price-provider identification column 1404 (also labeled "P-P ID"), a pricing method identification column 1408 (also labeled "P-Method ID"), and a customization information column 1412 (also labeled "Cust. Info."). Each row of P-P ID column 1404 contains a unique identifier 1416 for each price-provider 1016(1) to 1016(N) (FIG. 12) enrolled in ecommerce marketplace 1004. Here identifiers 1416 are simply integers 1 through N.

Correspondingly, each field in P-Method ID column 1408 is populated with an identifier 1420 that identifies which one of the pricing methods, here pricing methods 1110(1) to 1110(6), that the corresponding price-provider 1016(1) to 1016(N) has selected. In the example shown, the identifiers used are: "PE-B" for pricing method 1110(1) utilizing basic pricing engine 1106(1); "PE-E" for pricing method 1110(2) utilizing enhanced pricing engine 1106(2); "PE-C" for pricing method 1110(3) utilizing custom pricing engine 1106(3); "Split PE" for pricing method 1110(4) utilizing split pricing engine 1106(4); "PE-only" for pricing method 1110(5) utilizing offboard pricing engine 1106(5); and "I+PE" for pricing method 1110(6) utilizing offboard interrogator 1154 and offboard pricing engine 1106(6). Of course, other pricing method identifiers can be used in the alternative.

In this example, customization information column 1412 contains, where appropriate, pointers 1424 to corresponding respective customization information within customization datastore 1238. There is no customization information for pricing methods 1110(1) and 1110(2), since these methods utilize unmodifiable interrogator 1104 and unmodifiable basic and enhanced pricing engines 1106(1) and 1106(2) provided by ecommerce marketplace 1004. Consequently, for any "PE-B" and "PE-E" identifier in P-Method ID column 1408, the corresponding field in customization information column 1412 is empty. However, each of the remaining pricing methods 1110(3) to 1110(6) require customization information specific to each price-provider 1016(1) to 1016(N) selecting one of such methods. Consequently, for any "PE-C", "Split PE", "PE-only", and "I+PE" identifier in P-Method ID column 1408, the corresponding field in customization information column 1412 contains a corresponding unique pointer 1424 that points to customization information in customization datastore 1238 (FIG. 12). In this example, each unique pointer 1424 has the format "P-method ID(price-provider identifier)".

Figure 15:
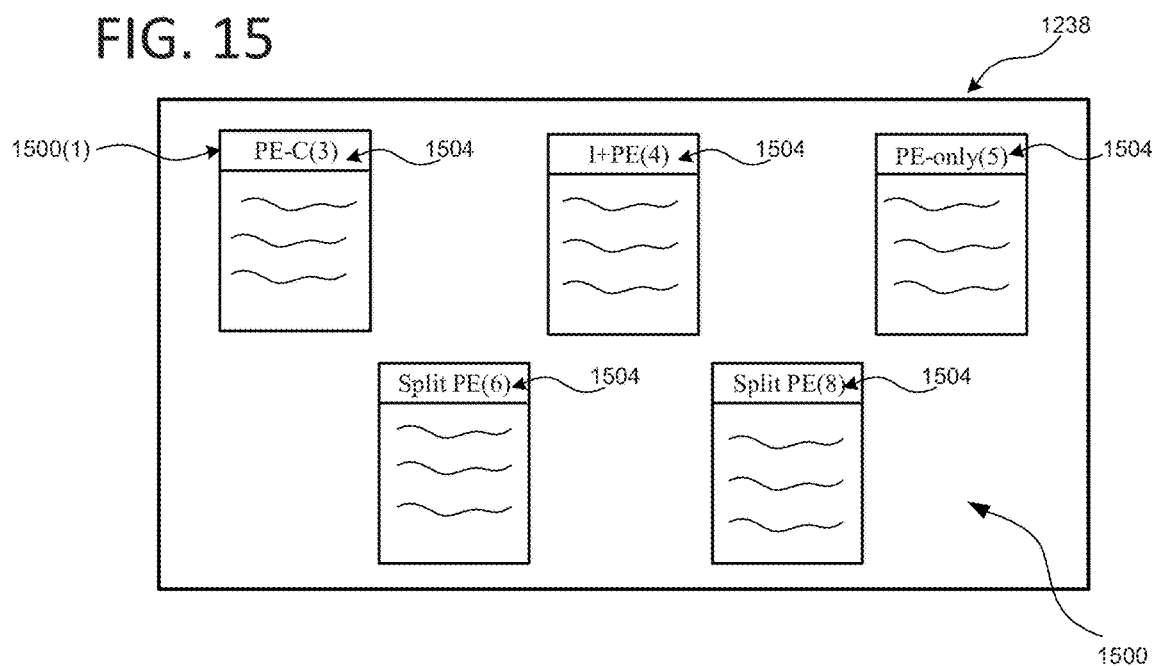
FIG. 15 is a graphical representation of the customization datastore of the ecommerce marketplace of FIGS. 10 and 12.

FIG. 15 illustrates exemplary contents of customization datastore 1238 using such unique pointers 1424 and with the corresponding customization information being organized into data tables 1500 having table identifiers 1504 corresponding to the pointer names. For example, as seen in data table 1400 of FIG. 14, the price-provider having identifier 1416 of "3" in price-provider identification column 1404 has selected pricing method 1110(3), as identified by the "PE-C" (custom pricing engine) identifier in pricing-method column identification column 1408. Since pricing method 1110(3) requires customizing information to be stored in customization datastore 1238 (FIGS. 12 and 15), customization information column 1412 contains pointer 1424 "PE-C(3)" that points to corresponding table 1500(1) having the like table identifier 1404(1) of "PE-C(3), which contains the corresponding customization information. Of course, means other than pointers 1424 can be used in connection with storing customization information. For example, the customization information can be stored directly in data table 1400. Regarding pointers 1424, the pointers may actually be storage location identifiers.

Referring again to FIG. 12, custom-pricing interface 1230 of price-provider interface 1202 is designed and configured to provide communications between ecommerce marketplace 1004 and each of price-providers 1016(1) to 1016(N) that has selected a pricing method performed partially or entirely offboard of the ecommerce marketplace, such as pricing method 1110(4) (split pricing engine (1106(4)), pricing method 1110(5) (offboard pricing engine 1106(5)), and pricing method 1110(6) (offboard interrogator 1154 and offboard pricing engine 1106(6). Referring also to FIG. 11, information that custom-pricing interface 1230 communicates between ecommerce marketplace 1004 and each pertinent price-provider 1016(1) to 1016(N) includes: for pricing method 1110(4), mapped outputs 1138A of interrogator 1140 and one or more outputs of offboard pricing-engine components 1136(1) to 1136(N); for pricing method 1110(5), mapped outputs 1148 of interrogator 1146 and price 1126(5) determined by offboard pricing engine 1106(5); and, for pricing method 1110(6), computer-model data 1118 and price 1126(6) determined by offboard pricing engine 1106(6).

Request engine 1204 of ecommerce marketplace 1004 illustrated in FIG. 12 may be designed and configured to coordinate all activity aboard the ecommerce marketplace necessary to provide each requesting price-requestor 1012(1) to 1012(N) with the one or more prices that the price-requestor requests via a price request, such as exemplary price request 1242. Following is an exemplary description of steps that ecommerce marketplace 1004 may take, with request engine 1204 taking the lead on many steps of the process. Initially, price-requestor interface 1200 generates price request 1242 based on input of a corresponding one of price-requestors 1012(1) to 1012(N) via request GUI 1208. Price request 1242 may contain some or all of at least the following information: an identifier that identifies the requesting price-requestor 1012(1) to 1012(N); a list of the ones of price-providers 1016(1) to 1016(N) that the price-requestor would like prices from; an identification of computer-model data 1218(1) to 1218(N) that form a basis of the price request; an identification of the location of non-model pricing information 1122 (FIG. 11) or portion thereof; and any additional portion of the non-model pricing information. When assembled, price-requestor interface 1200 may provide price request 1242 to request engine 1204.

In response to receiving price request 1242, request engine 1204 may gather any necessary information not contained in the price request, for example, by retrieving it from the appropriate datastore, such as price-provider selection datastore 1222, price-requestor enrollment datastore 1212, computer model datastore 1216, and non-model pricing information datastore 1220. For each selected price-provider 1016(1) to 1016(N), request engine 1204 queries pricing-method-selection datastore 1236 to determine which pricing method 1110(1) to 1110(6) that the price-provider has selected. As noted above, pricing-method-selection datastore 1236 includes an index of selected pricing methods 1110(1) to 1110(6) (see columns 1404 and 1408 of data table 1400 of FIG. 14). This allows request engine 1204 to determine the steps it needs to take to obtain a price for each of the selected price-providers 1016(1) to 1016(N) selected by the one of price-requestors 1012(1) to 1012(N) at issue.

For each, if any, selected price-provider 1016(1) to 1016(N) that has selected pricing-method 1110(1) utilizing basic pricing engine 1106(1) and that appears in price request 1242, request engine 1204 causes interrogator 1104 to interrogate the relevant computer-model data 1118 and provide it along with non-model pricing information 1122 to the basic pricing engine, cause the basic pricing engine to calculate price 11260, and provide the calculated price to results/ordering GUI 1210. Similarly, for each, if any, selected price-provider 1016(1) to 1016(N) that has selected method 1110(2) utilizing enhanced pricing engine 1106(2) and that appears in price request 1242, request engine 1204 will largely perform the same steps as with method 1110(1), except it will use enhanced pricing engine 1106(2) instead of basic pricing engine 1106(1).

For each, if any, selected price-provider 1016(1) to 1016(N) that has selected pricing method 1110(3) utilizing custom pricing engine 1106(3) and that appears in price request 1242, request engine 1204 determines the location of the custom pricing engine that the corresponding price-provider has provided. To do this in the illustrated example, request engine 1204 queries the contents of customization data column 1412 of data table 1400 (FIG. 14) to see where the corresponding customization information is stored within customization datastore 1238 (FIGS. 12 and 15) according to the corresponding pointer 1424 in customization data column 1412. In this example, the corresponding customization information contains custom pricing engine 1106(3) that corresponding price-provider 1016(1) to 1016(N) provided, for example, as described above. With the location of custom pricing engine 1106(3) known to request engine 1204, the request engine may proceed with causing ecommerce marketplace 1004 to generate a price using that custom pricing engine. For example, request engine 1204 may generally proceed as described above relative to pricing method 1110(1), but using custom pricing engine 1106(3) as determined from pricing method selection datastore 1236 rather than basic pricing engine 1106(1).

For each, if any, selected price-provider 1016(1) to 1016(N) that has selected pricing method 1110(4) utilizing split pricing engine 1106(4) and that appears in price request 1242, request engine 1204 determines the format of the split pricing engine that the corresponding price-provider has created. To do this in the illustrated example, request engine 1204 queries the contents of customization data column 1412 of data table 1400 (FIG. 14) to see where the corresponding customization information is stored within customization datastore 1238 (FIGS. 12 and 15) according to the corresponding pointer 1424 in customization data column 1412. With the format of split pricing engine 1106(4) known to request engine 1204, the request engine may proceed with causing ecommerce marketplace 1004 to generate a price using that split pricing engine. For example, request engine 1204 may provide mapped pricing information, including output of interrogator 1140 and/or non-model pricing information, to pricing-engine components 1134(1) to 1134(N) residing on ecommerce marketplace 1004 in customization datastore 1238 and, via, custom-pricing interface 1230, to pricing-engine components 1136(1) to 1136(N) residing offboard the ecommerce marketplace. In addition, request engine 1204 may control the receipt and subsequent handling of results from pricing-engine components 1136(1) to 1136(N), among other things such as handing the delivery of the final price to results/ordering GUI 1210.

For each, if any, selected price-provider 1016(1) to 1016(N) that has selected pricing method 1110(5) utilizing offboard pricing engine 1106(5) and that appears in price request 1242, request engine 1204 determines the address of the offboard pricing engine and the corresponding mapping of pricing information for the offboard pricing engine. To do this in the illustrated example, request engine 1204 queries the contents of customization data column 1412 of data table 1400 (FIG. 14) to see where the corresponding customization information is stored within customization datastore 1238 (FIGS. 12 and 15) according to the corresponding pointer 1424 in customization data column 1412. With the location of offboard pricing engine 1106(5) known to request engine 1204 based on the customization information, the request engine may proceed with causing ecommerce marketplace 1004 to generate a price using that offboard pricing engine. For example, request engine 1204 may provide mapped pricing information, including output of interrogator 1146 and/or non-model pricing information, to offboard pricing engine 1106(5) via custom-pricing interface 1230. In addition, request engine 1204 may control the receipt and subsequent handling of the final price from pricing-engine 1106(5), among other things such as handing the delivery of the final price to results/ordering GUI 1210.

For each, if any, selected price-provider 1016(1) to 1016(N) that has selected pricing method 1110(6) utilizing offboard interrogator 1154 and offboard pricing engine 1106(6) and that appears in price request 1242, request engine 1204 determines the addresses of the offboard interrogator and offboard pricing engine. To do this in the illustrated example, request engine 1204 queries the contents of customization data column 1412 of data table 1400 (FIG. 14) to see where the corresponding customization information is stored within customization datastore 1238 (FIGS. 12 and 15) according to the corresponding pointer 1424 in customization data column 1412. With the location of offboard interrogator 1154 and offboard pricing engine 1106(6) known to request engine 1204 based on the customization information, the request engine may proceed with causing ecommerce marketplace 1004 to generate a price using that offboard pricing engine. For example, request engine 1204 may send the relevant computer-model data 1118 to offboard interrogator 1154 and send any mapped non-model pricing information 1218 to pricing engine 1106(6) via custom-pricing interface 1230. In addition, request engine 1204 may control the receipt and subsequent handling of the final price from pricing-engine 1106(6), among other things such as handing the delivery of the final price to results/ordering GUI 1210.

Figure 16:
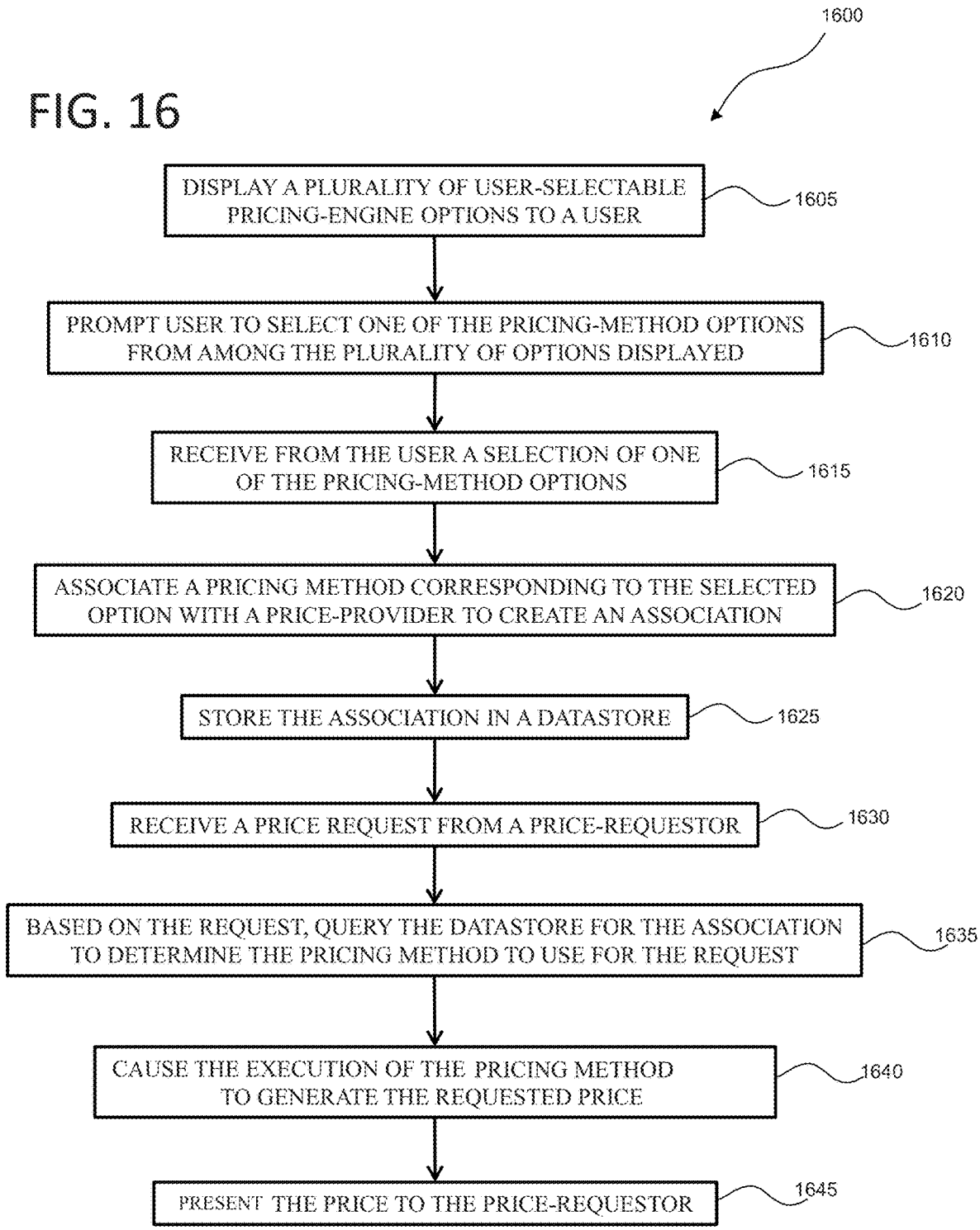
FIG. 16 is a flow diagram of an exemplary method that an ecommerce marketplace of the present invention may perform.

FIG. 16 illustrates an exemplary high-level method 1600 of enabling a pricing-method-agnostic ecommerce marketplace of the present invention, such as ecommerce marketplace 1004 of FIGS. 10 and 12, to provide a price for supplying one or more instantiations of a structure represented in computer-model data. Referring now to FIG. 16, and also to FIG. 12 and other figures as noted, at step 1605 a plurality of user-selectable pricing-method options are displayed to a user. In the context of exemplary ecommerce marketplace 1004 of FIG. 12, this can be accomplished by displaying to any one of price-providers 1016(1) to 1016(N), via the corresponding communications system 1024(1) to 1024(N) (FIG. 10), pricing-method-selection GUI 1228, an example of which is illustrated in FIG. 13 as presenting pricing-method options 1110(1) to 1110(6) (also FIG. 11). At step 1610, the user may be prompted to select one of the user-selectable pricing-method options from among the plurality of pricing-method options displayed. In the context of pricing-method-selection GUI 1228 (FIG. 13), step 1610 may be performed by the pricing-method-selection GUI simply displaying the message "Please Select a Desired Pricing Method" or the like. At step 1615, a selection is received from the user of one of the user-selectable pricing-method options from among the plurality of pricing-method options displayed. In the context of pricing-method-selection GUI 1228 (FIG. 13), step 1615 may correspond to receiving a selection of one of radio buttons 1300(1) to 1300(6) selected by the corresponding price-provider 1016(1) to 1016(N).

At step 1620, a computer-implemented pricing method, corresponding to the selected pricing-method option selected in conjunction with step 1620, is associated with the price-provider to create an association. In the context of exemplary ecommerce marketplace 1004 (FIG. 12), this association may be made by price-provider interface 1202 and reflected in pricing-method-selection datastore 1236 (FIGS. 12 and 14) via the information in price-provider identification column 1404 (FIG. 14) and pricing method identification column 1412, which create an association between the price-provider 1016(1) to 1016(N) at issue and the selected one of pricing-methods 1110(1) to 1110(6). At step 1625, the association between the price-provider and the selected pricing method is stored. In the context of exemplary ecommerce marketplace 1004, this storing of the association is reflected in the populating of price-provider identification column 1404 (FIG. 14) and pricing method identification column 1412 of pricing-method-selection datastore 1236 with corresponding respective identifiers 1416 and 1420.

At step 1630, a price request is received from a price-requestor, wherein the price request is soliciting the price from the price-provider for supplying the one or more instantiations. In the context of exemplary ecommerce marketplace 1004, step 1630 may correspond to request engine 1204 (FIG. 12) receiving price request 1242 from a corresponding price-requestor 1012(1) to 1012(N) via price-request GUI 1208 of price-requestor interface 1200. At step 1635, based on receiving the price request at step 1630, the datastore is queried for the association of the price-provider with the computer-implemented pricing method selected by the price-provider. In the context of exemplary ecommerce marketplace 1004, step 1635 may correspond to request engine 1204 (FIG. 12), in response to receiving price request 1242, querying pricing-method-selection datastore 1236 (FIGS. 12 and 14) to determine which pricing method that the corresponding price-provider 1016(1) to 1016(N) has selected for generating the price it wants to provide to the requesting price-requestor 1012(1) to 1012(N).

At step 1640, based on the querying at step 1635, execution of the computer-implemented pricing method selected by the price-provider is caused so that the computer-implemented pricing method generates the requested price. In the context of exemplary ecommerce marketplace 1004, step 1640 may correspond to request engine 1204, after determining which of pricing methods 1110(1) to 1110(6) that the corresponding price-provider 1016(1) to 1016(N) wants to use to provide a price to the requesting price-requestor 1012(1) to 1012(N) from querying pricing-method-selection datastore 1236, executing the pricing method corresponding to identifier 1420 (FIG. 14). Depending upon which pricing method 1110(1) to 1110(6) at issue, the causing of the execution of the pricing method may involve using customization information in a data table 1500 (FIG. 15) in customization datastore 1238, as determined by the presence of a unique pointer 1424 (FIG. 14) in customization information column 1412 of pricing method selection datastore 1236. At step 1645, the price, determined from the execution of the selected pricing method in response to step 1640, is presented to the price-requestor. In the context of exemplary ecommerce marketplace 1004, step 1645 may be performed via results/ordering GUI 1210 (FIG. 12), for example, by displaying the price on a display screen of the corresponding communications system 1020(1) to 1020(N) (FIG. 10), or may be performed by providing the price and any other relevant information to other software.

It is noted that method 1600 of FIG. 16 is merely exemplary and that many other useful methods can be performed by a pricing-method-agnostic ecommerce marketplace of the present invention, such as exemplary pricing-method-agnostic ecommerce marketplace 1004 described in detail herein. Such other methods include methods that include additional steps that build on the steps 1605 to 1645 of method 1600 for providing more specific functionality, methods that include fewer steps than method 1600, methods having steps 1605 to 1645 performed in a different order, methods having one or more of steps 1605 to 1645 swapped out for one or more other steps, and methods that address other features and functionalities of a pricing-method-agnostic ecommerce marketplace of the present invention, among others. Those skilled in the art will understand such other methods after reading and understanding the present disclosure.

Referring again to FIG. 12, order interface 1232 of price-provider interface 1202 may be designed and configured to communicate order information between ecommerce marketplace 1004 and the selected price-provider 1016(1) to 1016(N) selected to supply the goods that were the subject of a corresponding price request. Ecommerce marketplace 1004 may also include an order engine 1244, responsive to each price-requestor 1012(1) to 1012(N) initiating an order, for example, in the manner noted above in connection with the description of results/ordering GUI 1210. Similar to request engine 1204, order engine 1244, once initiated, may take control of all communications between and among ecommerce marketplace 1004, the ordering price-requestor 1012(1) to 1012(N), and the selected price-provider 1016(1) to 1016(N). In particular, this entire process may be automated by intelligent software as described above.

As can be seen from the foregoing descriptions, an ecommerce marketplace of the present disclosure can be implemented in any of a wide variety of ways. Following are some of those ways. While these examples are presented using ecommerce marketplace 1004 of FIG. 10 et seq. as an example, these examples are also applicable to other embodiments described herein. As a first example, ecommerce marketplace 1004 (FIG. 10) may be implemented as a standalone website in which entire ecommerce marketplace 1004 is implemented on one or more webservers. In such an implementation, price-providers 1016(1) to 1016(N) and price-requestors 1012(1) to 1012(N) may access the functionality of ecommerce marketplace 1004 via web browsers using web-browsing techniques known in the art. As another example, the price-requestor side of ecommerce marketplace system 1000 (FIG. 10) may be implemented in any one or more types of base software and/or one or more types of standalone software applications. For example, one or more parts of price-requestor interface 1200 (FIG. 12) may be implemented in base software that is generally provided for another purpose. Examples of base software include, but are not limited to, CAD software, ERP software, PLM software, and MRP software, among others. Examples of standalone software applications include apps for mobile devices and other devices.

As an example of implementing ecommerce marketplace system 1000 in a base software environment, a base software provider may build functionality of price-requestor interface 1200 into its software and may provide its own ecommerce marketplace, for example, on a standalone website. In this example, instantiations of the base software, located, for example, at businesses licensing the base software, allow price-requestors 1012(1) to 1012(N) to make price requests, receive prices (and other information), and/or place orders via the based software. Price-provider interface 1202 (FIG. 12) may be implemented on the standalone website, such that any price-provider 1016(1) to 1016(N) desiring to participate in ecommerce marketplace system 1000 (FIG. 10) interacts with the price-provider interface, for example, via a web browser. As a specific instantiation, a CAD software provider may build price-requestor interface 1200 into CAD software it licenses to businesses so that designers can price and/or order structures/assemblies they design directly through the CAD software. As noted, the CAD software provider may provide its own ecommerce marketplace website; however, it may alternatively have an arrangement with a third-party ecommerce marketplace provider to provide the non-price-requestor-side functionality of ecommerce marketplace system 1000 (FIG. 10). Similar deployments can be made with other base software, such as ERP software, PLM software, and MRP software, among others, to allow non-designers to price and order structures/assemblies. In other embodiments, instead of building functionality of price-requestor interface 1200 into the base software, a base-software provider may provide such functionality as a plug-in software module to its base software, either for its own version of ecommerce marketplace system 1000 (FIG. 10) or for a version of ecommerce marketplace system 1000 licensed from another person or entity. In yet other embodiments, functionality of price-requestor interface 1200 (FIG. 12) may be provided to base software in a plug-in software module from a source other than the base software provider. For example, a third-party provider of ecommerce marketplace system 1000 (FIG. 10) may provide plug-in software modules, containing parts or all of price-requestor interface 1200 (FIG. 12), for one or more types of base software applications that users of such software can choose to implement if they want to participate in the marketplace system as price-requestors 1012(1) to 1012(N). Price-providers 1016(1) to 1016(N), on the other hand, may interact directly with price-provider interface 1202 provided by the third-party owner of ecommerce marketplace system 1000. Standalone application implementations of functionality of price-requestor interface 1200 can be provided for any suitable computer or mobile device operating system, such as Microsoft Windows, Apple OS, Linus, Android, and Apple iOS, among others.

Ecommerce marketplace system 1000 (FIG. 10) may also be adapted to software-as-a-service (SaaS) implementations, for example, in SaaS implementations of base software, such as CAD software, ERP software, PLM software, and MRP software, among others. Likewise, ecommerce marketplace system 1000 can be adapted to other cloud-based services, such as online CAD file repository systems where users can retrieve designs of structures/assemblies created by others for the users' use. By integrating functionality of ecommerce marketplace system 1000, such a repository may also allow its user to quickly price and order physical instantiations of the structures/assemblies they select. Such implementations may be embodied in a variety of forms, such as with the SaaS or other cloud-based service provider controlling ecommerce marketplace system 1000 or a third-party controlling the ecommerce marketplace system. Those skilled in the art will understand how to embody any version of ecommerce marketplace system 1000 depending on the implementation desired.

Those skilled in the art will readily appreciate that the immediately foregoing examples are not mutually exclusive. For example, in the initial browser-based example above, access to ecommerce marketplace 1004 (FIG. 1) by price-requestors 1012(1) to 1012(N) need not be exclusively via web browsers. Rather, such access may be made, for example, via ecommerce marketplace user interfaces provided by base software, via plug-in software modules to base software, and/or via standalone software applications.

Those skilled in the art will readily appreciate that the embodiments described and illustrated herein are merely provided for exemplification of the broader aspects, features, and functionalities embodied in this example. Thus, those skilled in the art will also readily appreciate that specific features described, such as soft controls, datastores, GUIs, other UIs, interrogators, and pricing engines and components thereof, among other things, can each be replaced with functional equivalents to create other embodiments that fall within the purview of the present invention. These replacements can readily be made by those reasonably skilled in the art without undue experimentation.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an 14PROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 17 shows a diagrammatic representation of one embodiment of a computing device in the exemplary form of a computer system 1700 within which a set of instructions for causing a system, for example pricing system 200 of FIG. 2, product management system 250 of FIG. 2B, or pricing-method-agnostic ecommerce marketplace system 1000 of FIG. 10, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1700 includes a processor 1704 and a memory 1708 that communicate with each other, and with other components, via a bus 1712. Bus 1712 may include any of several types of bus structures including, but not limited to, a memory bus, a memory controller, a peripheral bus, a local bus, and any combinations thereof, using any of a variety of bus architectures.

Memory 1708 may include various components (e.g., machine readable media) including, but not limited to, a random access memory component, a read only component, and any combinations thereof. In one example, a basic input/output system 1716 (BIOS), including basic routines that help to transfer information between elements within computer system 1700, such as during start-up, may be stored in memory 1708. Memory 1708 may also include (e.g., stored on one or more machine-readable media) instructions (e.g., software) 1720 embodying any one or more of the aspects and/or methodologies of the present disclosure. In another example, memory 1708 may further include any number of program modules including, but not limited to, an operating system, one or more application programs, other program modules, program data, and any combinations thereof.

Computer system 1700 may also include a storage device 1724. Examples of a storage device (e.g., storage device 1724) include, but are not limited to, a hard disk drive, a magnetic disk drive, an optical disc drive in combination with an optical medium, a solid-state memory device, and any combinations thereof. Storage device 1724 may be connected to bus 1712 by an appropriate interface (not shown). Example interfaces include, but are not limited to, SCSI, advanced technology attachment (ATA), serial ATA, universal serial bus (USB), 114E 1394 (FIREWIRE), and any combinations thereof. In one example, storage device 1724 (or one or more components thereof) may be removably interfaced with computer system 1700 (e.g., via an external port connector (not shown)). Particularly, storage device 1724 and an associated machine-readable medium 1728 may provide nonvolatile and/or volatile storage of machine-readable instructions, data structures, program modules, and/or other data for computer system 1700. In one example, software 1720 may reside, completely or partially, within machine-readable medium 1728. In another example, software 1720 may reside, completely or partially, within processor 1704.

Computer system 1700 may also include an input device 1732. In one example, a user of computer system 1700 may enter commands and/or other information into computer system 1700 via input device 1732. Examples of an input device 1732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1732 may be interfaced to bus 1712 via any of a variety of interfaces (not shown) including, but not limited to, a serial interface, a parallel interface, a game port, a USB interface, a FIREWIRE interface, a direct interface to bus 1712, and any combinations thereof. Input device 1732 may include a touch screen interface that may be a part of or separate from display 1736, discussed further below. Input device 1732 may be utilized as a user selection device for selecting one or more graphical representations in a graphical interface as described above.

A user may also input commands and/or other information to computer system 1700 via storage device 1724 (e.g., a removable disk drive, a flash drive, etc.) and/or network interface device 1740. A network interface device, such as network interface device 1740, may be utilized for connecting computer system 1700 to one or more of a variety of networks, such as network 1744, and one or more remote devices 1748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1744, may employ a wired and/or a wireless mode of communication. In general, any network topology may be used. Information (e.g., data, software 1720, etc.) may be communicated to and/or from computer system 1700 via network interface device 1740.

Computer system 1700 may further include a video display adapter 1752 for communicating a displayable image to a display device, such as display device 1736. Examples of a display device include, but are not limited to, a liquid crystal display (LCD), a cathode ray tube (CRT), a plasma display, a light emitting diode (LED) display, and any combinations thereof. Display adapter 1752 and display device 1736 may be utilized in combination with processor 1704 to provide graphical representations of aspects of the present disclosure. In addition to a display device, computer system 1700 may include one or more other peripheral output devices including, but not limited to, an audio speaker, a printer, and any combinations thereof. Such peripheral output devices may be connected to bus 1712 via a peripheral interface 1756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A computer-implemented method of fabricating a structure, the method comprising:
displaying to a user a plurality of user-selectable pricing-method options for a price-provider;
prompting the user to select at least one of the user-selectable pricing-method options from among the plurality displayed;
receiving from the user a selection of one of the user-selectable pricing-method options from among the plurality displayed;
based on the selected pricing method option, associating a pricing method corresponding to the selected pricing method option with the price-provider to create a first association;
storing the first association of the in a first datastore;
receiving a price request from a price-requestor, the price request soliciting the price from the price-provider for supplying the one or more instantiations, wherein receiving the price request further comprises:
  detecting an active screen displaying the structure; and
  automatedly selecting the structure based on the detection;
based on the receiving the price request, querying the first datastore for the first association based on the price-provider;
based on the querying, causing execution of the computer-implemented pricing method;
determining the price as a function of the execution of the pricing method; and
presenting the price to the price-requestor.

2. The computer-implemented method according to claim 1, wherein the displaying of a plurality of user-selectable pricing method options includes displaying a basic pricing method option and an enhanced pricing method option, wherein each of the basic and enhanced pricing method options are provided by the ecommerce marketplace.

3. The computer-implemented method according to claim 2, wherein the displaying of a plurality of user-selectable pricing method options further includes displaying a custom pricing method option.

4. The computer-implemented method according to claim 3, further comprising displaying to the supplier a pricing method selection GUI designed and configured to allow the supplier to customize the computer-implemented pricing method.

5. The computer-implemented method according to claim 4, wherein the ecommerce marketplace includes a pricing engine having marketplace-side components, and the displaying of a price generating process customization UI includes displaying a price generating process customization UI designed and configured to customize the computer-implemented pricing method to use at least one price-provider-side pricing engine component to complete the pricing engine.

6. The computer-implemented method according to claim 1, where the displaying of a plurality of user-selectable pricing method options includes displaying a price-provider-side pricing engine option that controls the ecommerce marketplace to send pricing engine input to a price-provider-side pricing engine and to receive the price from the price-provider-side pricing engine.

7. The computer-implemented method according to claim 1, wherein the displaying of a plurality of user-selectable price generating options includes displaying a price-provider-side pricing option that controls the ecommerce marketplace to send request-input pricing information to a supplier-side pricing method and to receive the price from the supplier-side pricing process.

8. The computer-implemented method according to claim 1, wherein the displaying of a plurality of user-selectable pricing method options includes displaying a pricing method selection graphical user interface (GUI), wherein the pricing method selection GUI displays:
a first pricing method option that allows the price-provider to select a pricing method that includes an ecommerce marketplace provided pricing engine;
a second pricing method option that allows the price-provider to select a pricing method that allows the price-provider implement a price-provider customized pricing engine; and
a third pricing method that allows the price-provider to implement a price-provider-provided pricing engine located offboard the ecommerce marketplace;

wherein the pricing method selection GUI allows the price-provider to select from among the first, second, and third pricing options.

9. The computer-implemented method according to claim 1, further comprising:
providing an interrogator designed and configured to output a set of model-based pricing information;
providing a basic pricing engine designed and configured to use a subset of the set of model-based pricing information;
providing an enhanced pricing engine designed and configured to use a set of the model-based pricing information that is larger than the subset of the basic pricing engine; and
allowing the price-provider to select between the basic pricing engine and the enhanced pricing engine.

10. The computer-implemented method according to claim 1, wherein the receiving from the user of a selection of one of the user-selectable pricing-method options includes receiving a selection of a customizable pricing option requiring customization information, the method further comprising displaying a pricing method customization graphical user interface (GUI) designed and configured to allow the user to input the customization information.

11. The computer-implemented method according to claim 10, wherein the displaying of a pricing method customization GUI includes displaying a pricing method customization GUI that allows the user to retrieve a third-party pricing engine.

12. A computer-implemented method according to claim 10, wherein the displaying of a pricing method customization GUI includes displaying a pricing method customization GUI that allows the user to map interrogator outputs to at least one offboard pricing engine component.

13. The computer-implemented method according to claim 10, further comprising: storing the customization information in second datastore;
associating the customization information with the price-provider to create a second association; and
storing the second association in the first datastore.

14. The computer-implemented method according to claim 13, wherein the second association comprises a pointer to the customization information in the second datastore.

15. The computer-implemented method according to claim 1, further comprising:
receiving from the user a selection of two or more of the user-selectable pricing-method options from among the plurality displayed; and
receiving from the user a handling instruction for handling two or more computer-implemented pricing methods corresponding to the two or more selected user-selectable pricing-method options.

16. The computer-implemented method according to claim 15, further comprising, based on receiving of the price request:
obtaining a determined price from each of the two or more computer-implemented pricing methods; and
handling the determined prices according to the handling instructions so as to generate the price.

17. The computer-implemented method according to claim 15, further comprising presenting to the user a menu containing a plurality of user-selectable handling methods for handling a plurality of selected computer-implemented pricing methods, the receiving of the handling instructions corresponding to a user selection of one of the plurality of user-selectable handling methods.

18. The computer-implemented method according to claim 1, wherein said displaying to a user a plurality of user-selectable pricing-method options includes displaying the plurality of user-selectable pricing-method options via a graphical user interface of a product life cycle management system.

19. The computer-implemented method according to claim 1, wherein said displaying to a user a plurality of user-selectable pricing-method options includes displaying the plurality of user-selectable pricing-method options via a graphical user interface of an enterprise resource planning system.

20. The computer-implemented method according to claim 1, wherein said displaying to a user a plurality of user-selectable pricing-method options includes displaying the plurality of user-selectable pricing-method options via a graphical user interface of a manufacturing resource planning system.

* * * * *